(12) United States Patent
Yamada et al.

(10) Patent No.: US 12,013,520 B2
(45) Date of Patent: Jun. 18, 2024

(54) ZOOM LENS AND IMAGE PICKUP APPARATUS

(71) Applicant: CANON KABUSHIKI KAISHA, Tokyo (JP)

(72) Inventors: Tomoya Yamada, Tochigi (JP); Masaru Sakamoto, Tochigi (JP); Yu Inomoto, Saitama (JP); Naotoshi Ogawa, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 245 days.

(21) Appl. No.: 17/355,730

(22) Filed: Jun. 23, 2021

(65) Prior Publication Data

US 2021/0405336 A1    Dec. 30, 2021

(30) Foreign Application Priority Data

Jun. 29, 2020    (JP) ................. 2020-111195

(51) Int. Cl.
  *G02B 15/14*    (2006.01)
  *G02B 15/20*    (2006.01)
  *G02B 27/00*    (2006.01)

(52) U.S. Cl.
  CPC ..... *G02B 15/1461* (2019.08); *G02B 15/1441* (2019.08); *G02B 15/145119* (2019.08); *G02B 15/145125* (2019.08); *G02B 15/145129* (2019.08); *G02B 15/20* (2013.01); *G02B 27/0025* (2013.01)

(58) Field of Classification Search
  None
  See application file for complete search history.

(56) References Cited

U.S. PATENT DOCUMENTS

2012/0002300 A1* 1/2012 Kodaira ................. G02B 15/17
  359/676
2012/0300118 A1* 11/2012 Shimomura ........... G02B 15/22
  359/686

(Continued)

FOREIGN PATENT DOCUMENTS

JP    2012058660 A    3/2012
JP    2015094868 A    5/2015

(Continued)

*Primary Examiner* — Darryl J Collins
(74) *Attorney, Agent, or Firm* — CANON U.S.A., INC. IP Division

(57) ABSTRACT

A zoom lens includes, from an object side a first lens unit (a positive refractive power) configured not to move for zooming, two or more intermediate lens units configured to move in zooming, and a rear lens unit (a positive refractive power), wherein an interval between each pair of adjacent lens units changes in zooming, the first lens unit includes, from the object side, a first lens subunit (a negative refractive power) configured not to move for focusing, a second lens subunit (a positive refractive power) configured to move for focusing, and a third lens subunit (a positive refractive power), the zoom lens satisfies specific inequalities concerning a focal length of the first lens unit, a length on an optical axis from a last surface to a rear principal point of the first lens unit, and a focal length of the zoom lens at a telephoto end.

19 Claims, 35 Drawing Sheets

(56) References Cited

U.S. PATENT DOCUMENTS

| | | | | |
|---|---|---|---|---|
| 2015/0015968 A1* | 1/2015 | Eguchi | ................ | G02B 15/173 |
| | | | | 359/683 |
| 2015/0131165 A1* | 5/2015 | Nakamura | ..... | G02B 15/145117 |
| | | | | 359/694 |
| 2021/0048655 A1* | 2/2021 | Shimomura | ....... | G02B 27/0025 |

FOREIGN PATENT DOCUMENTS

| | | |
|---|---|---|
| JP | 2015094869 A | 5/2015 |
| JP | 2015161693 A | 9/2015 |
| JP | 2017026797 A | 2/2017 |

* cited by examiner

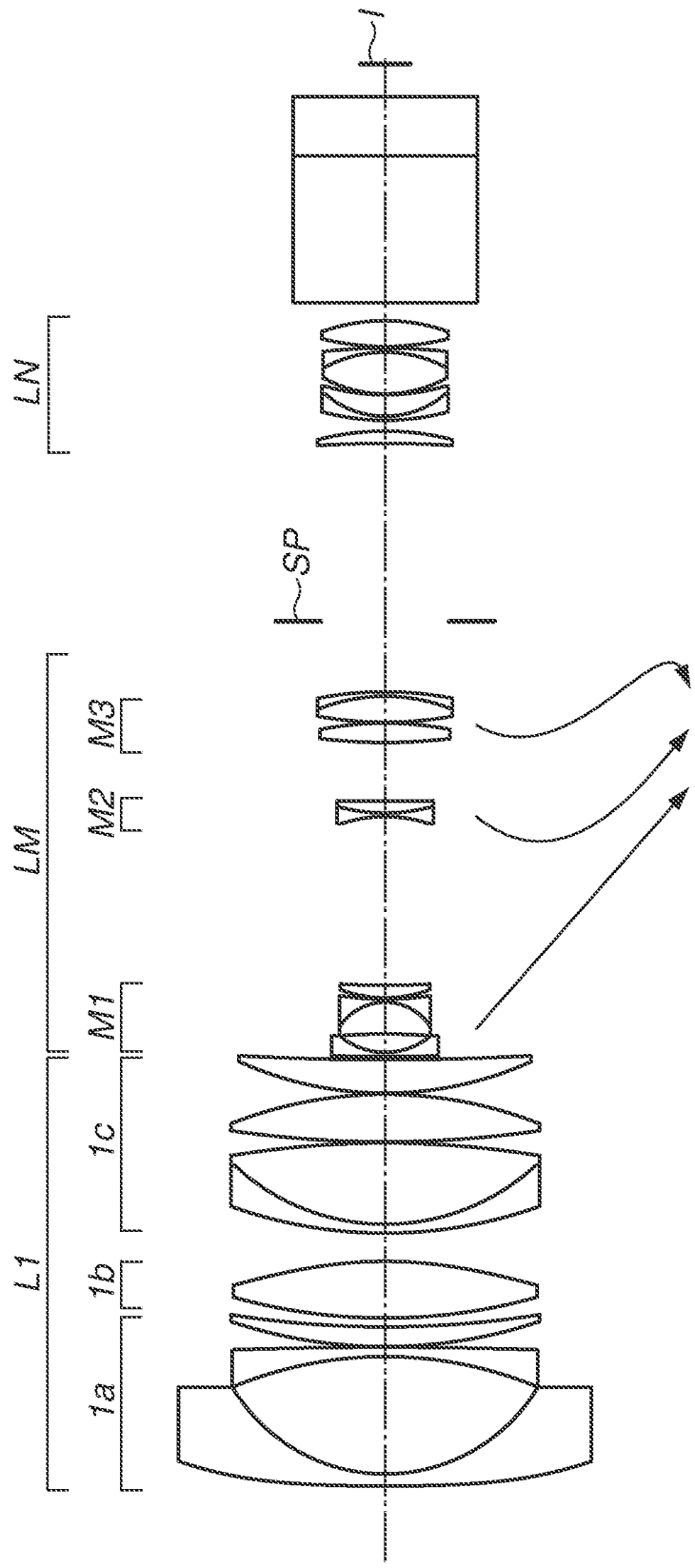

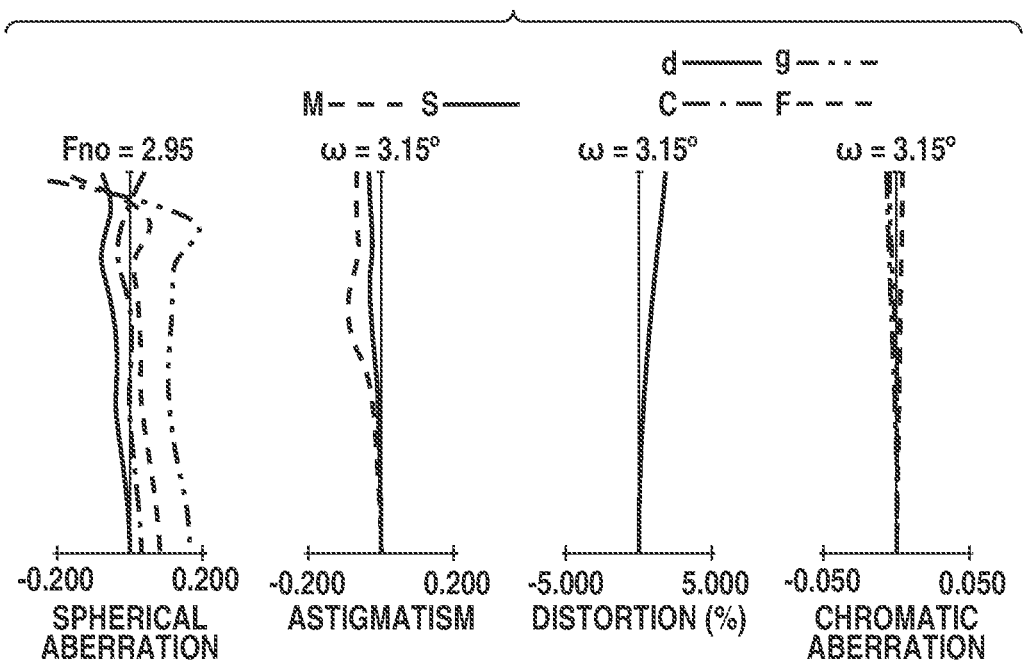

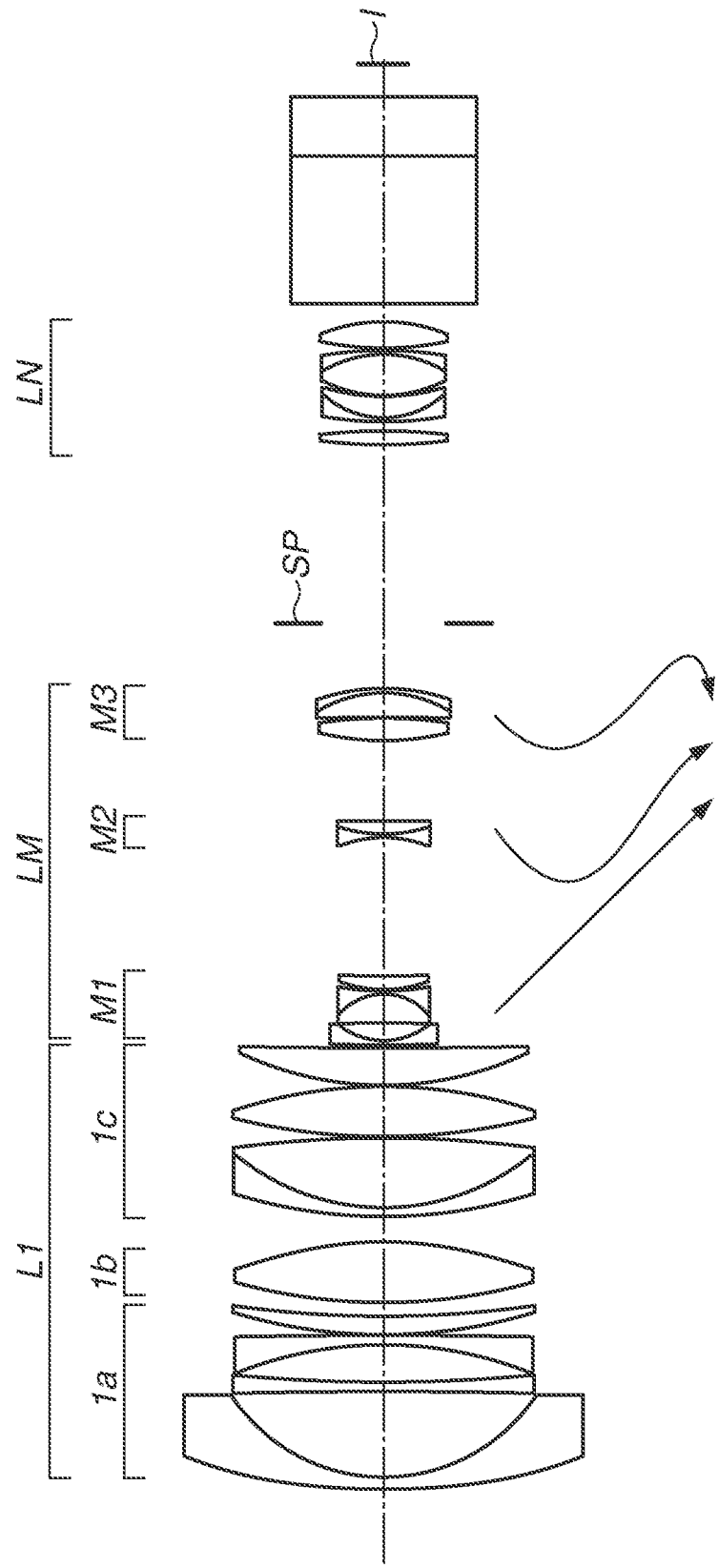

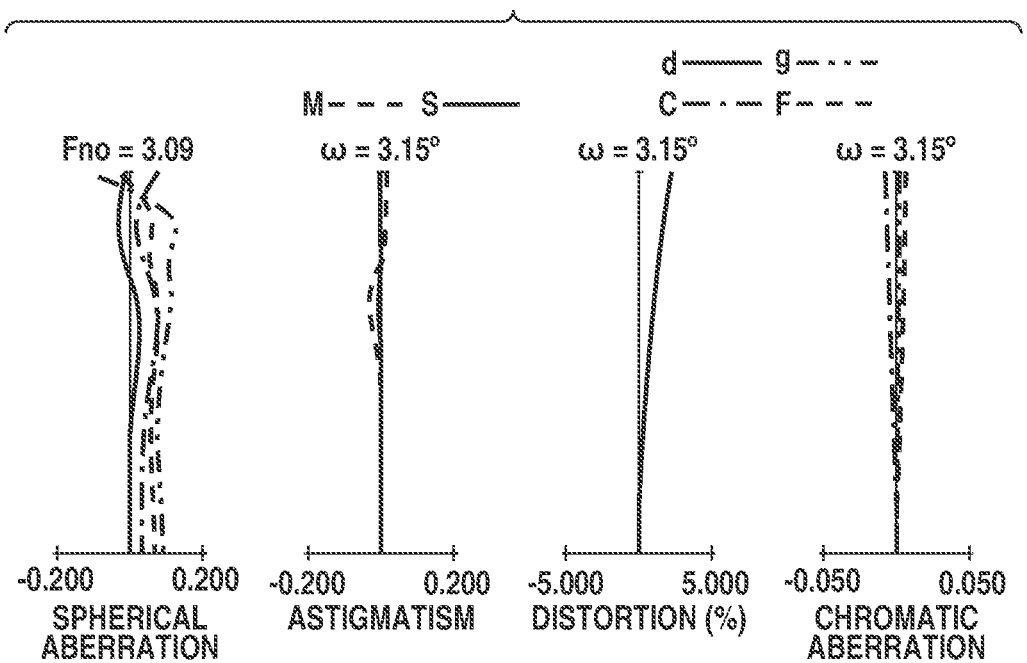

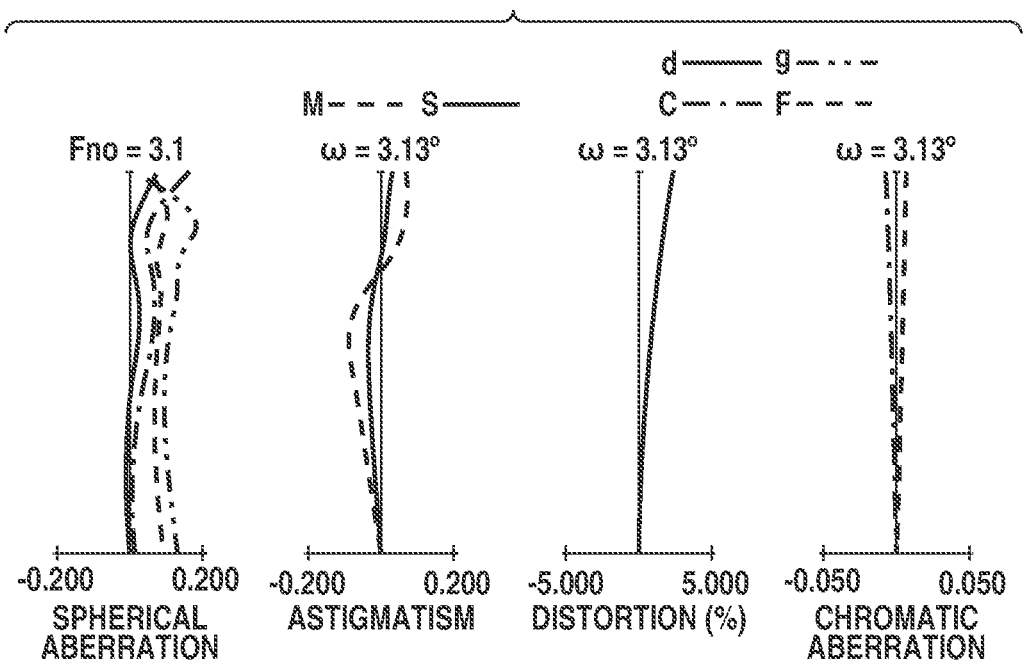

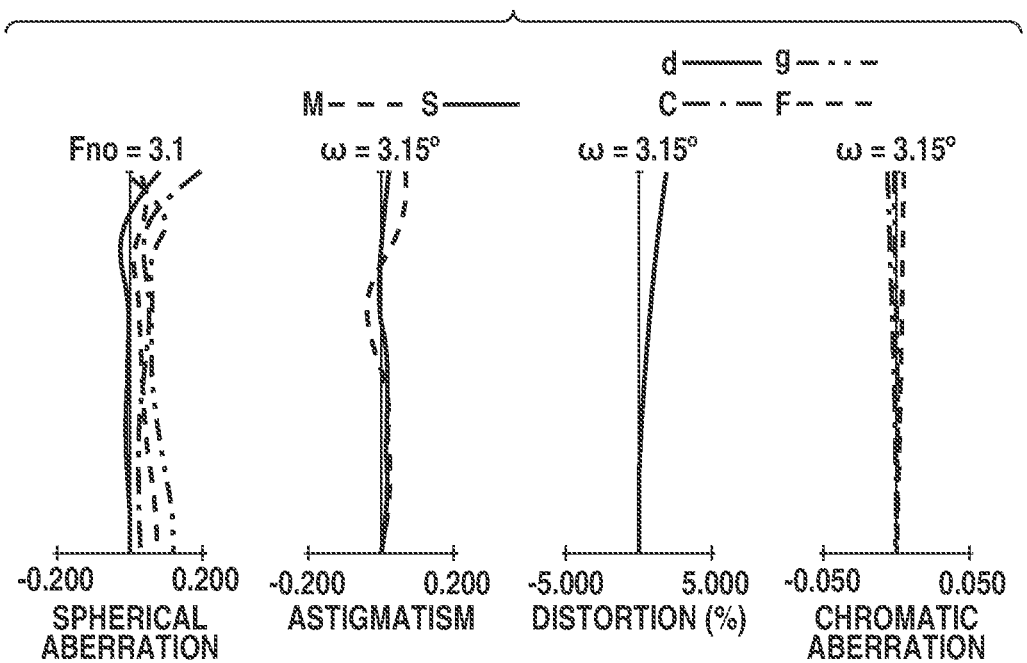

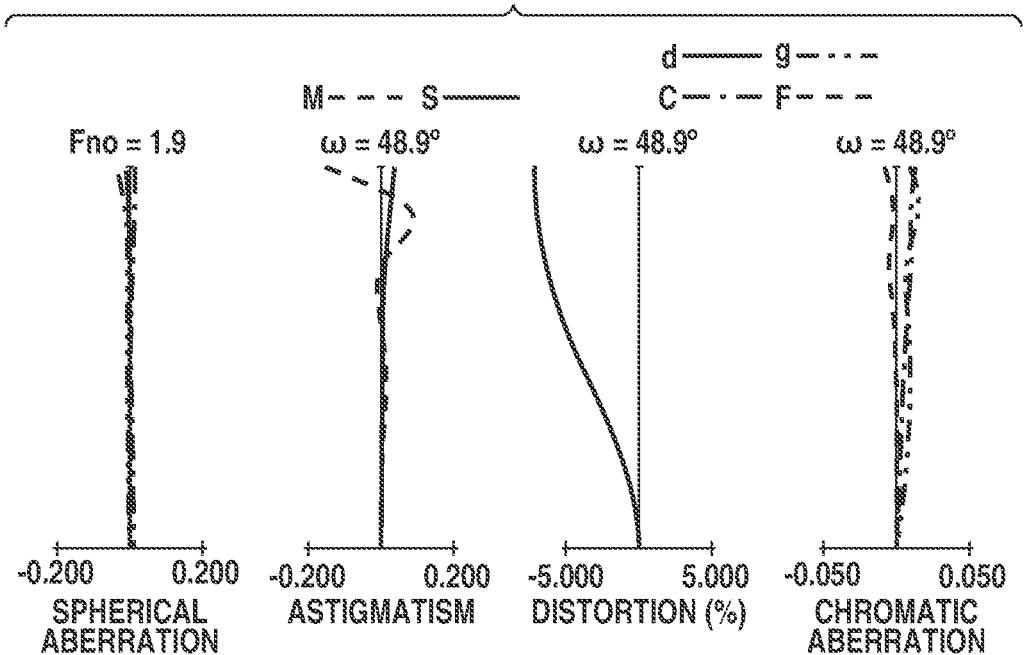
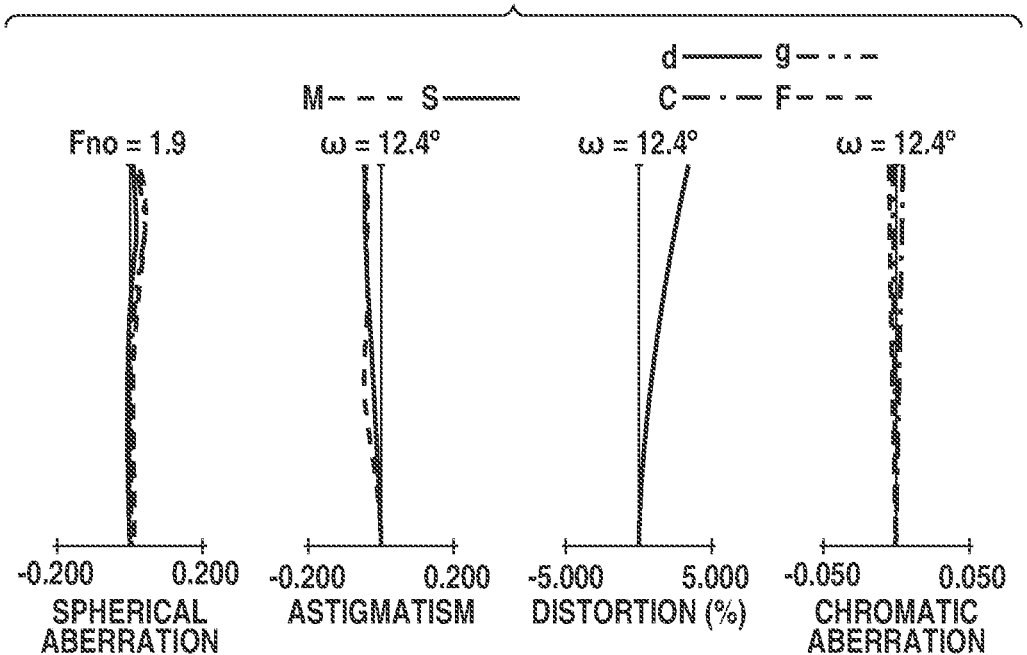

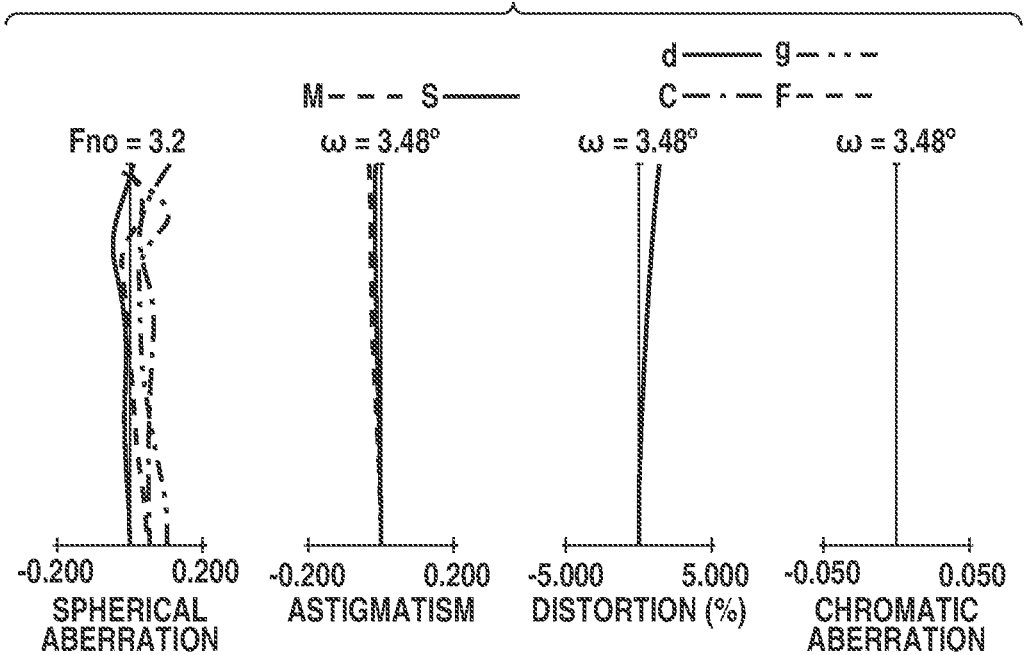

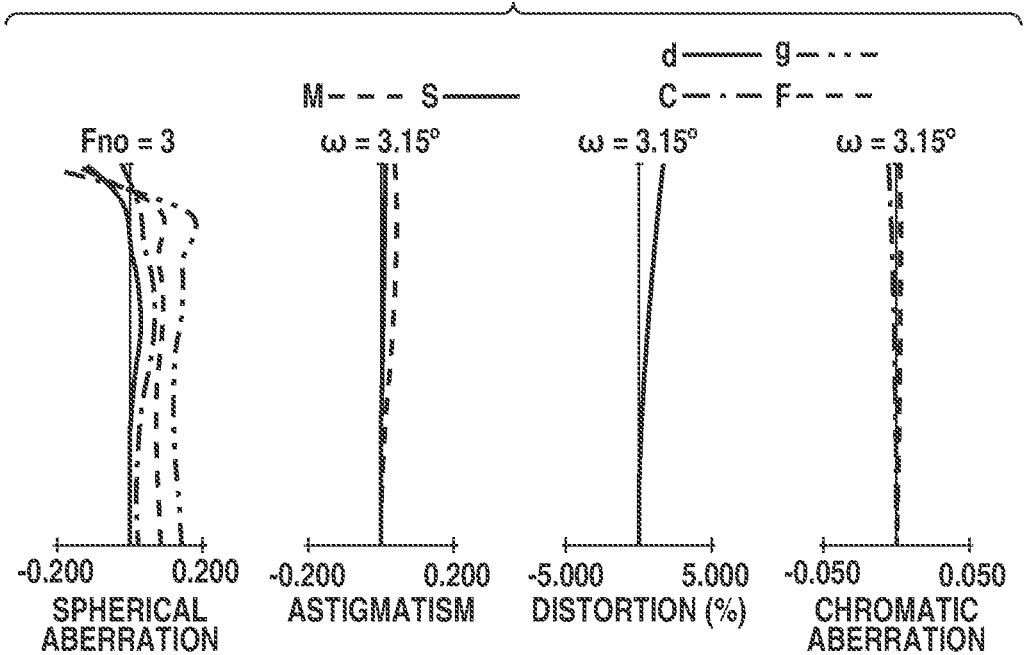

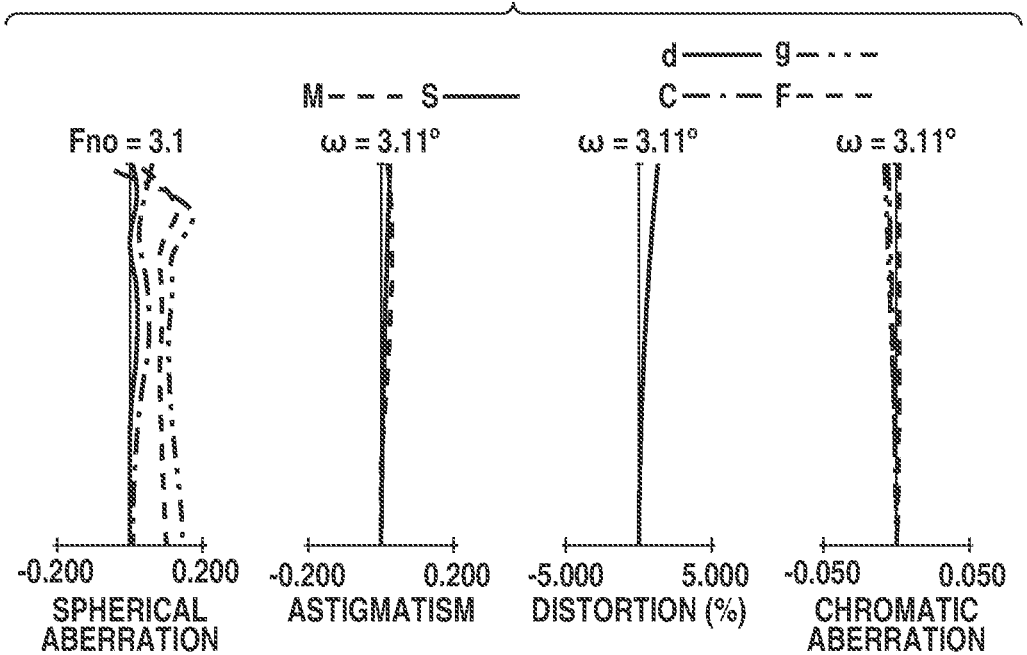

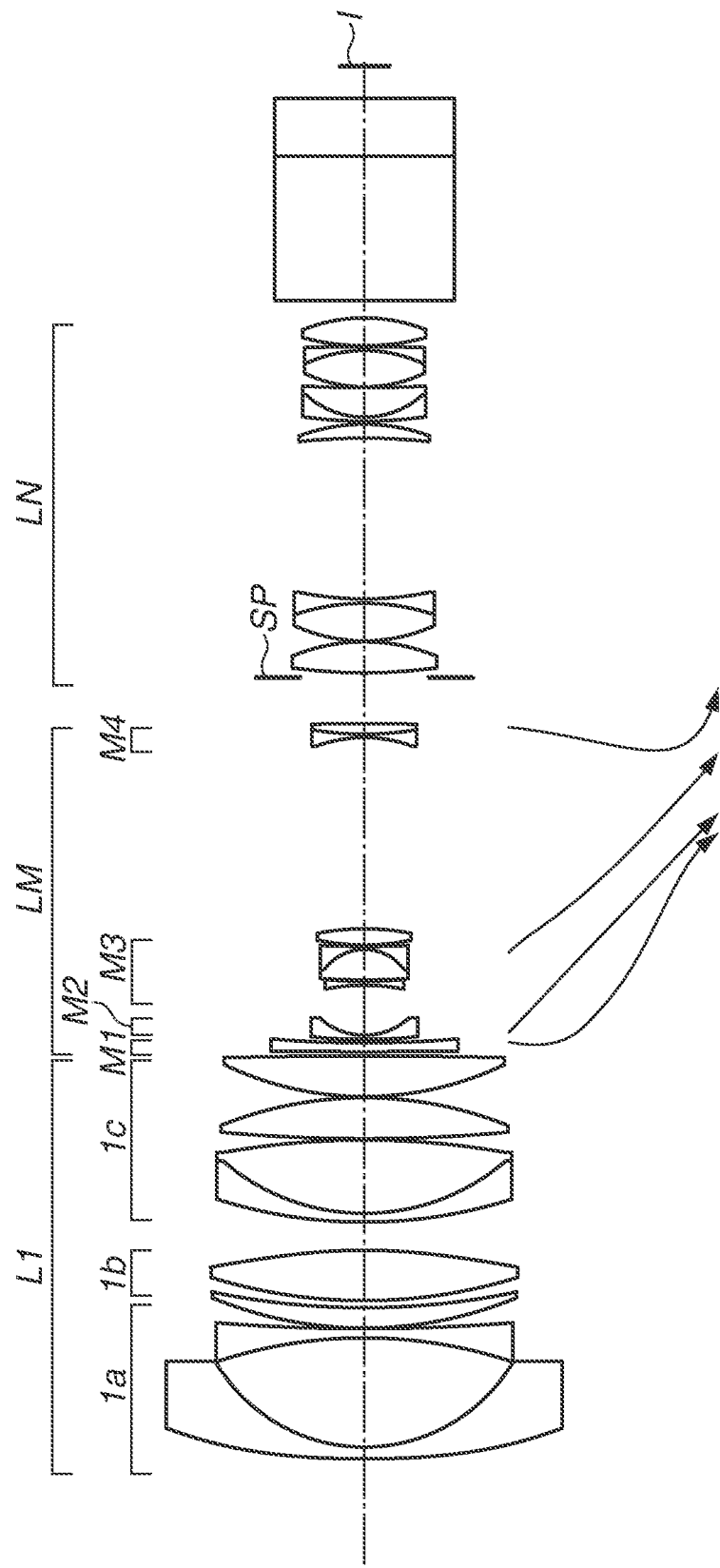

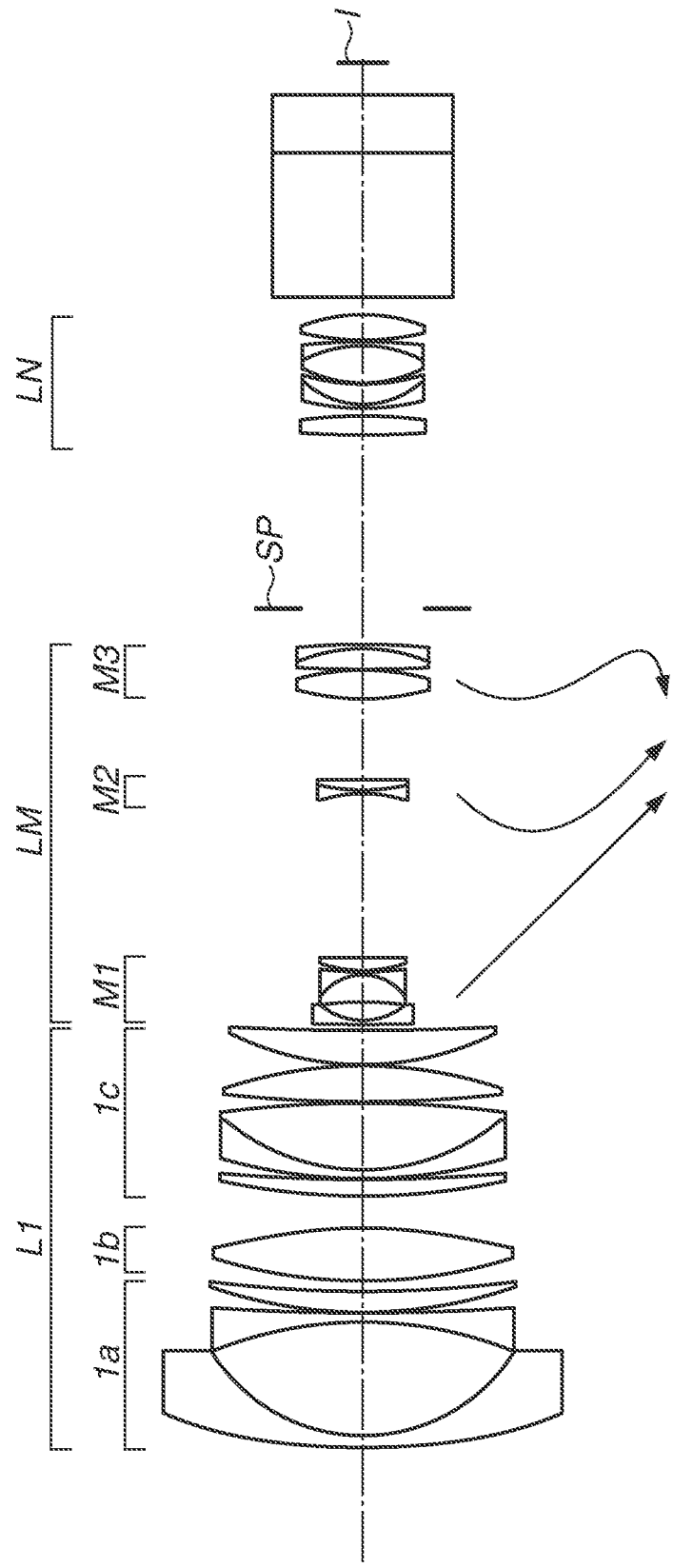

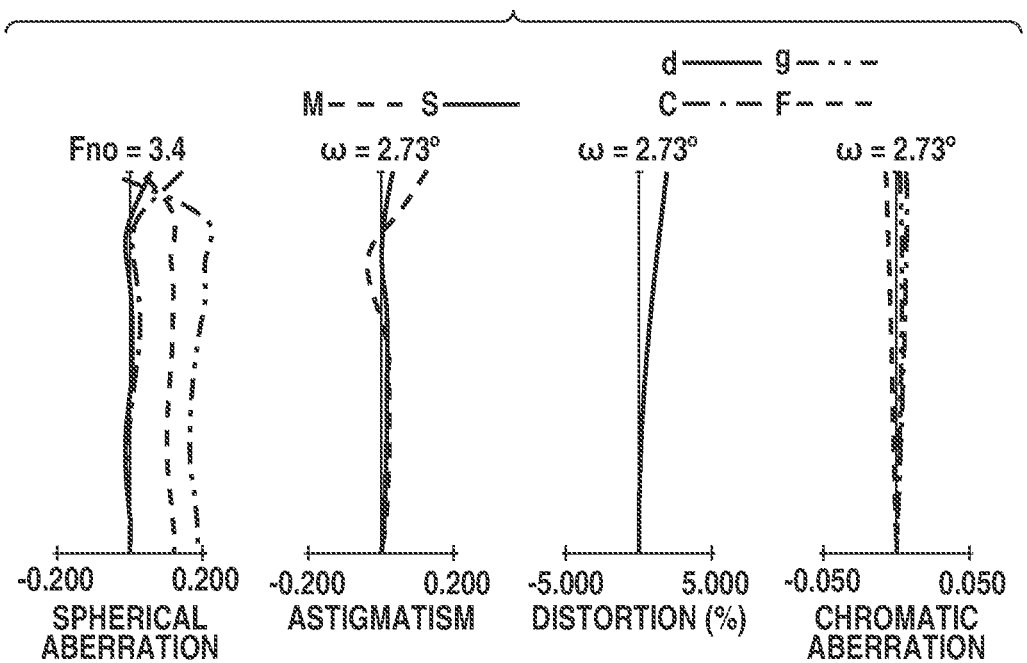

ZOOM LENS AND IMAGE PICKUP APPARATUS

BACKGROUND OF THE DISCLOSURE

Field of the Disclosure

An aspect of embodiments generally relates to a zoom lens and an image pickup apparatus.

Description of the Related Art

A zoom lens for use in an image pickup apparatus, such as a television camera, a movie camera, a digital still camera, or a video camera, is being demanded to be small in size and light in weight for high technical operations and have a wide angle of view, a high zoom ratio, and a high optical performance. Moreover, along with the use of an image sensor (also referred to as "an image pickup element") compatible with high resolutions, such as 4K resolution and 8K resolution, such a zoom lens is being requested to be high in resolving power from the center of an image plane up to the periphery of the image plane and have less chromatic aberration.

As such a zoom lens, there is known a zoom lens including, in order from an object side to an image side, a first lens unit with a positive refractive power, which does not move for variation of magnification (also referred to as "zooming"), a plurality of movable lens units, which moves in variation of magnification, and a rear lens unit with a positive refractive power, which does not move for variation of magnification, such as that discussed in Japanese Patent Application Laid-Open No. 2015-161693. The first lens unit includes a first lens subunit with a negative refractive power, a second lens subunit with a positive refractive power, and a third lens subunit with a positive refractive power, and the second lens subunit moves for adjustment of focus.

Japanese Patent Application Laid-Open No. 2015-161693 discusses a zoom lens having a half angle of view of about 46.6° at the wide-angle end and a zoom ratio of about 17.2. Increasing the angle of view or zoom ratio of the discussed zoom lens may result in an increase in diameter of the first lens unit and, thus, an increase in size of the zoom lens.

SUMMARY OF THE DISCLOSURE

An aspect of embodiments provides a zoom lens including, in order from an object side to an image side, a first lens unit having a positive refractive power configured not to move for zooming, two or more intermediate lens units configured to move in zooming, and a rear lens unit having a positive refractive power, wherein an interval between each pair of adjacent lens units changes in zooming, the first lens unit includes, in order from the object side to the image side, a first lens subunit having a negative refractive power and configured not to move for focusing, a second lens subunit having a positive refractive power and configured to move for focusing, and a third lens subunit having a positive refractive power, the zoom lens satisfies following inequalities:

$$1.655 \leq (f1+bok1)/f1 \leq 3.000, \text{ and}$$

$$2.370 \leq ft/f1 \leq 3.145,$$

where f1 denotes a focal length of the first lens unit, bok1 denotes a length on an optical axis from a last surface of the first lens unit to a rear principal point of the first lens unit, and ft denotes a focal length of the zoom lens at a telephoto end.

Further features of the disclosure will become apparent from the following description of exemplary embodiments with reference to the attached drawings.

BRIEF DESCRIPTION OF THE DRAWINGS

FIG. 1 is a sectional view of a zoom lens in a state of being set at the wide-angle end and at focusing on infinite distance according to Embodiment 1.

FIG. 2C is a diagram illustrating aberrations occurring in the zoom lens illustrated in FIG. 1 in a state of being set at focusing on infinite distance and at the telephoto end.

FIG. 3 is a sectional view of a zoom lens in a state of being set at the wide-angle end and at focusing on infinite distance according to Embodiment 2.

FIG. 4C is a diagram illustrating aberrations occurring in the zoom lens illustrated in FIG. 3 in a state of being set at focusing on infinite distance and at the telephoto end.

FIG. 6C is a diagram illustrating aberrations occurring in the zoom lens illustrated in FIG. 5 in a state of being set at focusing on infinite distance and at the telephoto end.

FIG. 8C is a diagram illustrating aberrations occurring in the zoom lens illustrated in FIG. 7 in a state of being set at focusing on infinite distance and at the telephoto end.

FIG. 10A is a diagram illustrating aberrations occurring in the zoom lens illustrated in FIG. 9 in a state of being set at focusing on infinite distance and at the wide-angle end, FIG.

10B is a diagram illustrating aberrations occurring in the zoom lens illustrated in FIG. 9 in a state of being set at focusing on infinite distance and in an intermediate zoom state, and FIG. 10C is a diagram illustrating aberrations occurring in the zoom lens illustrated in FIG. 9 in a state of being set at focusing on infinite distance and at the telephoto end.

FIG. 12C is a diagram illustrating aberrations occurring in the zoom lens illustrated in FIG. 11 in a state of being set at focusing on infinite distance and at the telephoto end.

FIG. 16C is a diagram illustrating aberrations occurring in the zoom lens illustrated in FIG. 15 in a state of being set at focusing on infinite distance and at the telephoto end.

FIG. 17 is a sectional view of a zoom lens in a state of being set at the wide-angle end and at focusing on infinite distance according to Embodiment 9.

FIG. 19 is a sectional view of a zoom lens in a state of being set at the wide-angle end and at focusing on infinite distance according to Embodiment 10.

FIG. 20C is a diagram illustrating aberrations occurring in the zoom lens illustrated in FIG. 19 in a state of being set at focusing on infinite distance and at the telephoto end.

DESCRIPTION OF THE EMBODIMENTS

Figure 2A:
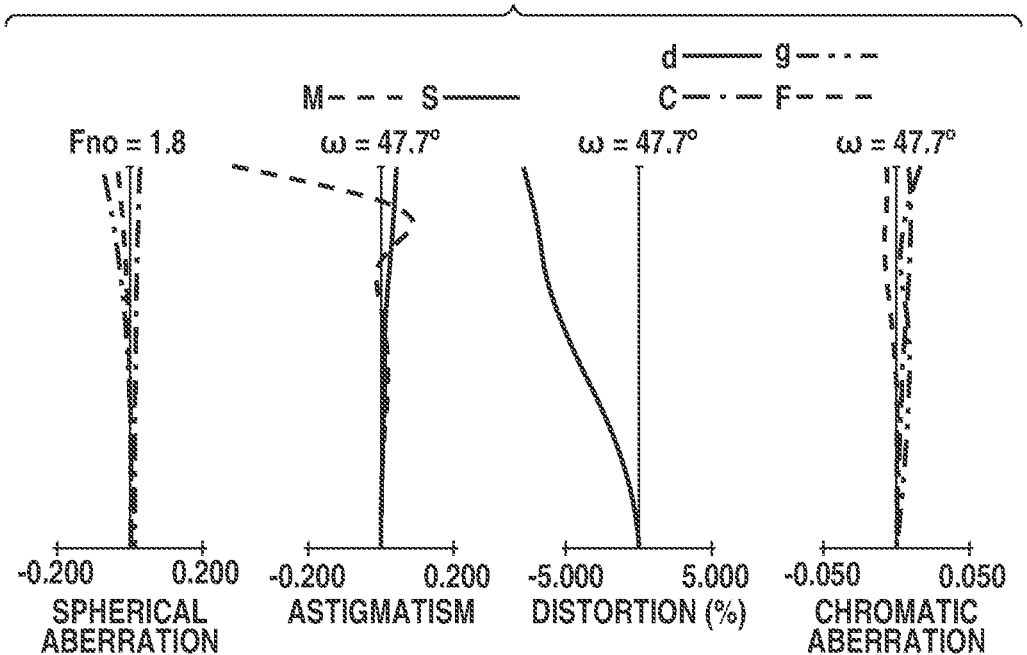
FIG. 2A is a diagram illustrating aberrations occurring in the zoom lens illustrated in FIG. 1 in a state of being set at focusing on infinite distance and at the wide-angle end.

Various exemplary embodiments, features, and aspects of the disclosure will be described in detail below with reference to the drawings. Furthermore, throughout all of the figures used for describing the exemplary embodiments, in principle (unless otherwise stated), for example, the same members are assigned the respective same reference characters, and any repetitive description thereof is omitted.

Figure 2B:
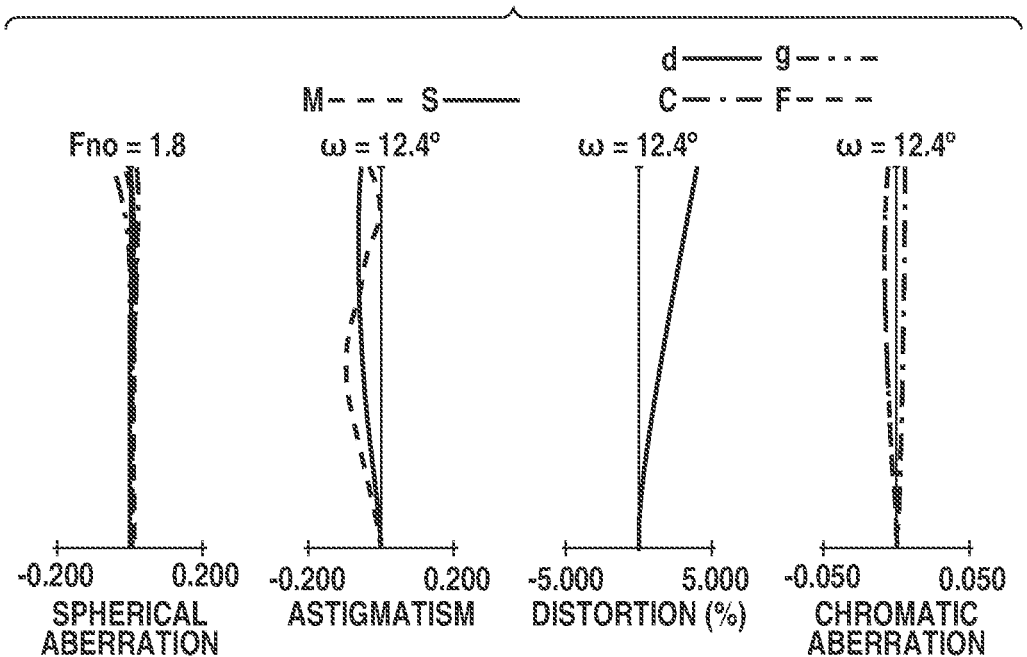
FIG. 2B is a diagram illustrating aberrations occurring in the zoom lens illustrated in FIG. 1 in a state of being set at focusing on infinite distance and in an intermediate zoom state.

FIG. 1 is a sectional view of a zoom lens in a state of being set at the wide-angle end and at focusing on infinite distance (an infinite focusing state) according to Embodiment 1 described below. FIG. 2A is a diagram illustrating aberrations occurring in the zoom lens illustrated in FIG. 1 in a state of being set at focusing on infinite distance and at the wide-angle end, FIG. 2B is a diagram illustrating aberrations occurring in the zoom lens illustrated in FIG. 1 in a state of being set at focusing on infinite distance and in an intermediate zoom state, and FIG. 2C is a diagram illustrating aberrations occurring in the zoom lens illustrated in FIG. 1 in a state of being set at focusing on infinite distance and at the telephoto end (with regard to the respective focal lengths, refer to Numerical Embodiment 1 described below). In the figures illustrating aberrations, a solid line, a dashed-two dotted line, a dashed-dotted line, and a dashed line in spherical aberration correspond to d-line (587.6 nanometers (nm) in wavelength), g-line (435.8 nm in wavelength), C-line (656.3 nm in wavelength), and F-line (486.1 nm in wavelength), respectively. A dashed line and a solid line in astigmatism correspond to a meridional image plane and a sagittal image plane, respectively. Distortion corresponds to d-line. A solid line, a dashed-two dotted line, a dashed-dotted line, and a dashed line in lateral chromatic aberration (chromatic aberration of magnification) correspond to d-line, g-line, C-line, and F-line, respectively. "Fno" denotes F-number, and "ω" denotes a half angle of view. Spherical aberration is illustrated with a full scale in the horizontal axis set to ±0.200 millimeters (mm). Astigmatism is illustrated with a full scale in the horizontal axis set to ±0.200 mm Distortion is illustrated with a full scale in the horizontal axis set to ±5.000%. Lateral chromatic aberration is illustrated with a full scale in the horizontal axis set to ±0.050 mm.

Referring to FIG. 1, components of the zoom lens are described in order from an object side to an image side. The zoom lens includes a first lens unit L1 with a positive refractive power, which does not move for variation of magnification. The first lens unit L1 includes a first lens subunit 1a, which does not move for adjustment of focus (also referred to as "focusing"). The first lens unit L1 further includes a second lens subunit 1b, which moves toward the image side for adjustment of focus (focusing) from an infinite-distance object to a minimum-distance object. The first lens unit L1 further includes a third lens subunit 1c, which does not move for adjustment of focus. The zoom lens further includes two or more intermediate lens units LM, which move in variation of magnification and include a first intermediate lens unit M1 with a negative refractive power, a second intermediate lens unit M2 with a negative refractive power, and a third intermediate lens unit M3 with a positive refractive power. The first intermediate lens unit M1 has a negative refractive power and monotonously moves on an optical axis toward the image side for variation of magnification (zooming) from the wide-angle end to the telephoto end. The second intermediate lens unit M2 has a negative refractive power and moves on the optical axis along a locus convex toward the object side for variation of magnification from the wide-angle end to the telephoto end. The third intermediate lens unit M3 has a positive refractive power and moves on the optical axis (for example, non-monotonously as illustrated) for variation of magnification from the wide-angle end to the telephoto end. The zoom lens further includes an aperture stop SP, which does not move in variation of magnification. The zoom lens further includes a rear lens unit LN with a positive refractive power, which does not move for variation of magnification. An image plane I is a plane on which the zoom lens forms an image, which is picked up (captured) by an image pickup element. In the zoom lens, an interval between each pair of adjacent lens units changes in variation of magnification.

A zoom lens according to a first exemplary embodiment includes, in order from an object side to an image side, a first lens unit with a positive refractive power, which does not move for variation of magnification, two or more intermediate lens units, which move in variation of magnification, and a rear lens unit with a positive refractive power. In the zoom lens, an interval between each pair of adjacent lens units changes in variation of magnification. The first lens unit includes, in order from the object side to the image side, a first lens subunit with a negative refractive power, which does not move for adjustment of focus, a second lens subunit with a positive refractive power, which moves for adjustment of focus, and a third lens subunit with a positive refractive power. A focal length of the first lens unit is denoted by f1, a length (distance) on the optical axis from the last surface (a surface on a most image side) of the first lens unit to a rear principal point of the first lens unit is denoted by bok1, and a focal length of the zoom lens at the telephoto end is denoted by ft. Then, the zoom lens satisfies following inequalities:

$$1.655 \leq (f1+bok1)/f1 \leq 3.000 \tag{1}$$

$$2.370 \leq ft/f1 \leq 3.145 \tag{2}$$

Moreover, a zoom lens according to a second exemplary embodiment includes, in order from an object side to an image side, a first lens unit with a positive refractive power, which does not move for variation of magnification, two or more intermediate lens units, which move in variation of magnification, and a rear lens unit with a positive refractive power. In the zoom lens, an interval between each pair of adjacent lens units changes in variation of magnification. The first lens unit includes, in order from the object side to the image side, a first lens subunit with a negative refractive power, which does not move for adjustment of focus, a second lens subunit with a positive refractive power, which moves for adjustment of focus, and a third lens subunit with a positive refractive power. A focal length of the first lens unit is denoted by f1, a length on an optical axis from the last surface of the first lens unit to a rear principal point of the first lens unit is denoted by bok1, a focal length of the zoom lens at a telephoto end is denoted by ft, and a focal length of the zoom lens at a wide-angle end is dented by fw. Then, the zoom lens satisfies following inequalities:

$$1.655 \leq (f1+bok1)/f1 \leq 3.000 \tag{1}$$

$$1.810 \leq ft/f1 \leq 6.300 \tag{2}$$

$$15.0 \leq ft/fw \leq 35.0 \tag{3}$$

Moreover, a zoom lens according to a third exemplary embodiment includes, in order from an object side to an image side, a first lens unit with a positive refractive power, which does not move for variation of magnification, two or more intermediate lens units, which move in variation of magnification, and a rear lens unit with a positive refractive power. In the zoom lens, an interval between each pair of adjacent lens units changes in variation of magnification. The first lens unit includes, in order from the object side to the image side, a first lens subunit with a negative refractive power, which does not move for adjustment of focus, a second lens subunit with a positive refractive power, which moves for adjustment of focus, and a third lens subunit with a positive refractive power. A focal length of the first lens unit is denoted by f1, a length on an optical axis from the last surface of the first lens unit to a rear principal point of the first lens unit is denoted by bok1, a focal length of the zoom lens at a telephoto end is denoted by ft, and a focal length of the zoom lens at a wide-angle end is dented by fw. Then, the zoom lens satisfies following inequalities:

$$1.000 \leq (f1+bok1)/f1 \leq 3.000 \tag{1-2}$$

$$1.810 \leq ft/f1 \leq 6.300 \tag{2-2}$$

$$15.0 \leq ft/fw \leq 35.0 \tag{3}$$

$$0.00 \leq ((f1+bok1)/f1) \times 11 + (ft/f1) \times 2.2 - 24 \tag{4}$$

Moreover, a zoom lens according to a fourth exemplary embodiment includes, in order from an object side to an image side, a first lens unit with a positive refractive power, which does not move for variation of magnification, two or more intermediate lens units, which move in variation of magnification, and a rear lens unit with a positive refractive power. In the zoom lens, an interval between each pair of adjacent lens units changes in variation of magnification. The first lens unit includes, in order from the object side to the image side, a first lens subunit with a negative refractive power, which does not move for adjustment of focus, a second lens subunit with a positive refractive power, which moves for adjustment of focus, and a third lens subunit with a positive refractive power. A focal length, at focusing on infinite distance and at a wide-angle end, of a lens aggregate 1w including the first lens unit to a lens unit adjacent, on the object side, to an intermediate lens unit with a negative refractive power included in the two or more intermediate lens units and located on a most object side is denoted by f1w. Moreover, a length on an optical axis from the last surface of the lens aggregate 1w at focusing on infinite distance and at the wide-angle end to a rear principal point of the lens aggregate 1w is denoted by bok1w. Moreover, a focal length of the zoom lens at a telephoto end is denoted by ft, and a focal length of the zoom lens at the wide-angle end is dented by fw. Then, the zoom lens satisfies following inequalities:

$$1.000 \leq (f1w+bok1w)/f1w \leq 3.000 \tag{5}$$

$$1.810 \leq ft/f1w \leq 6.300 \tag{6}$$

$$15.0 \leq ft/fw \leq 35.0 \tag{3}$$

$$0.00 \leq ((f1w+bok1w)/f1w) \times 11 + (ft/f1w) \times 2.2 - 24 \tag{7}$$

Here, technical significances of the above-mentioned inequalities are described. The conditional expression (1) or (1-2) defines a condition for attaining a zoom lens having a wide angle of view and reduced in size and weight. The term "(f1+bok1)/f1" is a retrofocus ratio (also referred to as a "retro ratio") of the first lens unit, and increasing the retrofocus ratio provides an advantage for attaining a zoom lens having a wide angle of view but, on the other hand, leads to an increase in the diameter of the third lens subunit or an increase in the number of lenses included in the first lens unit. If the conditional expression (1) or (1-2) is not satisfied with regard to the upper limit value thereof, the retrofocus ratio of the first lens unit becomes excessively large and, therefore, the diameter of the third lens subunit increases, thus providing a disadvantage for attaining a zoom lens reduced in size and weight. Moreover, the number of lenses included in the first lens unit increases, thus also providing a disadvantage for attaining a zoom lens reduced in size and weight. If the conditional expression (1) or (1-2) is not satisfied with regard to the lower limit value thereof, the retrofocus ratio of the first lens unit becomes excessively small and, therefore, it becomes difficult to attain a zoom lens having a wide angle of view. Moreover, the diameter of a lens located on a most object side included in the first lens unit increases, thus providing a disadvantage for attaining a zoom lens reduced in size and weight.

The inequality (2) or (2-2) defines a condition for obtaining a zoom lens with a high zoom ratio, a reduced size and weight, and a high optical performance Increasing the term "ft/f1" provides an advantage for attaining a telephoto (high zoom ratio) zoom lens but, on the other hand, since aberrations caused by the first lens unit are enlarged at the telephoto end, it becomes difficult to keep aberrations within an acceptable range thereof. If the inequality (2) or (2-2) is not satisfied with regard to the upper limit value thereof, the focal length of the first lens unit becomes excessively short, so that it becomes difficult to keep aberrations caused by the first lens unit at the telephoto end within an acceptable range thereof. Alternatively, the number of lenses included in the first lens unit becomes excessively large, thus providing a disadvantage for attaining a zoom lens reduced in size and weight. If the inequality (2) or (2-2) is not satisfied with regard to the lower limit value thereof, the focal length of the first lens unit becomes excessively long, so that it becomes difficult to attain a telephoto (high zoom ratio) zoom lens. Alternatively, the amount of movement of the intermediate lens units becomes excessively large, thus providing a disadvantage for attaining a zoom lens reduced in size and weight.

The inequality (3) defines a condition for attaining a zoom lens with a high zoom ratio and a high optical performance. If the inequality (3) is not satisfied with regard to the upper limit value thereof, aberrations caused by the first lens unit or the intermediate lens units at the wide-angle end or at the telephoto end become excessively large, so that it becomes difficult to attain a zoom lens with a high optical performance. If the inequality (3) is not satisfied with regard to the lower limit value thereof, it becomes difficult to attain a zoom lens with a high zoom ratio.

The inequality (4) defines a condition using a linear inequality concerning the above-mentioned retrofocus ratio (if large, advantageous for a zoom lens having a wide angle of view) in the inequality (1) or (1-2) and the term "ft/f1" (if large, advantageous for a telephoto zoom lens) in the inequality (2). A wide-angle setting and a telephoto setting have a relationship of trade-off relative to each other in attaining a zoom lens reduced in size and weight. More specifically, in attaining a zoom lens reduced in size and weight, there is a tendency that, if the retrofocus ratio is set larger, the term "ft/f1" is forced to be decreased and, if the term "ft/f1" is set larger, the retrofocus ratio is forced to be decreased. A linear equation related to the linear inequality (an equation obtained by replacing "≤" in the inequality (4) with "=") represents the above-mentioned tendency. In the zoom lens according to the present exemplary embodiment, among the retrofocus ratio and the term "ft/f1", the retrofocus ratio has a larger influence on an increase in size than the term "ft/f1". The retrofocus ratio of the first lens unit is also expressed as "1+(bok1/f1)" and is determined almost by the ratio of the length bok1 to the focal length f1. On the other hand, the term "ft/f1" is the ratio of the focal length ft to the focal length f1. For example, in Embodiment 3 described below, the length bok1 is about "20", and the focal length ft is about "100". In a zoom lens having a wide angle of view and a high zoom ratio such as that in the present exemplary embodiment, to make the retrofocus ratio and the term "ft/f1" unvarying while increasing the focal length f1 by a specific amount for miniaturization of the zoom lens, the increased amount of the focal length ft becomes about five times the increased amount of the length bok1. Thus, this means that, among the retrofocus ratio and the term "ft/f1", the retrofocus ratio has a larger influence on an increase in size than the term "ft/f1" by about five times. Therefore, the inequality (4) defines a condition for achieving a balance between the retrofocus ratio and the term "ft/f1". If the inequality (4) is not satisfied with regard to the lower limit thereof, in attaining a zoom lens reduced in size and weight, it becomes difficult to attain at least one of a wide-angle setting and a telephoto setting (high zoom ratio). Furthermore, the above-mentioned tendency, i.e., the above-mentioned linear equation (coefficients "11", "2.2", and "−24" thereof) is associated with a zoom lens reduced in size and weight with a half angle of view (ωw) of 43.0° to 50.0° and a zoom ratio (Z=ft/fw) of 15.0 to 35.0. The ratio "5" of the coefficient "11" to the coefficient "2.2" (=11/2.2) is a mirror to the retrofocus ratio having a larger influence on an increase in size than the term "ft/f1" by about five times. Moreover, the absolute values of coefficients (11, 2.2, and −24) are adapted to the respective ranges of absolute values of the half angle of view and zoom ratio as mentioned above.

The inequality (5) defines a condition for attaining a zoom lens having a wide angle of view and reduced in size and weight. The term "(f1w+bok1w)/f1 w" is a retrofocus ratio of the lens aggregate 1w at focusing on infinite distance and at the wide-angle end, and increasing the retrofocus ratio provides an advantage for attaining a zoom lens having a wide angle of view but, on the other hand, leads to an increase in the diameter of the third lens subunit or an increase in the number of lenses included in the lens aggregate 1w. If the conditional expression (5) is not satisfied with regard to the upper limit value thereof, the retrofocus ratio of the lens aggregate 1w becomes excessively large and, therefore, the diameter of the third lens subunit increases, thus providing a disadvantage for attaining a zoom lens reduced in size and weight. Moreover, the number of lenses included in the lens aggregate 1w increases, thus also providing a disadvantage for attaining a zoom lens reduced in size and weight. If the inequality (5) is not satisfied with regard to the lower limit value thereof, the retrofocus ratio of the lens aggregate 1w becomes excessively small and, therefore, it becomes difficult to attain a zoom lens having a wide angle of view. Moreover, the diameter of a lens located on a most object side included in the lens aggregate 1w increases, thus providing a disadvantage for attaining a zoom lens reduced in size and weight.

The inequality (6) defines a condition for obtaining a zoom lens with a high zoom ratio, a reduced size and weight, and a high optical performance. Increasing the term "ft/f1w" provides an advantage for attaining a telephoto (high zoom ratio) zoom lens but, on the other hand, since aberrations caused by the lens aggregate 1w are enlarged at the telephoto end, it becomes difficult to keep aberrations within an acceptable range thereof. If the inequality (6) is not satisfied with regard to the upper limit value thereof, the focal length of the lens aggregate 1w becomes excessively short, so that it becomes difficult to keep aberrations caused by the lens aggregate 1w at the telephoto end within an acceptable range thereof. Alternatively, the number of lenses included in the lens aggregate 1w becomes excessively large, thus providing a disadvantage for attaining a zoom lens reduced in size and weight. If the inequality (6) is not satisfied with regard to the lower limit value thereof, the focal length of the lens aggregate 1w becomes excessively long, so that it becomes difficult to attain a telephoto (high zoom ratio) zoom lens. Alternatively, the amount of movement of the intermediate lens units becomes excessively large, thus providing a disadvantage for attaining a zoom lens reduced in size and weight.

The inequality (7) defines a condition using a linear inequality concerning the above-mentioned retrofocus ratio (if large, advantageous for a zoom lens having a wide angle of view) in the inequality (5) and the term "ft/f1w" (if large, advantageous for a telephoto zoom lens) in the inequality (6). A wide-angle setting and a telephoto setting have a relationship of trade-off relative to each other in attaining a zoom lens reduced in size and weight. More specifically, in attaining a zoom lens reduced in size and weight, there is a tendency that, if the retrofocus ratio is set larger, the term "ft/f1w" is forced to be decreased and, if the term "ft/f1w" is set larger, the retrofocus ratio is forced to be decreased. A linear equation related to the linear inequality (an equation obtained by replacing "≤" in the inequality (7) with "=") represents the above-mentioned tendency. In the zoom lens according to the present exemplary embodiment, among the retrofocus ratio and the term "ft/f1w", the retrofocus ratio has a larger influence on an increase in size than the term "ft/f1w". The retrofocus ratio of the lens aggregate 1w is also expressed as "1+(bok1w/f1w)" and is determined almost by the ratio of the length bok1w to the focal length f1w. On the other hand, the term "ft/f1w" is the ratio of the focal length ft to the focal length f1w. For example, in Embodiment 3 described below, the length bok1w is about "20", and the focal length ft is about "100". In a zoom lens having a wide angle of view and a high zoom ratio such as that in the present exemplary embodiment, to make the retrofocus ratio and the term "ft/f1w" unvarying while increasing the focal length f1w by a specific amount for miniaturization of the zoom lens, the increased amount of the focal length ft becomes about five times the increased amount of the length bok1w. Thus, this means that, among the retrofocus ratio and the term "ft/f1w", the retrofocus ratio has a larger influence on an increase in size than the term "ft/f1w" by about five times. Therefore, the inequality (7) defines a condition for achieving a balance between the retrofocus ratio and the term "ft/f1w". If the inequality (7) is not satisfied with regard to the lower limit thereof, in attaining a zoom lens reduced in size and weight, it becomes difficult to attain at least one of a wide-angle setting and a telephoto setting (high zoom ratio). Furthermore, the above-mentioned tendency, i.e., the above-mentioned linear equation (coefficients "11", "2.2", and "−24" thereof) is associated with a zoom lens reduced in size and weight with a half angle of view ($\omega w$) of 43.0° to 50.0° and a zoom ratio (Z=ft/fw) of 15.0 to 35.0. The ratio "5" of the coefficient "11" to the coefficient "2.2" (=11/2.2) is a mirror to the retrofocus ratio having a larger influence on an increase in size than the term "ft/f1w" by about five times. Moreover, the absolute values of coefficients (11, 2.2, and −24) are adapted to the respective ranges of absolute values of the half angle of view and zoom ratio as mentioned above.

Here, it is favorable that each of the zoom lenses according to the first to fourth exemplary embodiments is adapted for a camera with a diagonal image size of 2Y and satisfies a following inequality:

$$43.0° \leq \omega w \leq 50.0°  \quad (8),$$

where $\omega w$ denotes a half angle of view at the wide-angle end. Furthermore, the half angle of view $\omega w$ is assumed to be defined by a following equation:

$$\omega w = \arctan(Y/fw),$$

where fw denotes the focal length of the zoom lens at the wide-angle end. The inequality (8) defines a condition for attaining a zoom lens having a wide angle of view and reduced in size and weight. Satisfying the inequality (8) enables attaining a zoom lens having a wide angle of view irrespective of the format (size standard) of an image sensor included in an applicable camera. If the inequality (8) is not satisfied with regard to the upper limit value thereof, it becomes difficult to attain a zoom lens reduced in size and weight.

Moreover, it is favorable that each of the zoom lenses according to the first to fourth exemplary embodiments is adapted for a camera with a diagonal image size of 2Y and satisfies a following inequality:

$$1.50° \leq \omega t \leq 3.50°  \quad (9),$$

where $\omega t$ denotes a half angle of view of the zoom lens at the telephoto end. Furthermore, the half angle of view $\omega t$ is assumed to be defined by a following equation:

$$\omega t = \arctan(Y/ft),$$

where ft denotes the focal length of the zoom lens at the telephoto end. The inequality (9) defines a condition for attaining a zoom lens with a narrow angle of view and a reduced size and weight. Satisfying the inequality (9) enables attaining a narrow-angle (telephoto) zoom lens irrespective of the format (size standard) of an image sensor included in an applicable camera. If the inequality (9) is not satisfied with regard to the lower limit value thereof, it becomes difficult to attain a zoom lens reduced in size and weight.

Moreover, in each of the zoom lenses according to the first to third exemplary embodiments, the focal length of the first lens subunit is denoted by f1a, the focal length of the second lens subunit is denoted by f1b, and the focal length of the third lens subunit is denoted by f1c. Then, it is favorable that each of the zoom lenses according to the first to third exemplary embodiments further satisfies following inequalities (10) to (12):

$$-1.50 \leq f1a/f1 \leq -0.75 \quad (10)$$

$$2.00 \leq f1b/f1 \leq 4.40 \quad (11)$$

$$1.30 \leq f1c/f1 \leq 1.80 \quad (12)$$

Each of the inequalities (10) to (12) defines a condition for attaining a zoom lens with a high optical performance. If the inequality (10) is not satisfied, the focal length f1 of the first lens unit or the focal length f1a of the first lens subunit becomes excessively small, so that it becomes difficult to keep aberrations caused by the first lens unit or the first lens subunit within an acceptable range thereof. If the inequality (11) is not satisfied, the focal length f1 of the first lens unit or the focal length f1b of the second lens subunit becomes excessively small, so that it becomes difficult to keep aberrations caused by the first lens unit or the second lens subunit within an acceptable range thereof. If the inequality (12) is not satisfied, the focal length f1 of the first lens unit or the focal length f1c of the third lens subunit becomes excessively small, so that it becomes difficult to keep aberrations caused by the first lens unit or the third lens subunit within an acceptable range thereof.

Moreover, in the zoom lens according to the fourth exemplary embodiment, the focal length of the first lens subunit is denoted by f1a, the focal length of the second lens subunit is denoted by f1b, and the focal length of the third lens subunit is denoted by f1c. Then, it is favorable that the zoom lens according to the fourth exemplary embodiment further satisfies following inequalities (13) to (15):

$$-1.50 \leq f1a/f1w \leq -0.75 \quad (13)$$

$$2.00 \leq f1b/f1w \leq 4.40 \quad (14)$$

$$1.30 \leq f1c/f1w \leq 1.80 \quad (15)$$

Each of the inequalities (13) to (15) defines a condition for attaining a zoom lens with a high optical performance. If the inequality (13) is not satisfied, the focal length f1w of the lens aggregate 1w or the focal length f1a of the first lens subunit becomes excessively small, so that it becomes difficult to keep aberrations caused by the lens aggregate 1w or the first lens subunit within an acceptable range thereof. If the inequality (14) is not satisfied, the focal length f1w of the lens aggregate 1w or the focal length f1b of the second lens subunit becomes excessively small, so that it becomes difficult to keep aberrations caused by the lens aggregate 1w or the second lens subunit within an acceptable range thereof. If the inequality (15) is not satisfied, the focal length f1w of the lens aggregate 1w or the focal length f1c of the third lens subunit becomes excessively small, so that it becomes difficult to keep aberrations caused by the lens aggregate 1w or the third lens subunit within an acceptable range thereof.

Moreover, it is favorable that each of the zoom lenses according to the first to third exemplary embodiments further satisfies a following inequality:

$$4.70 \leq f1/fw \leq 20.00 \quad (16),$$

where f1 denotes the focal length of the first lens unit, and fw denotes the focal length of the zoom lens at the wide-angle end. The inequality (16) defines a condition for attaining a zoom lens with a wide angle, a reduced size and weight, and a high optical performance. If the inequality (16) is not satisfied with regard to the upper limit value thereof, the diameter of the first lens unit becomes large, so that it becomes difficult to attain a small zoom lens. If the inequality (16) is not satisfied with regard to the lower limit value thereof, it becomes difficult to attain a zoom lens having a wide angle of view or it becomes difficult to keep aberrations (for example, coma and curvature of field) occurring at the wide-angle end within an acceptable range thereof.

Moreover, in the zoom lens according to the fourth exemplary embodiment, the focal length (composite focal length) of the lens aggregate 1w at focusing on infinite distance and at the wide-angle end is denoted by f1w and the focal length of the zoom lens at the wide-angle end is denoted by fw. Then, it is favorable that the zoom lens according to the fourth exemplary embodiment further satisfies a following inequality:

$$4.70 \leq f1w/fw \leq 20.00 \quad (17)$$

The inequality (17) defines a condition for attaining a zoom lens with a wide angle of view, a reduced size and weight, and a high optical performance. If the inequality (17) is not satisfied with regard to the upper limit value thereof, the diameter of the lens aggregate 1w becomes large, so that it becomes difficult to attain a small zoom lens. If the inequality (17) is not satisfied with regard to the lower limit value thereof, it becomes difficult to attain a zoom lens having a wide angle of view or it becomes difficult to keep aberrations (for example, coma and curvature of field) occurring at the wide-angle end within an acceptable range thereof.

Moreover, it is favorable that each of the zoom lenses according to the first to fourth exemplary embodiments further satisfies a following inequality:

$$1.30 \leq Fnow \leq 3.50 \quad (18),$$

where Fnow denotes the F-number of the zoom lens at the wide-angle end. The inequality (18) defines a condition for attaining a fast zoom lens. If the inequality (18) is not satisfied with regard to the lower limit value thereof, it becomes difficult to keep aberrations (for example, spherical aberration and astigmatism) occurring at the wide-angle end within an acceptable range thereof. Alternatively, to attain a high optical performance, each lens unit becomes excessively large, so that it becomes difficult to attain a zoom lens reduced in size and weight.

Moreover, it is favorable that each of the zoom lenses according to the first to fourth exemplary embodiments further satisfies a following inequality:

$$1.75 \leq nd1n \leq 2.00 \quad (19),$$

where nd1n denotes the average value of refractive indices with respect to d-line (587.6 nm in wavelength) of negative lenses included in the first lens unit. The inequality (19) defines a condition for attaining a zoom lens with a reduced size and weight and a high optical performance. If the inequality (19) is not satisfied with regard to the upper limit value thereof, since an optical material (glass material) with a high refractive index tends to be large in specific gravity, it becomes difficult to form the first lens unit as a light weight lens unit. If the inequality (19) is not satisfied with regard to the lower limit value thereof, the refractive indices become excessively small, so that it becomes difficult to keep aberrations within an acceptable range thereof.

Moreover, in each of the zoom lenses according to the first to fourth exemplary embodiments, it is favorable that the first lens subunit includes a positive lens L1$ap$ and the third lens subunit includes a negative lens L1$cn$. An abbe number with respect to d-line of the positive lens L1$ap$ is denoted by $\nu d1ap$, and an abbe number with respect to d-line of the negative lens L1$cn$ is denoted by $\nu d1cn$. Then, it is favorable that each of the zoom lenses according to the first to fourth exemplary embodiments further satisfies following inequalities (20) to (22):

$$17.0 \leq \nu d1ap \leq 35.0 \quad (20)$$

$$20.0 \leq \nu d1cn \leq 50.0 \quad (21)$$

$$5.0 \leq \nu d1cn - \nu d1ap \leq 20.0 \quad (22)$$

Figure 24:
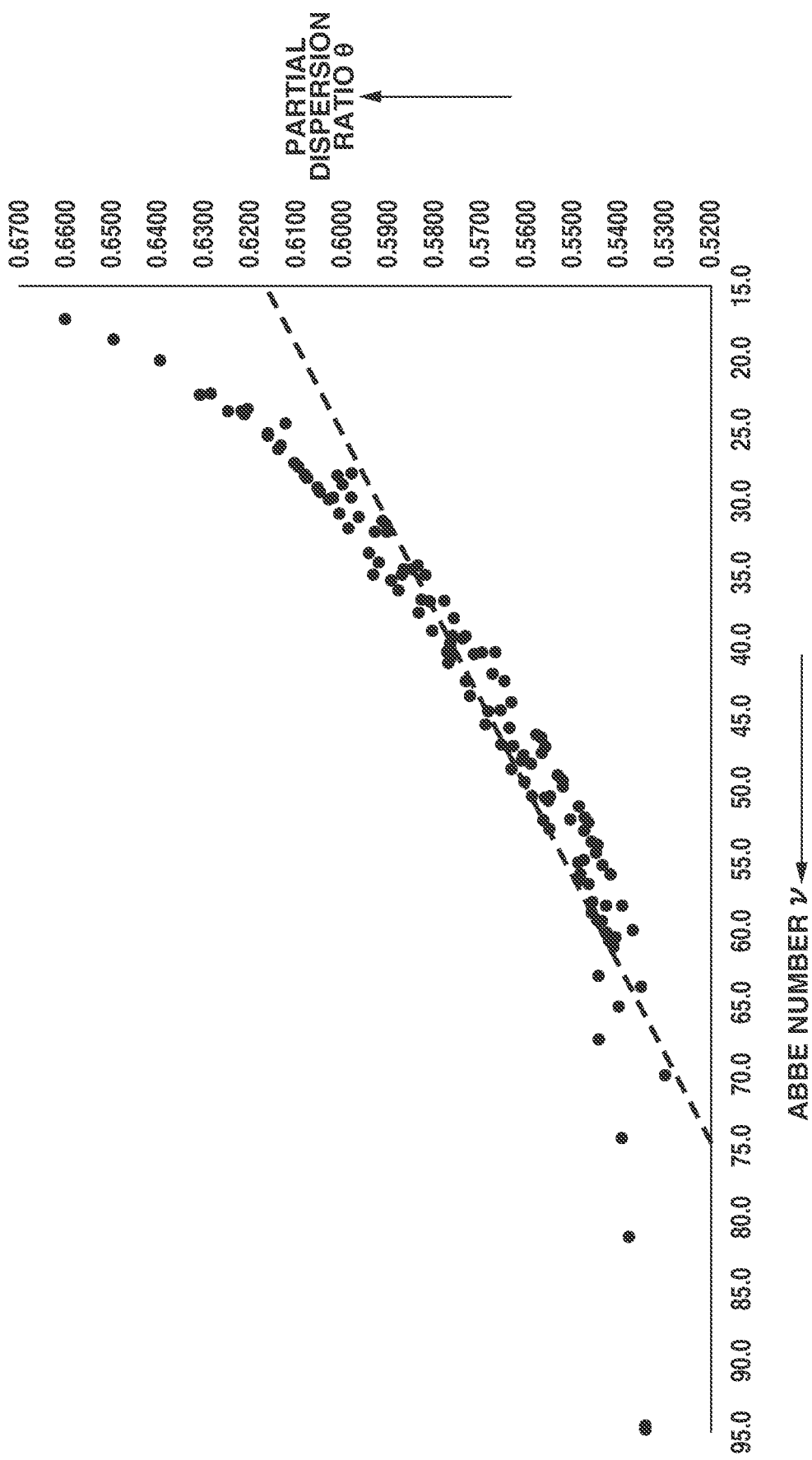
FIG. 24 is a schematic diagram illustrating a relationship between an abbe number $\nu$ and a partial dispersion ratio $\theta$ in an optical material.

The inequalities (20) to (22) define conditions for keeping variations of longitudinal chromatic aberration (axial chromatic aberration) occurring at the telephoto end and longitudinal chromatic aberration caused by adjustment of focus within an acceptable range thereof. Here, FIG. 24 is a schematic diagram illustrating a relationship between an abbe number $\nu$ and a partial dispersion ratio $\theta$ in an optical material. As can be seen from FIG. 24, the optical material has a tendency to exhibit anomalous dispersion such that, as the dispersion thereof becomes higher, the partial dispersion ratio thereof progressively deviates from a straight line indicated by the dashed line. If the inequality (20) is not satisfied with regard to the upper limit thereof, it becomes difficult to keep variations of secondary spectra of longitudinal chromatic aberration caused by adjustment of focus within an acceptable range thereof. If the inequality (20) is not satisfied with regard to the lower limit thereof, anomalous dispersion becomes excessively high, so that it becomes difficult to keep secondary spectra of longitudinal chromatic aberration occurring at the telephoto end within an acceptable range thereof. If the inequality (21) is not satisfied with regard to the upper limit thereof, it becomes difficult to keep longitudinal chromatic aberration occurring at the telephoto end within an acceptable range thereof. If the inequality (21) is not satisfied with regard to the lower limit thereof, it becomes difficult to keep secondary spectra of longitudinal chromatic aberration occurring at the telephoto end within an acceptable range thereof. If the inequality (22) is not satisfied with regard to the upper limit value thereof and the lower limit value thereof, it becomes difficult to keep longitudinal chromatic aberration occurring at the telephoto end within an acceptable range thereof.

Moreover, in each of the zoom lenses according to the first to fourth exemplary embodiments, it is favorable that the first lens unit includes a lens G1 with a negative refractive power located on a most object side. It is favorable that each of the zoom lenses according to the first to fourth exemplary embodiments further satisfies a following inequality:

$$-2.10 \leq fG1/f1 \leq -0.80 \quad (23),$$

where fG1 denotes the focal length of the lens G1. The inequality (23) defines a condition for forming the first lens unit as a small lens unit. If the inequality (23) is not satisfied with regard to the upper limit value thereof, since the focal length of the lens G1 becomes excessively short, the diameter of an axial light flux at the telephoto end increases. As a result, the diameter of the third lens subunit increases, so that it becomes difficult to form the first lens unit as a small lens unit. If the inequality (23) is not satisfied with regard to the lower limit value thereof, since the focal length of the lens G1 becomes excessively long, the entrance pupil of the zoom lens is located excessively at the object side and the diameter of the first lens subunit increases, so that it becomes difficult to form the first lens unit as a small lens unit.

Moreover, it is favorable that, in the zoom lens according to the fourth exemplary embodiment, the first lens unit includes a lens G1 with a negative refractive power located on a most object side. It is favorable that the zoom lens according to the fourth exemplary embodiment further satisfies a following inequality:

$$-2.10 \leq fG1/f1w \leq -0.80 \quad (24),$$

where fG1 denotes the focal length of the lens G1. The inequality (24) defines a condition for forming the first lens unit as a small lens unit. If the inequality (24) is not satisfied with regard to the upper limit value thereof, since the focal length of the lens G1 becomes excessively short, the diameter of an axial light flux at the telephoto end increases. As a result, the diameter of the third lens subunit increases, so that it becomes difficult to form the first lens unit as a small lens unit. If the inequality (24) is not satisfied with regard to the lower limit value thereof, since the focal length of the lens G1 becomes excessively long, the entrance pupil of the zoom lens is located excessively at the object side and the diameter of the first lens subunit increases, so that it becomes difficult to form the first lens unit as a small lens unit.

Moreover, it is favorable that each of the zoom lenses according to the first to fourth exemplary embodiments further satisfies a following inequality:

$$1.50 \leq LD1/f1 \leq 3.30 \quad (25),$$

where LD1 denotes the thickness on the optical axis of the first lens unit. The inequality (25) defines a condition for attaining a zoom lens with a reduced size and weight and a high optical performance. If the inequality (25) is not satisfied with regard to the upper limit value thereof, the thickness of the first lens unit becomes excessively long, so that it becomes difficult to attain a zoom lens reduced in size and weight. Alternatively, the focal length of the first lens unit becomes excessively short, so that it becomes difficult to keep variations of aberrations caused by adjustment of focus at the telephoto end within an acceptable range thereof. If the inequality (25) is not satisfied with regard to the lower limit value thereof, the thickness of the first lens unit becomes excessively short, so that it becomes difficult for the first lens unit to include a number of lenses required to keep variations of aberrations caused by adjustment of focus within an acceptable range thereof. Alternatively, since the focal length of the first lens unit becomes excessively long, the amount of movement of the intermediate lens units required for variation of magnification becomes excessively large, so that it becomes difficult to attain a zoom lens reduced in size and weight.

Moreover, it is favorable that the zoom lens according to the fourth exemplary embodiment further satisfies a following inequality:

$$1.50 \leq LD1/f1w \leq 3.30 \quad (26),$$

where LD1 denotes the thickness on the optical axis of the first lens unit. The inequality (26) defines a condition for attaining a zoom lens with a reduced size and weight and a high optical performance. If the inequality (26) is not satisfied with regard to the upper limit value thereof, the thickness of the first lens unit becomes excessively long, so that it becomes difficult to attain a zoom lens reduced in size and weight. Alternatively, the focal length of the first lens unit becomes excessively short, so that it becomes difficult to keep variations of aberrations caused by adjustment of focus at the telephoto end within an acceptable range thereof. If the inequality (26) is not satisfied with regard to the lower limit value thereof, the thickness of the first lens unit becomes excessively short, so that it becomes difficult for the first lens unit to include a number of lenses required to keep variations of aberrations caused by adjustment of focus within an acceptable range thereof. Alternatively, since the focal length of the first lens unit becomes excessively long, the amount of movement of the intermediate lens units required for variation of magnification becomes excessively large, so that it becomes difficult to attain a zoom lens reduced in size and weight.

Moreover, it is favorable that each of the zoom lenses according to the first to fourth exemplary embodiments further satisfies a following inequality:

$$0.050 \leq fw/BFw \leq 0.150 \tag{27}$$

where BFw denotes a length on the optical axis from an image-side surface of a lens with a finite focal length located on a most image side in the zoom lens to the image plane. The inequality (27) defines a condition for attaining a zoom lens with a wide angle of view and a reduced size and weight. If the inequality (27) is not satisfied with regard to the upper limit value thereof, the focal length at the wide-angle end becomes excessively long with respect to the back focal distance, so that it becomes difficult to attain a zoom lens having a wide angle of view. If the inequality (27) is not satisfied with regard to the lower limit value thereof, the back focal distance becomes excessively long with respect to the focal length at the wide-angle end, so that it becomes difficult to attain a zoom lens reduced in size and weight.

Moreover, in each of the zoom lenses according to the first to fourth exemplary embodiments, the first lens unit includes a first lens subunit with a negative refractive power, which does not move for adjustment of focus, a second lens subunit with a positive refractive power, which moves for adjustment of focus, and a third lens subunit with a positive refractive power. Employing such a configuration enables keeping variations of aberrations caused by adjustment of focus within an acceptable range thereof. Furthermore, the configuration of the first lens unit is not limited to such a configuration as to include three lens subunits, but can be, for example, a configuration in which a plurality of lens subunits moves for adjustment of focus or a configuration in which another lens subunit is additionally included.

Moreover, in each of the zoom lenses according to the first to fourth exemplary embodiments, it is favorable that the third lens subunit consists of five or less lenses. In a case where the third lens subunit includes six or more lenses, the first lens unit becomes large in size, so that it becomes difficult to attain a zoom lens reduced in size and weight.

Moreover, in each of the zoom lenses according to the first to fourth exemplary embodiments, it is favorable that, in the first lens unit, the third lens subunit and a lens subunit located on the image side (rear side) thereof consist of five or less lenses in total. In a case where the third lens subunit and a lens subunit located on the image side thereof include six or more lenses in total, the first lens unit becomes large in size, so that it becomes difficult to attain a zoom lens reduced in size and weight.

Furthermore, it is more favorable that the inequalities (1) to (27), which have been described to be satisfied by at least one of the above-described zoom lenses according to the first to fourth exemplary embodiments, are altered into following inequalities (1a) to (27a), respectively. Furthermore, this does not apply to the inequalities (4) and (7).

$$1.730 \leq (f1+bok1)/f1 \leq 2.370 \tag{1a}$$

$$2.370 \leq ft/f1 \leq 2.700 \tag{2a}$$

$$2.370 \leq ft/f1 \leq 4.550 \tag{2-2a}$$

$$18.1 \leq ft/fw \leq 30.0 \tag{3a}$$

$$1.660 \leq (f1+bok1)/f1 \leq 2.370 \tag{1-2a}$$

$$2.370 \leq ft/f1 \leq 4.550 \tag{2-2a}$$

$$1.660 \leq (f1w+bok1w)/f1w \leq 2.370 \tag{5a}$$

$$2.370 \leq ft/f1w \leq 4.550 \tag{6a}$$

$$46.0° \leq \omega w \leq 50.0° \tag{8a}$$

$$1.90° \leq \omega t \leq 3.30° \tag{9a}$$

$$-1.30 \leq f1a/f1 \leq -0.85 \tag{10a}$$

$$2.20 \leq f1b/f1 \leq 3.40 \tag{11a}$$

$$1.435 \leq f1c/f1 \leq 1.650 \tag{12a}$$

$$-1.50 \leq f1a/f1w \leq -0.75 \tag{13a}$$

$$2.00 \leq f1b/f1w \leq 4.40 \tag{14a}$$

$$1.30 \leq f1c/f1w \leq 1.80 \tag{15a}$$

$$6.89 \leq f1/fw \leq 17.00 \tag{16a}$$

$$6.89 \leq f1w/fw \leq 17.00 \tag{17a}$$

$$1.40 \leq Fnow \leq 2.50 \tag{18a}$$

$$1.79 \leq nd1n \leq 1.95 \tag{19a}$$

$$17.0 \leq vd1ap \leq 29.0 \tag{20a}$$

$$23.0 \leq vd1cn \leq 41.0 \tag{21a}$$

$$5.0 \leq vd1cn - vd1ap \leq 15.0 \tag{22a}$$

$$-1.80 \leq fG1/f1 \leq -1.00 \tag{23a}$$

$$-1.80 \leq fG1/f1w \leq -1.00 \tag{24a}$$

$$1.70 \leq LD1/f1 \leq 2.82 \tag{25a}$$

$$1.70 \leq LD1/f1w \leq 2.80 \tag{26a}$$

$$0.065 \leq fw/BFw \leq 0.097 \tag{27a}$$

Furthermore, it is more favorable that the inequalities (1) to (6), which have been described to be satisfied by at least one of the above-described zoom lenses according to the first to fourth exemplary embodiments, are altered into following inequalities (1b) to (6b), respectively. Furthermore, this does not apply to the inequalities (2), (3), and (4).

$$1.730 \leq (f1+bok1)/f1 \leq 2.190 \tag{1b}$$

$$2.370 \leq ft/f1 \leq 3.145 \tag{2-2b}$$

$$1.730 \leq (f1+bok1)/f1 \leq 2.190 \tag{1-2b}$$

$$1.730 \leq (f1w+bok1w)/f1w \leq 2.190 \tag{5b}$$

$$2.370 \leq ft/f1w \leq 3.145 \tag{6b}$$

Figure 23:
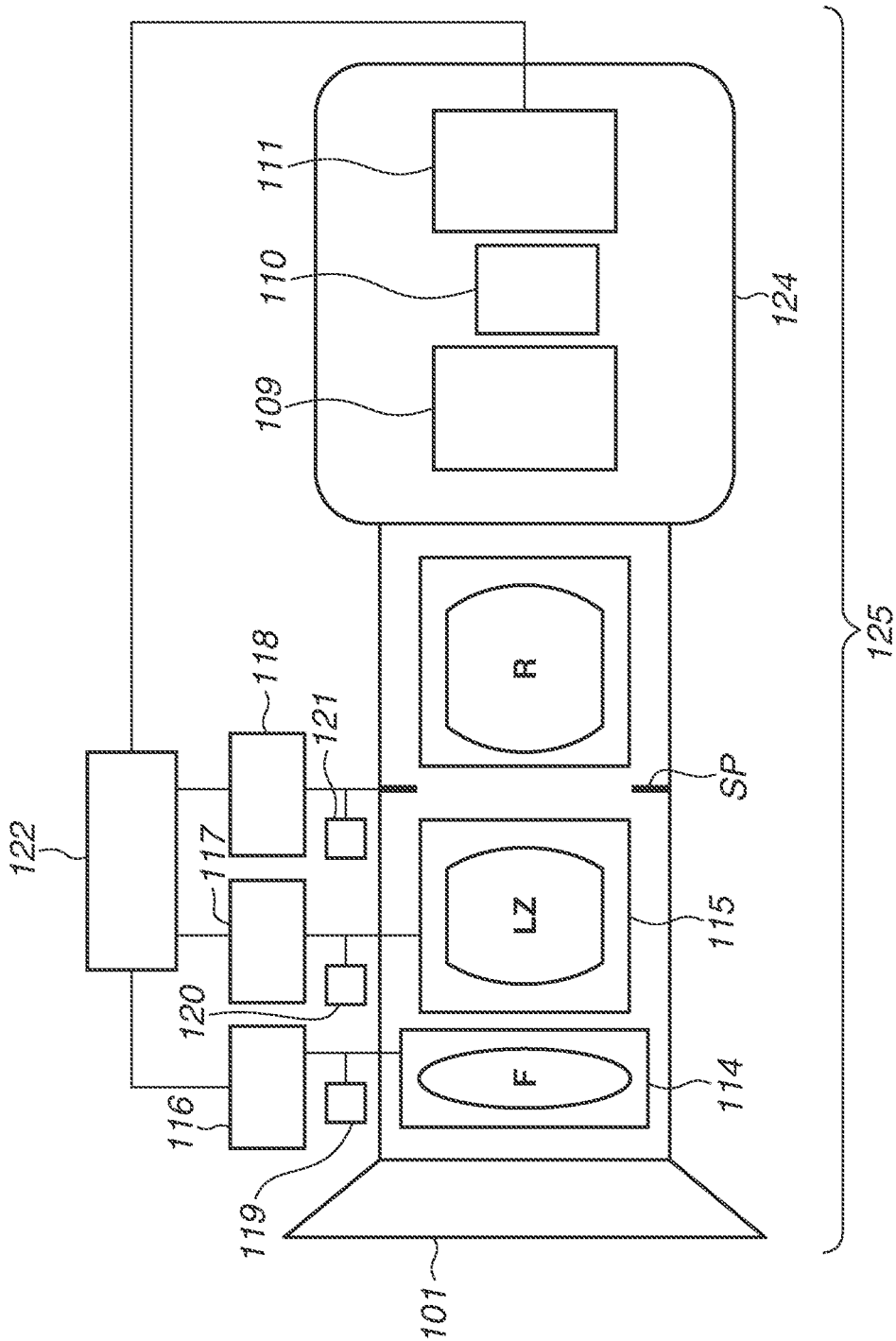
FIG. 23 is a diagram illustrating a configuration example of an image pickup apparatus.

Here, FIG. 23 is a diagram illustrating a configuration example of an image pickup apparatus 125. Referring to FIG. 23, the image pickup apparatus 125 includes a zoom lens 101 according to any one of Embodiments 1 to 11. The image pickup apparatus 125 further includes a camera (image pickup apparatus) body 124. The zoom lens 101 is configured to be attachable to and detachable from the camera body 124. The image pickup apparatus 125 is configured with the zoom lens 101 attached to the camera body 124. The zoom lens 101 includes a first lens unit F, a zoom lens group LZ (also referred to as two or more intermediate lens units LM), and a rear lens unit R for image formation. The first lens unit F includes a second lens subunit 1b, which moves on the optical axis for adjustment of focus, and a first lens subunit 1a and a third lens subunit 1c, which do not move for adjustment of focus.

The two or more intermediate lens units LM move on the optical axis for variation of magnification. The zoom lens 101 further includes an aperture stop SP. The zoom lens 101 further includes drive mechanisms 114 and 115, which are configured to drive the second lens subunit 1b and the two or more intermediate lens units LM, respectively, along the optical axis. Each of the drive mechanisms 114 and 115 can be configured to include, for example, a helicoid and a cam. The image pickup apparatus 125 further includes motors (drive units) 116 to 118, which are configured to drive the drive mechanisms 114 and 115 and the aperture stop SP, respectively. The image pickup apparatus 125 further includes detection units 119 to 121, which are configured to detect the position of the second lens subunit 1b on the optical axis, the positions of the two or more intermediate lens units LM on the optical axis, and the aperture diameter of the aperture stop SP, respectively. Each of the detection units 119 to 121 can be configured to include, for example, an encoder, a potentiometer, or a photosensor. The camera body 124 includes a glass block 109, which includes, for example, an optical filter, and an image sensor (iphotoelectric conversion element) 110, which captures an object image formed by the zoom lens 101. The image sensor 110 can be configured to include, for example, a charge-coupled device (CCD) sensor or a complementary metal-oxide semiconductor (CMOS) sensor. Moreover, the image pickup apparatus 125 further includes a central processing unit (CPU) 111, which serves as a processing unit (control unit) for the camera body 124, and a CPU 122, which serves as a processing unit (control unit) for the zoom lens 101. In this way, attaching a zoom lens according to the present exemplary embodiment to the camera body enables providing a useful image pickup apparatus including the zoom lens having advantageous effects described above and described below.

In the following description, Embodiment 1 to Embodiment 11 of the zoom lens according to the present exemplary embodiment and Numerical Embodiment 1 to Numerical Embodiment 11 corresponding thereto are described in detail.

Embodiment 1

In FIG. 1, components such as lens units and lens subunits according to Embodiment 1 (Numerical Embodiment 1) are the same as that described above. In FIG. 1, the first lens unit L1 has the first surface to the fifteenth surface. The first lens subunit 1a has the first surface to the sixth surface, and includes two negative lenses and one positive lens. The second lens subunit 1b has the seventh surface and the eighth surface, and includes one positive lens a surface on the image side of which is an aspheric surface. The third lens subunit 1c has the ninth surface to the fifteenth surface, and includes three positive lenses and one negative lens.

The two or more intermediate lens units LM have the sixteenth surface to the thirtieth surface. The first intermediate lens unit M1 has the sixteenth surface to the twenty-second surface, and includes two negative lenses and two positive lenses. The second intermediate lens unit M2 has the twenty-third surface to the twenty-fifth surface, and includes one negative lens and one positive lens. The third intermediate lens unit M3 has the twenty-sixth surface to the thirtieth surface, and includes one negative lens and two positive lenses. The aperture stop SP has the thirty-first surface. The rear lens unit LN has the thirty-second surface to the forty-first surface, and includes two negative lenses and four positive lenses.

FIGS. 2A, 2B, and 2C are diagrams illustrating aberrations in Embodiment 1 (Numerical Embodiment 1) as described above.

Values concerning the inequalities which the present Embodiment satisfies from among the inequalities (1) to (27) and values of the respective variables included in those conditional expressions are shown in Table 1. Furthermore, the zoom lens according to the present Embodiment satisfies the inequalities which are set to be satisfied by any one of the zoom lenses according to the first to fourth exemplary embodiments, thus attaining a zoom lens advantageous in respect of a wide angle of view, a high zoom ratio, a reduction in size and weight, and a high optical performance.

Embodiment 2

FIG. 3 is a sectional view of a zoom lens in a state of being set at the wide-angle end and at focusing on infinite distance according to Embodiment 2. Referring to FIG. 3, components of the zoom lens are described in order from an object side to an image side. The zoom lens includes a first lens unit L1 with a positive refractive power, which does not move for variation of magnification. The first lens unit L1 includes a first lens subunit 1a, which does not move for adjustment of focus. The first lens unit L1 further includes a second lens subunit 1b, which moves toward the image side for adjustment of focus from an infinite-distance object to a minimum-distance object. The first lens unit L1 further includes a third lens subunit 1c, which does not move for adjustment of focus. The zoom lens further includes two or more intermediate lens units LM, which move in variation of magnification and include, in order from the object side to the image side, a first intermediate lens unit M1 with a negative refractive power, a second intermediate lens unit M2 with a negative refractive power, and a third intermediate lens unit M3 with a positive refractive power. The first intermediate lens unit M1 monotonously moves on an optical axis toward the image side for variation of magnification from the wide-angle end to the telephoto end. The second intermediate lens unit M2 moves on the optical axis first toward the object side and then toward the image side (toward the image side after moving toward the object side, i.e., along a locus convex toward the object side) for such variation of magnification. The third intermediate lens unit M3 moves on the optical axis (for example, non-monotonously as illustrated) for such variation of magnification. The zoom lens further includes an aperture stop SP, which does not move in variation of magnification. The zoom lens further includes a rear lens unit LN with a positive refractive power, which does not move for variation of magnification.

The first lens unit L1 has the first surface to the seventeenth surface. The first lens subunit 1a has the first surface to the eighth surface, and includes three negative lenses and one positive lens. The second lens subunit 1b has the ninth surface and the tenth surface, and includes one positive lens a surface on the image side of which is an aspheric surface. The third lens subunit 1c has the eleventh surface to the seventeenth surface, and includes three positive lenses and one negative lens.

The two or more intermediate lens units LM have the eighteenth surface to the thirty-second surface. The first intermediate lens unit M1 has the eighteenth surface to the twenty-fourth surface, and includes two negative lenses and two positive lenses. The second intermediate lens unit M2 has the twenty-fifth surface to the twenty-seventh surface, and includes one negative lens and one positive lens. The third intermediate lens unit M3 has the twenty-eighth surface to the thirty-second surface, and includes one negative lens and two positive lenses. The aperture stop SP has the thirty-third surface. The rear lens unit LN has the thirty-fourth surface to the forty-third surface, and includes two negative lenses and four positive lenses.

Figure 4A:
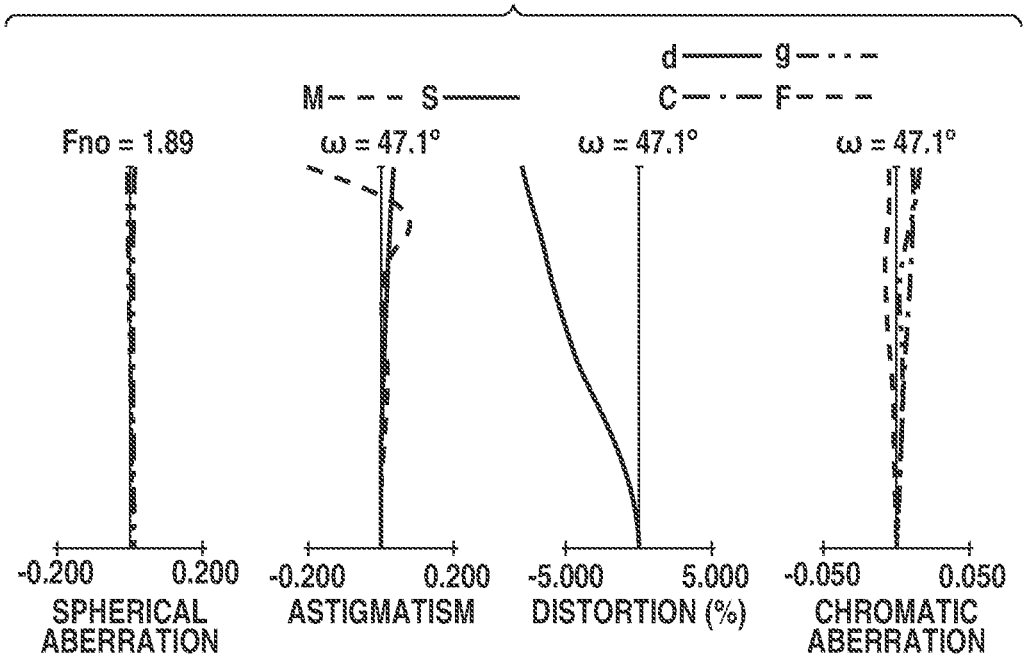
FIG. 4A is a diagram illustrating aberrations occurring in the zoom lens illustrated in FIG. 3 in a state of being set at focusing on infinite distance and at the wide-angle end.
Figure 4B:
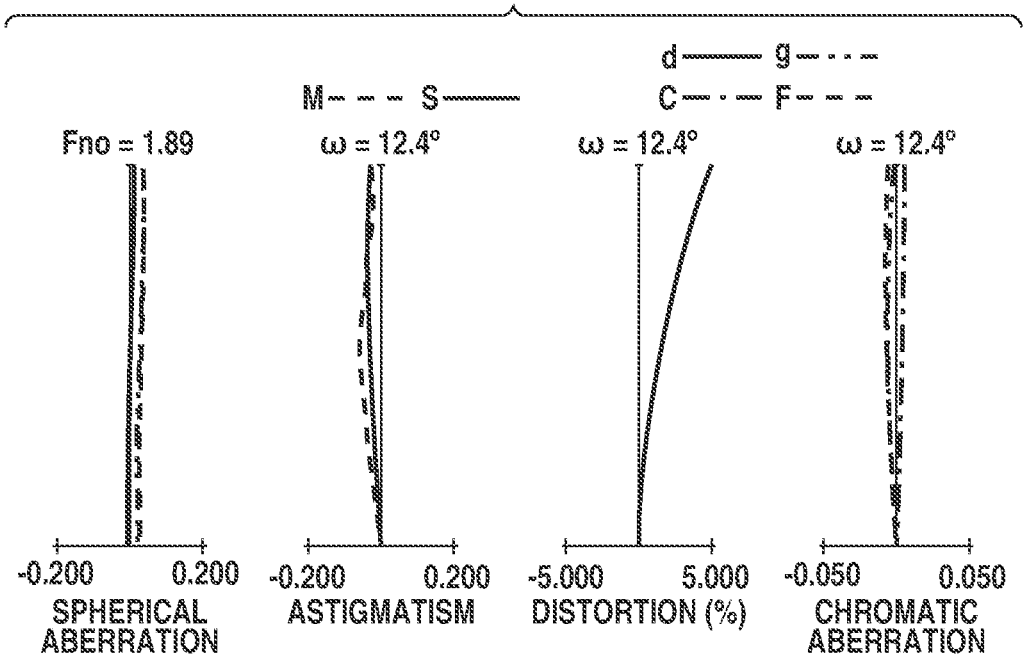
FIG. 4B is a diagram illustrating aberrations occurring in the zoom lens illustrated in FIG. 3 in a state of being set at focusing on infinite distance and in an intermediate zoom state.

FIG. 4A is a diagram illustrating aberrations occurring in the zoom lens illustrated in FIG. 3 in a state of being set at focusing on infinite distance and at the wide-angle end, FIG. 4B is a diagram illustrating aberrations occurring in the zoom lens illustrated in FIG. 3 in a state of being set at focusing on infinite distance and in an intermediate zoom state, and FIG. 4C is a diagram illustrating aberrations occurring in the zoom lens illustrated in FIG. 3 in a state of being set at focusing on infinite distance and at the telephoto end (with regard to the respective focal lengths, see Numerical Embodiment 2). Graph legends illustrated in FIGS. 4A to 4C are the same as those described above with reference to FIGS. 2A to 2C.

Values concerning the inequalities which the present Embodiment satisfies from among the inequalities (1) to (27) and values of the respective variables included in those inequalities are shown in Table 1. Furthermore, the zoom lens according to the present Embodiment satisfies the inequalities which are set to be satisfied by any one of the zoom lenses according to the first to fourth exemplary embodiments, thus attaining a zoom lens advantageous in respect of a wide angle of view, a high zoom ratio, a reduction in size and weight, and a high optical performance.

Embodiment 3

Figure 5:
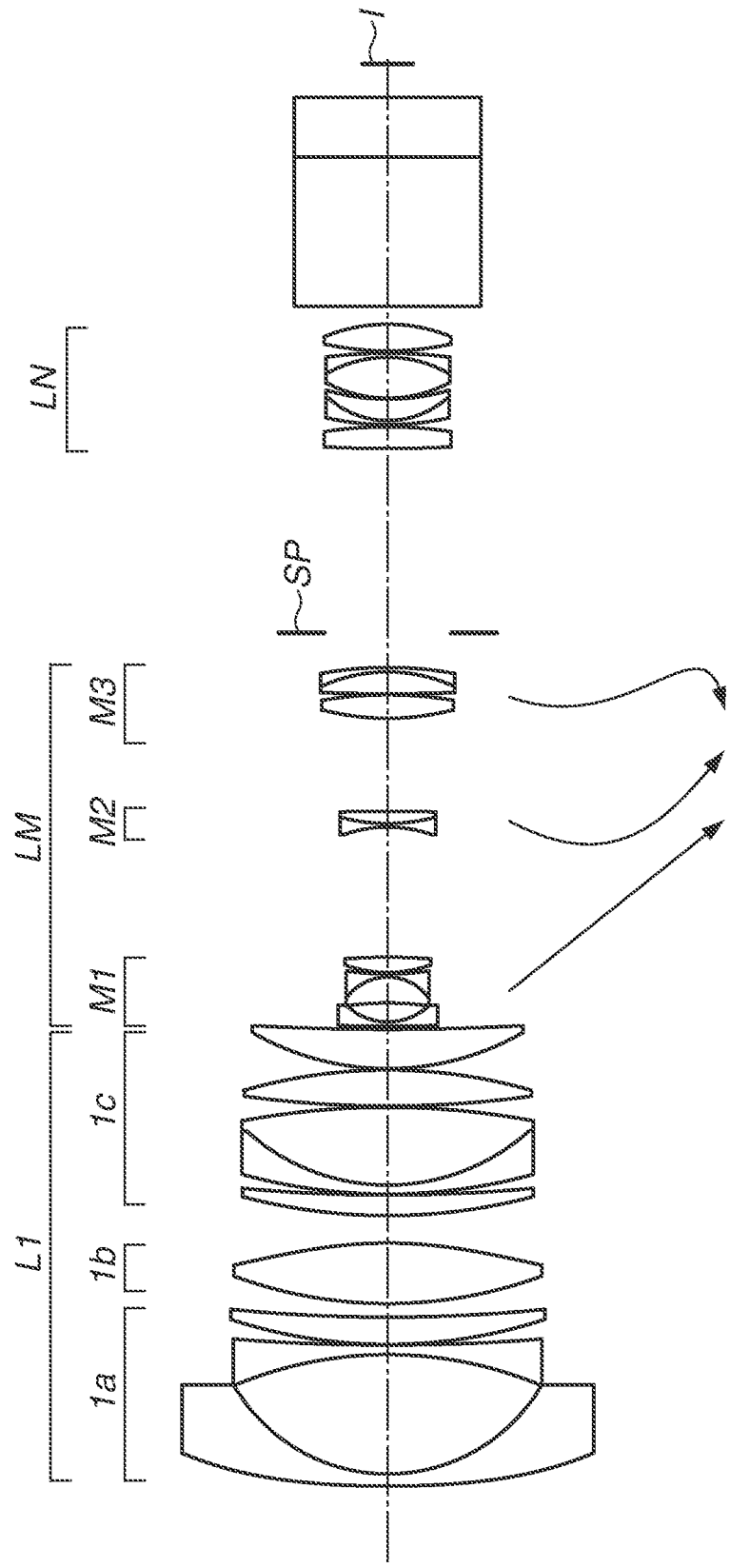
FIG. 5 is a sectional view of a zoom lens in a state of being set at the wide-angle end and at focusing on infinite distance according to Embodiment 3.

FIG. 5 is a sectional view of a zoom lens in a state of being set at the wide-angle end and at focusing on infinite distance according to Embodiment 3. Referring to FIG. 5, components of the zoom lens are described in order from an object side to an image side. The zoom lens includes a first lens unit L1 with a positive refractive power, which does not move for variation of magnification. The first lens unit L1 includes a first lens subunit 1a, which does not move for adjustment of focus. The first lens unit L1 further includes a second lens subunit 1b, which moves toward the image side for adjustment of focus from an infinite-distance object to a minimum-distance object. The first lens unit L1 further includes a third lens subunit 1c, which moves toward the object side for such adjustment of focus. Here, the ratio of the amount of movement of the second lens subunit 1b for such adjustment of focus to the amount of movement of the third lens subunit 1c for such adjustment of focus is set to 9:1. The zoom lens further includes two or more intermediate lens units LM, which move in variation of magnification and include, in order from the object side to the image side, a first intermediate lens unit M1 with a negative refractive power, a second intermediate lens unit M2 with a negative refractive power, and a third intermediate lens unit M3 with a positive refractive power. The first intermediate lens unit M1 monotonously moves on an optical axis toward the image side for variation of magnification from the wide-angle end to the telephoto end. The second intermediate lens unit M2 moves on the optical axis first toward the object side and then toward the image side for such variation of magnification. The third intermediate lens unit M3 moves on the optical axis (for example, non-monotonously as illustrated) for such variation of magnification. The zoom lens further includes an aperture stop SP, which does not move in variation of magnification. The zoom lens further includes a rear lens unit LN with a positive refractive power, which does not move for variation of magnification.

The first lens unit L1 has the first surface to the seventeenth surface. The first lens subunit 1a has the first surface to the sixth surface, and includes two negative lenses and one positive lens. The second lens subunit 1b has the seventh surface and the eighth surface, and includes one positive lens a surface on the image side of which is an aspheric surface. The third lens subunit 1c has the ninth surface to the seventeenth surface, and includes three positive lenses and one negative lens.

The two or more intermediate lens units LM have the eighteenth surface to the thirty-second surface. The first intermediate lens unit M1 has the eighteenth surface to the twenty-fourth surface, and includes two negative lenses and two positive lenses. The second intermediate lens unit M2 has the twenty-fifth surface to the twenty-seventh surface, and includes one negative lens and one positive lens. The third intermediate lens unit M3 has the twenty-eighth surface to the thirty-second surface, and includes one negative lens and two positive lenses. The aperture stop SP has the thirty-third surface. The rear lens unit LN has the thirty-fourth surface to the forty-third surface, and includes two negative lenses and four positive lenses.

Figure 6A:
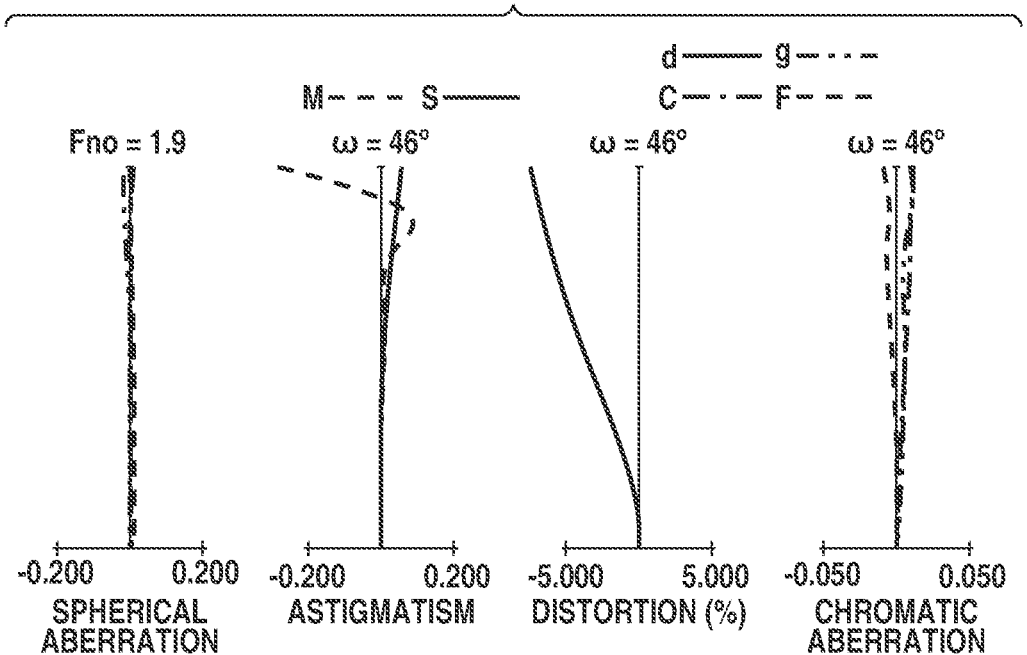
FIG. 6A is a diagram illustrating aberrations occurring in the zoom lens illustrated in FIG. 5 in a state of being set at focusing on infinite distance and at the wide-angle end.
Figure 6B:
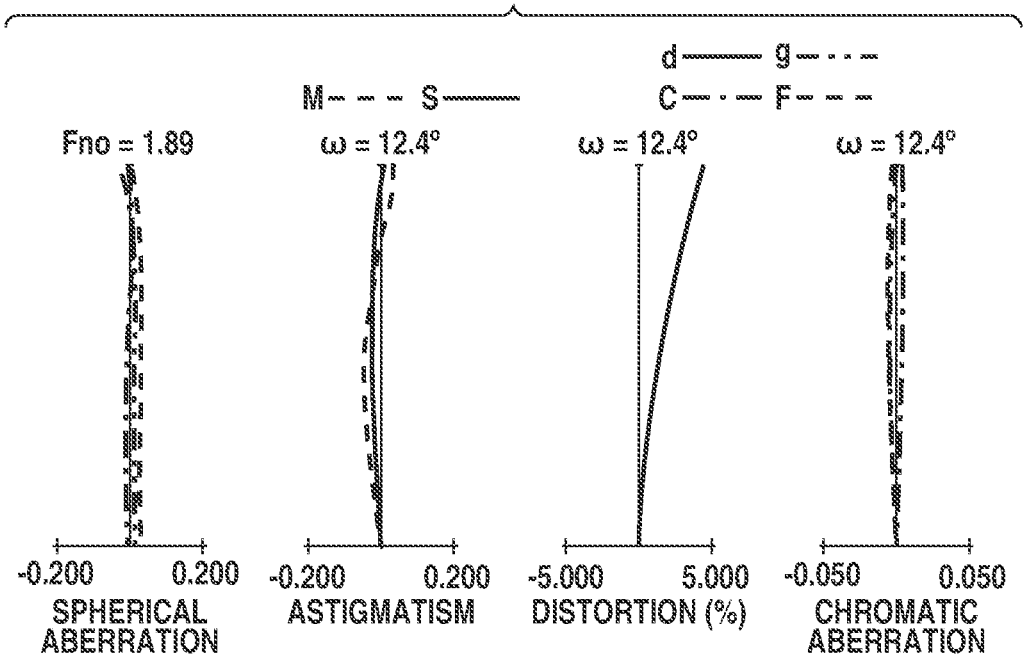
FIG. 6B is a diagram illustrating aberrations occurring in the zoom lens illustrated in FIG. 5 in a state of being set at focusing on infinite distance and in an intermediate zoom state.

FIG. 6A is a diagram illustrating aberrations occurring in the zoom lens illustrated in FIG. 5 in a state of being set at focusing on infinite distance and at the wide-angle end, FIG. 6B is a diagram illustrating aberrations occurring in the zoom lens illustrated in FIG. 5 in a state of being set at focusing on infinite distance and in an intermediate zoom state, and FIG. 6C is a diagram illustrating aberrations occurring in the zoom lens illustrated in FIG. 5 in a state of being set at focusing on infinite distance and at the telephoto end (with regard to the respective focal lengths, see Numerical Embodiment 3). Graph legends illustrated in FIGS. 6A to 6C are the same as those described above with reference to FIGS. 2A to 2C.

Values concerning the inequalities which the present Embodiment satisfies from among the inequalities (1) to (27) and values of the respective variables included in those inequalities are shown in Table 1. Furthermore, the zoom lens according to the present Embodiment satisfies the inequalities which are set to be satisfied by any one of the zoom lenses according to the first to fourth exemplary embodiments, thus attaining a zoom lens advantageous in respect of a wide angle of view, a high zoom ratio, a reduction in size and weight, and a high optical performance.

Embodiment 4

Figure 7:
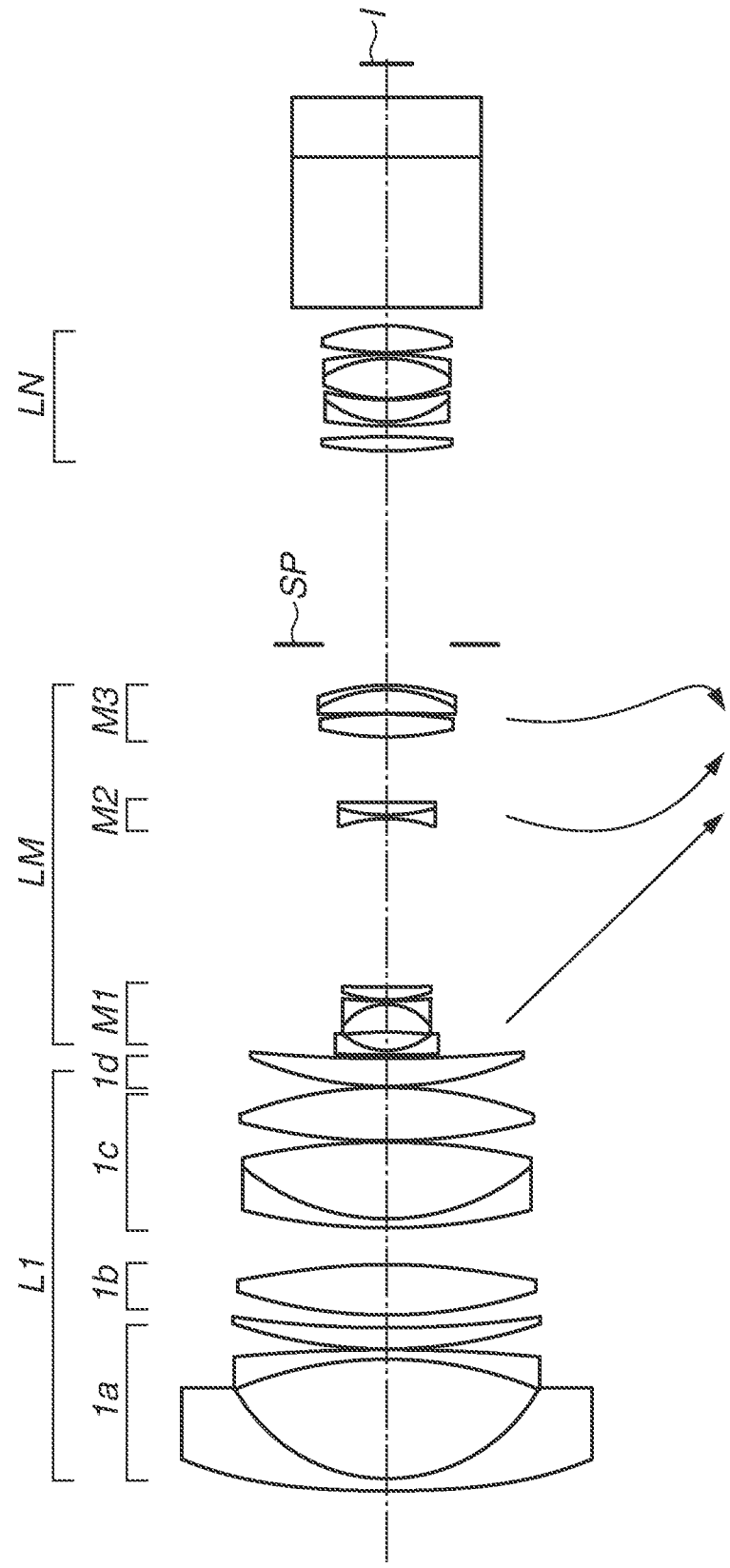
FIG. 7 is a sectional view of a zoom lens in a state of being set at the wide-angle end and at focusing on infinite distance according to Embodiment 4.

FIG. 7 is a sectional view of a zoom lens in a state of being set at the wide-angle end and at focusing on infinite distance according to Embodiment 4. Referring to FIG. 7, components of the zoom lens are described in order from an object side to an image side. The zoom lens includes a first lens unit L1 with a positive refractive power, which does not move for variation of magnification. The first lens unit L1 includes a first lens subunit 1a, which does not move for adjustment of focus. The first lens unit L1 further includes a second lens subunit 1b, which moves toward the image side for adjustment of focus from an infinite-distance object to a minimum-distance object. The first lens unit L1 further includes a third lens subunit 1c, which moves toward the object side for such adjustment of focus. Here, the ratio of the amount of movement of the second lens subunit 1b for such adjustment of focus to the amount of movement of the third lens subunit 1c for such adjustment of focus is set to 9:1. The first lens unit L1 further includes a fourth lens subunit 1d, which does not move for adjustment of focus. Furthermore, the first lens subunit 1a and the third lens subunit 1c can be configured not to move for adjustment of focus, and the second lens subunit 1b and the fourth lens subunit 1d can be configured to move for adjustment of focus. In that case, for adjustment of focus from an infinite-distance object to a minimum-distance object, the second lens subunit 1b moves toward the image side and the fourth lens subunit 1d moves toward the object side. Here, the ratio of the amount of movement of the second lens subunit 1b for such adjustment of focus to the amount of movement of the fourth lens subunit 1d for such adjustment of focus is set to 15:1. The zoom lens further includes two or more intermediate lens units LM, which move in variation of magnification and include, in order from the object side to the image side, a first intermediate lens unit M1 with a negative refractive power, a second intermediate lens unit M2 with a negative refractive power, and a third intermediate lens unit M3 with a positive refractive power. The first intermediate lens unit M1 monotonously moves on an optical axis toward the image side for variation of magnification from the wide-angle end to the telephoto end. The second intermediate lens unit M2 moves on the optical axis first toward the object side and then toward the image side for such variation of magnification. The third intermediate lens unit M3 moves on the optical axis (for example, non-monotonously as illustrated) for such variation of magnification. The zoom lens further includes an aperture stop SP, which does not move in variation of magnification. The zoom lens further includes a rear lens unit LN with a positive refractive power, which does not move for variation of magnification.

The first lens unit L1 has the first surface to the fifteenth surface. The first lens subunit 1a has the first surface to the sixth surface, and includes two negative lenses and one positive lens. The second lens subunit 1b has the seventh surface and the eighth surface, and includes one positive lens a surface on the image side of which is an aspheric surface. The third lens subunit 1c has the ninth surface to the thirteenth surface, and includes two positive lenses and one negative lens. The fourth lens subunit 1d has the fourteenth surface and the fifteenth surface, and includes one positive lens.

The two or more intermediate lens units LM have the sixteenth surface to the thirtieth surface. The first intermediate lens unit M1 has the sixteenth surface to the twenty-second surface, and includes two negative lenses and two positive lenses. The second intermediate lens unit M2 has the twenty-third surface to the twenty-fifth surface, and includes one negative lens and one positive lens. The third intermediate lens unit M3 has the twenty-sixth surface to the thirtieth surface, and includes one negative lens and two positive lenses. The aperture stop SP has the thirty-first surface. The rear lens unit LN has the thirty-second surface to the forty-first surface, and includes two negative lenses and four positive lenses.

Figure 8A:
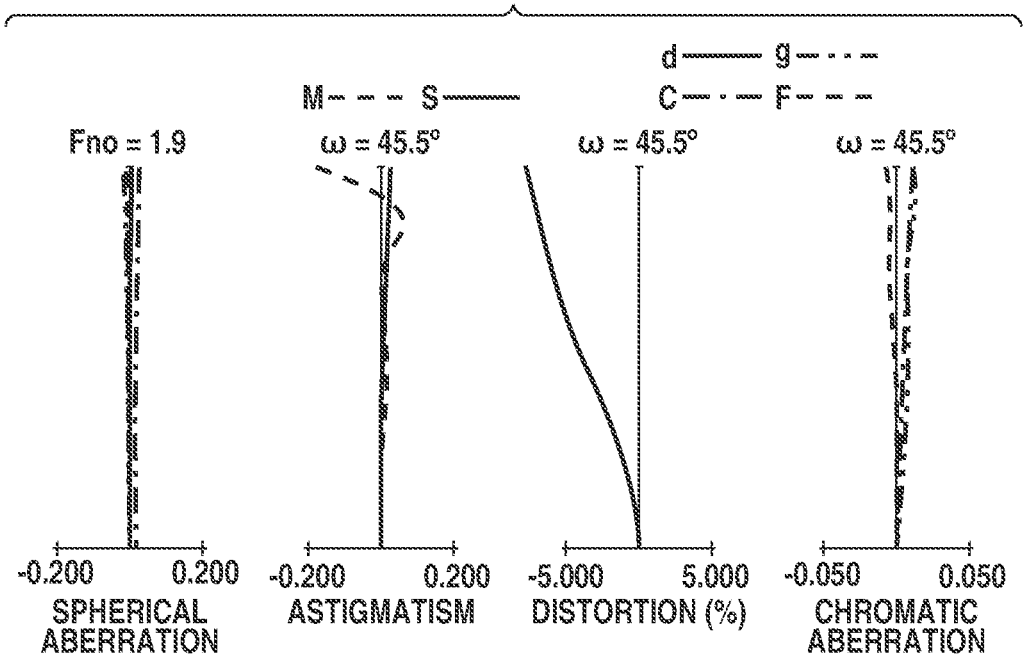
FIG. 8A is a diagram illustrating aberrations occurring in the zoom lens illustrated in FIG. 7 in a state of being set at focusing on infinite distance and at the wide-angle end.
Figure 8B:
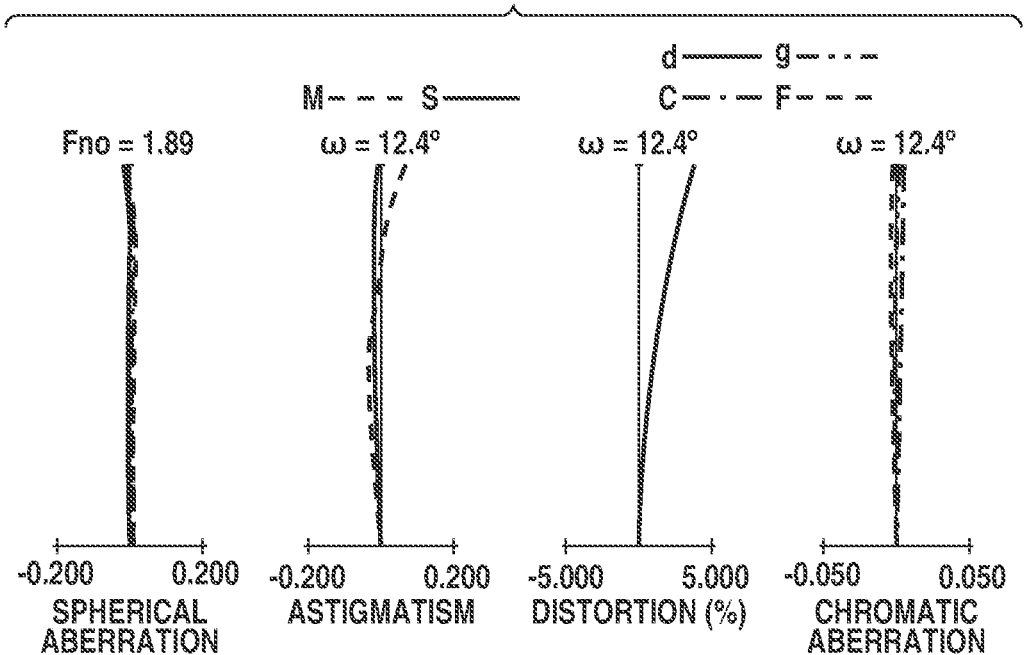
FIG. 8B is a diagram illustrating aberrations occurring in the zoom lens illustrated in FIG. 7 in a state of being set at focusing on infinite distance and in an intermediate zoom state.

FIG. 8A is a diagram illustrating aberrations occurring in the zoom lens illustrated in FIG. 7 in a state of being set at focusing on infinite distance and at the wide-angle end, FIG. 8B is a diagram illustrating aberrations occurring in the zoom lens illustrated in FIG. 7 in a state of being set at focusing on infinite distance and in an intermediate zoom state, and FIG. 8C is a diagram illustrating aberrations occurring in the zoom lens illustrated in FIG. 7 in a state of being set at focusing on infinite distance and at the telephoto end (with regard to the respective focal lengths, see Numerical Embodiment 4). Graph legends illustrated in FIGS. 8A to 8C are the same as those described above with reference to FIGS. 2A to 2C.

Values concerning the inequalities which the present Embodiment satisfies from among the inequalities (1) to (27) and values of the respective variables included in those inequalities are shown in Table 1. Furthermore, the zoom lens according to the present Embodiment satisfies the inequalities which are set to be satisfied by any one of the zoom lenses according to the first to fourth exemplary embodiments, thus attaining a zoom lens advantageous in respect of a wide angle of view, a high zoom ratio, a reduction in size and weight, and a high optical performance.

Embodiment 5

Figure 9:
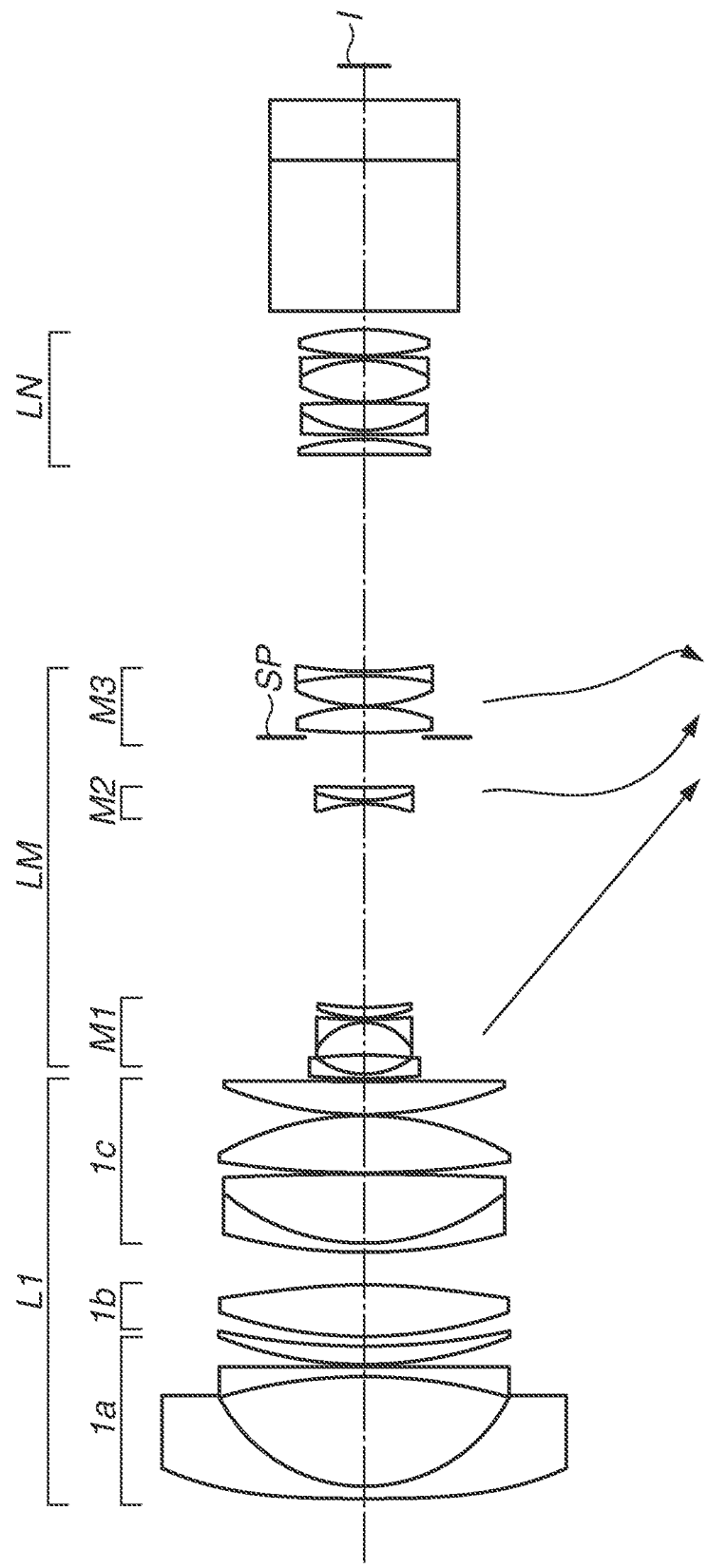
FIG. 9 is a sectional view of a zoom lens in a state of being set at the wide-angle end and at focusing on infinite distance according to Embodiment 5.

FIG. 9 is a sectional view of a zoom lens in a state of being set at the wide-angle end and at focusing on infinite distance according to Embodiment 5. Referring to FIG. 9, components of the zoom lens are described in order from an object side to an image side. The zoom lens includes a first lens unit L1 with a positive refractive power, which does not move for variation of magnification. The first lens unit L1 includes a first lens subunit 1a, which does not move for adjustment of focus. The first lens unit L1 further includes a second lens subunit 1b, which moves toward the image side for adjustment of focus from an infinite-distance object to a minimum-distance object. The first lens unit L1 further includes a third lens subunit 1c, which does not move for adjustment of focus. The zoom lens further includes two or more intermediate lens units LM, which move in variation of magnification and include, in order from the object side to the image side, a first intermediate lens unit M1 with a negative refractive power, a second intermediate lens unit M2 with a negative refractive power, and a third intermediate lens unit M3 with a positive refractive power. The first intermediate lens unit M1 monotonously moves on an optical axis toward the image side for variation of magnification from the wide-angle end to the telephoto end. The second intermediate lens unit M2 moves on the optical axis first toward the object side and then toward the image side for such variation of magnification. The third intermediate lens unit M3 moves on the optical axis (for example, non-monotonously as illustrated) for such variation of magnification. The zoom lens further includes an aperture stop SP, which is located on a most object side in the third intermediate lens unit M3 and is configured to move integrally with the third intermediate lens unit M3. The zoom lens further includes a rear lens unit LN with a positive refractive power, which does not move for variation of magnification.

The first lens unit L1 has the first surface to the fifteenth surface. The first lens subunit 1a has the first surface to the sixth surface, and includes two negative lenses and one positive lens. The second lens subunit 1b has the seventh surface and the eighth surface, and includes one positive lens a surface on the image side of which is an aspheric surface. The third lens subunit 1c has the ninth surface to the fifteenth surface, and includes three positive lenses and one negative lens.

The two or more intermediate lens units LM have the sixteenth surface to the thirty-first surface. The first intermediate lens unit M1 has the sixteenth surface to the twenty-second surface, and includes two negative lenses and two positive lenses. The second intermediate lens unit M2 has the twenty-third surface to the twenty-fifth surface, and includes one negative lens and one positive lens. The aperture stop SP has the twenty-sixth surface. The third intermediate lens unit M3 has the twenty-seventh surface to the thirty-first surface, and includes the aperture stop SP, one negative lens, and two positive lenses. The rear lens unit LN has the thirty-second surface to the forty-first surface, and includes two negative lenses and four positive lenses.

FIG. 10A is a diagram illustrating aberrations occurring in the zoom lens illustrated in FIG. 9 in a state of being set at focusing on infinite distance and at the wide-angle end, FIG. 10B is a diagram illustrating aberrations occurring in the zoom lens illustrated in FIG. 9 in a state of being set at focusing on infinite distance and in an intermediate zoom state, and FIG. 10C is a diagram illustrating aberrations occurring in the zoom lens illustrated in FIG. 9 in a state of being set at focusing on infinite distance and at the telephoto end (with regard to the respective focal lengths, see Numerical Embodiment 5). Graph legends illustrated in FIGS. 10A to 10C are the same as those described above with reference to FIGS. 2A to 2C.

Values concerning the inequalities which the present Embodiment satisfies from among the inequalities (1) to (27) and values of the respective variables included in those inequalities are shown in Table 1. Furthermore, the zoom lens according to the present Embodiment satisfies the inequalities which are set to be satisfied by any one of the zoom lenses according to the first to fourth exemplary embodiments, thus attaining a zoom lens advantageous in respect of a wide angle of view, a high zoom ratio, a reduction in size and weight, and a high optical performance.

Embodiment 6

Figure 11:
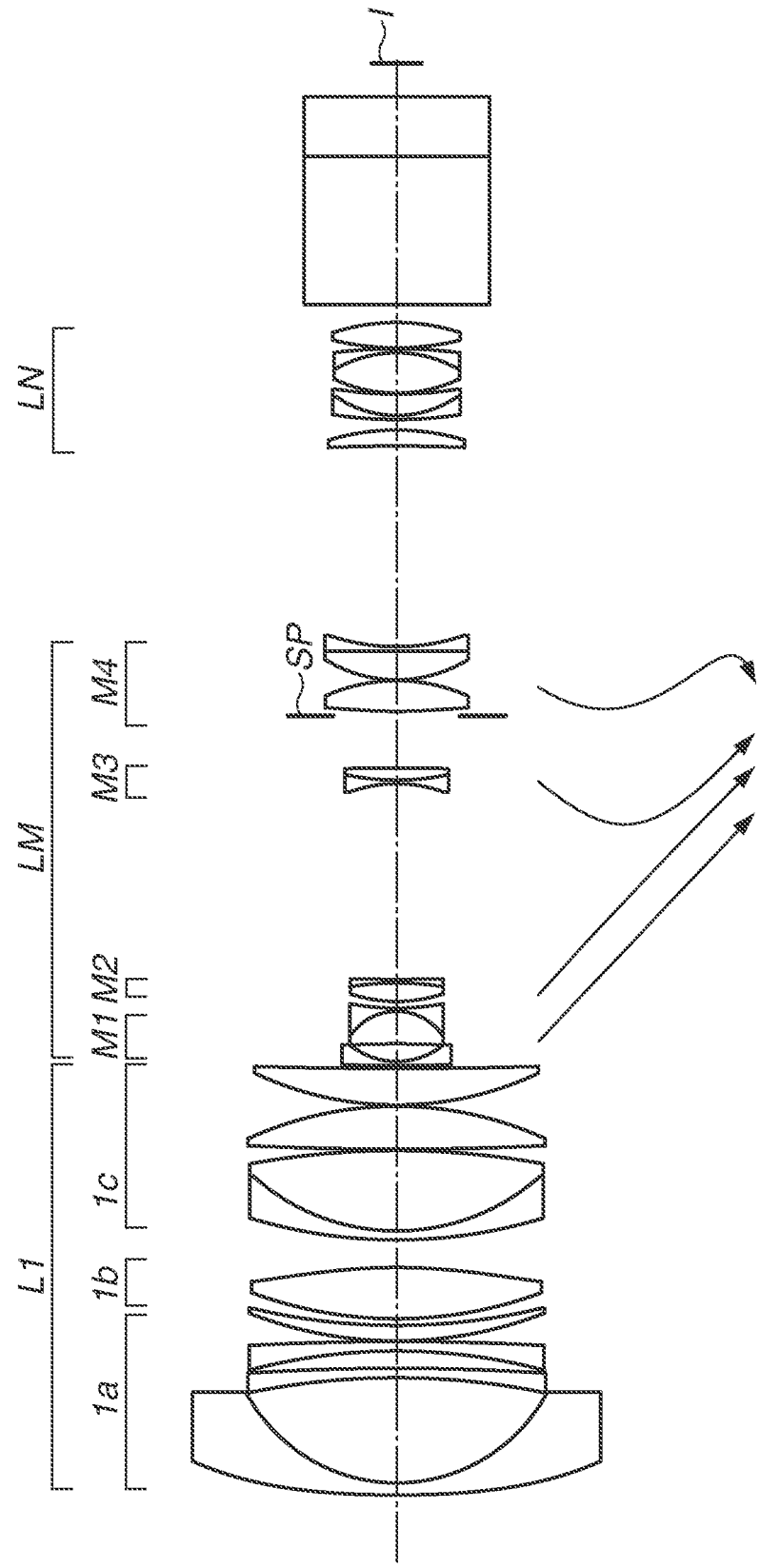
FIG. 11 is a sectional view of a zoom lens in a state of being set at the wide-angle end and at focusing on infinite distance according to Embodiment 6.

FIG. 11 is a sectional view of a zoom lens in a state of being set at the wide-angle end and at focusing on infinite distance according to Embodiment 6. Referring to FIG. 11, components of the zoom lens are described in order from an object side to an image side. The zoom lens includes a first lens unit L1 with a positive refractive power, which does not move for variation of magnification. The first lens unit L1 includes a first lens subunit 1a, which does not move for adjustment of focus. The first lens unit L1 further includes a second lens subunit 1b, which moves toward the image side for adjustment of focus from an infinite-distance object to a minimum-distance object. The first lens unit L1 further includes a third lens subunit 1c, which does not move for adjustment of focus. The zoom lens further includes two or more intermediate lens units LM, which move in variation of magnification and include, in order from the object side to the image side, a first intermediate lens unit M1 with a negative refractive power, a second intermediate lens unit M2 with a positive refractive power, a third intermediate lens unit M3 with a negative refractive power, and a fourth intermediate lens unit M4 with a positive refractive power. The first intermediate lens unit M1 monotonously moves on an optical axis toward the image side for variation of magnification from the wide-angle end to the telephoto end. The second intermediate lens unit M2 monotonously moves on the optical axis toward the image side for such variation of magnification. The third intermediate lens unit M3 moves on the optical axis first toward the object side and then toward the image side for such variation of magnification. The fourth intermediate lens unit M4 moves on the optical axis (for example, non-monotonously as illustrated) for such variation of magnification. The zoom lens further includes an aperture stop SP, which is located on a most object side in the fourth intermediate lens unit M4 and is configured to move integrally with the fourth intermediate lens unit M4. The zoom lens further includes a rear lens unit LN with a positive refractive power, which does not move for variation of magnification.

The first lens unit L1 has the first surface to the seventeenth surface. The first lens subunit 1a has the first surface to the eighth surface, and includes three negative lenses and one positive lens. The second lens subunit 1b has the ninth surface and the tenth surface, and includes one positive lens a surface on the image side of which is an aspheric surface. The third lens subunit 1c has the eleventh surface to the seventeenth surface, and includes three positive lenses and one negative lens.

The two or more intermediate lens units LM have the eighteenth surface to the thirty-fourth surface. The first intermediate lens unit M1 has the eighteenth surface to the twenty-second surface, and includes two negative lenses and one positive lens. The second intermediate lens unit M2 has the twenty-third surface to the twenty-fifth surface, and includes one negative lens and one positive lens. The third intermediate lens unit M3 has the twenty-sixth surface to the twenty-eighth surface, and includes one negative lens and one positive lens. The fourth intermediate lens unit M4 has the twenty-ninth surface to the thirty-fourth surface, and includes an aperture stop SP, one negative lens, and two positive lenses. The rear lens unit LN has the thirty-fifth surface to the forty-fourth surface, and includes two negative lenses and four positive lenses.

Figure 12A:
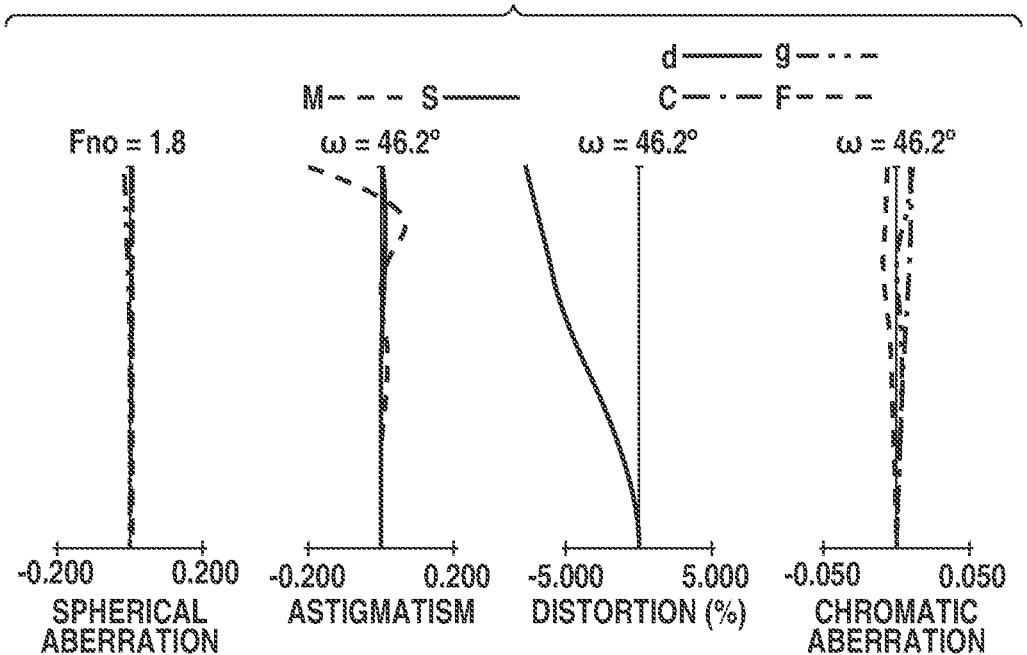
FIG. 12A is a diagram illustrating aberrations occurring in the zoom lens illustrated in FIG. 11 in a state of being set at focusing on infinite distance and at the wide-angle end.
Figure 12B:
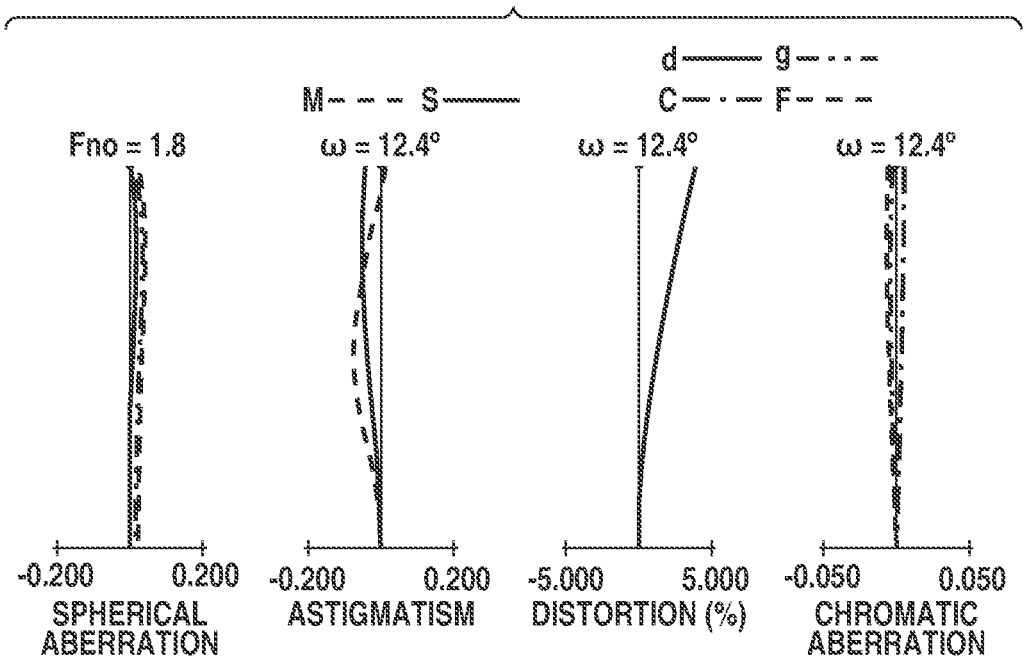
FIG. 12B is a diagram illustrating aberrations occurring in the zoom lens illustrated in FIG. 11 in a state of being set at focusing on infinite distance and in an intermediate zoom state.

FIG. 12A is a diagram illustrating aberrations occurring in the zoom lens illustrated in FIG. 11 in a state of being set at focusing on infinite distance and at the wide-angle end, FIG. 12B is a diagram illustrating aberrations occurring in the zoom lens illustrated in FIG. 11 in a state of being set at focusing on infinite distance and in an intermediate zoom state, and FIG. 12C is a diagram illustrating aberrations occurring in the zoom lens illustrated in FIG. 11 in a state of being set at focusing on infinite distance and at the telephoto end (with regard to the respective focal lengths, see Numerical Embodiment 6). Graph legends illustrated in FIGS. 12A to 12C are the same as those described above with reference to FIGS. 2A to 2C.

Values concerning the inequalities which the present Embodiment satisfies from among the inequalities (1) to (27) and values of the respective variables included in those inequalities are shown in Table 1. Furthermore, the zoom lens according to the present Embodiment satisfies the inequalities which are set to be satisfied by any one of the zoom lenses according to the first to fourth exemplary embodiments, thus attaining a zoom lens advantageous in respect of a wide angle of view, a high zoom ratio, a reduction in size and weight, and a high optical performance.

Embodiment 7

Figure 13:
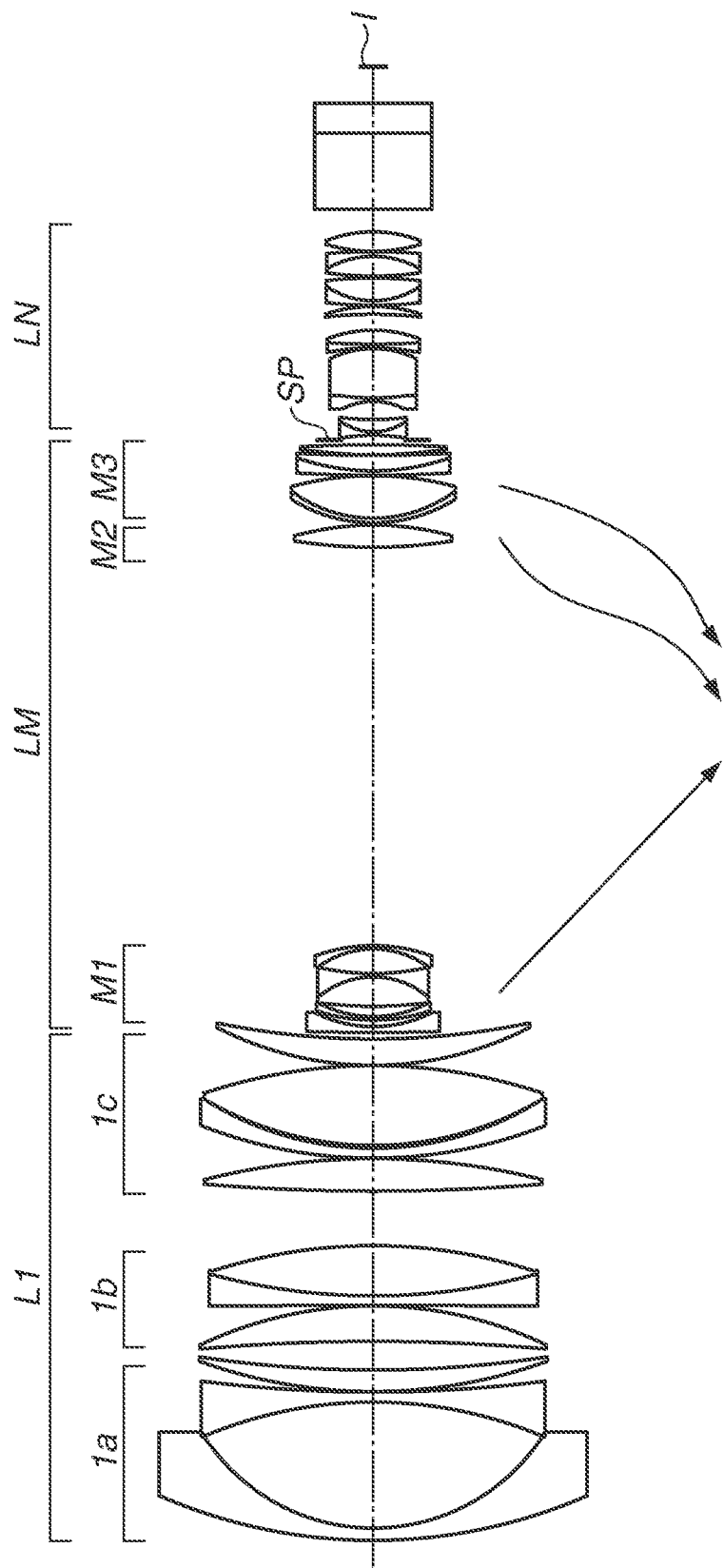
FIG. 13 is a sectional view of a zoom lens in a state of being set at the wide-angle end and at focusing on infinite distance according to Embodiment 7.

FIG. 13 is a sectional view of a zoom lens in a state of being set at the wide-angle end and at focusing on infinite distance according to Embodiment 7. Referring to FIG. 13, components of the zoom lens are described in order from an object side to an image side. The zoom lens includes a first lens unit L1 with a positive refractive power, which does not move for variation of magnification. The first lens unit L1 includes a first lens subunit 1a, which does not move for adjustment of focus. The first lens unit L1 further includes a second lens subunit 1b, which moves toward the image side for adjustment of focus from an infinite-distance object to a minimum-distance object. The first lens unit L1 further includes a third lens subunit 1c, which does not move for adjustment of focus. The zoom lens further includes two or more intermediate lens units LM, which move in variation of magnification and include, in order from the object side to the image side, a first intermediate lens unit M1 with a negative refractive power, a second intermediate lens unit M2 with a positive refractive power, and a third intermediate lens unit M3 with a positive refractive power. The first intermediate lens unit M1 monotonously moves on an optical axis toward the image side for variation of magnification from the wide-angle end to the telephoto end. The second intermediate lens unit M2 monotonously moves on the optical axis toward the object side for such variation of magnification. The third intermediate lens unit M3 monotonously moves on the optical axis toward the object side for such variation of magnification. The zoom lens further includes an aperture stop SP, which does not move in variation of magnification, and a rear lens unit LN with a positive refractive power, which does not move for variation of magnification.

The first lens unit L1 has the first surface to the nineteenth surface. The first lens subunit 1a has the first surface to the sixth surface, and includes two negative lenses and one positive lens. The second lens subunit 1b has the seventh surface and the eleventh surface, and includes one negative lens and two positive lenses. The third lens subunit 1c has the twelfth surface to the nineteenth surface, and includes three positive lenses and one negative lens.

The two or more intermediate lens units LM have the twentieth surface to the thirty-eighth surface. The first intermediate lens unit M1 has the twentieth surface to the twenty-eighth surface, and includes four negative lenses and one positive lens. The second intermediate lens unit M2 has the twenty-ninth surface and the thirtieth surface, and includes one positive lens a surface on the image side of which is an aspheric surface. The third intermediate lens unit M3 has the thirty-first surface to the thirty-eighth surface, and includes two negative lenses and three positive lenses. The aperture stop SP has the thirty-ninth surface. The rear lens unit LN has the fortieth surface to the fifty-eighth surface, and includes five negative lenses and seven positive lenses.

Figure 14A:
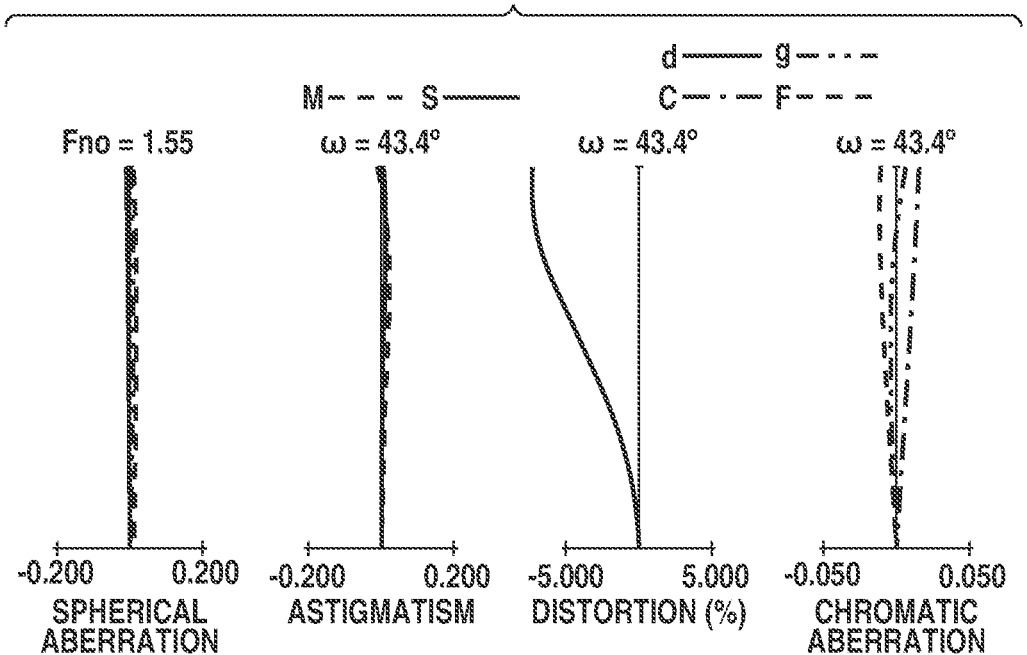
FIG. 14A is a diagram illustrating aberrations occurring in the zoom lens illustrated in FIG. 13 in a state of being set at focusing on infinite distance and at the wide-angle end.
Figure 14B:
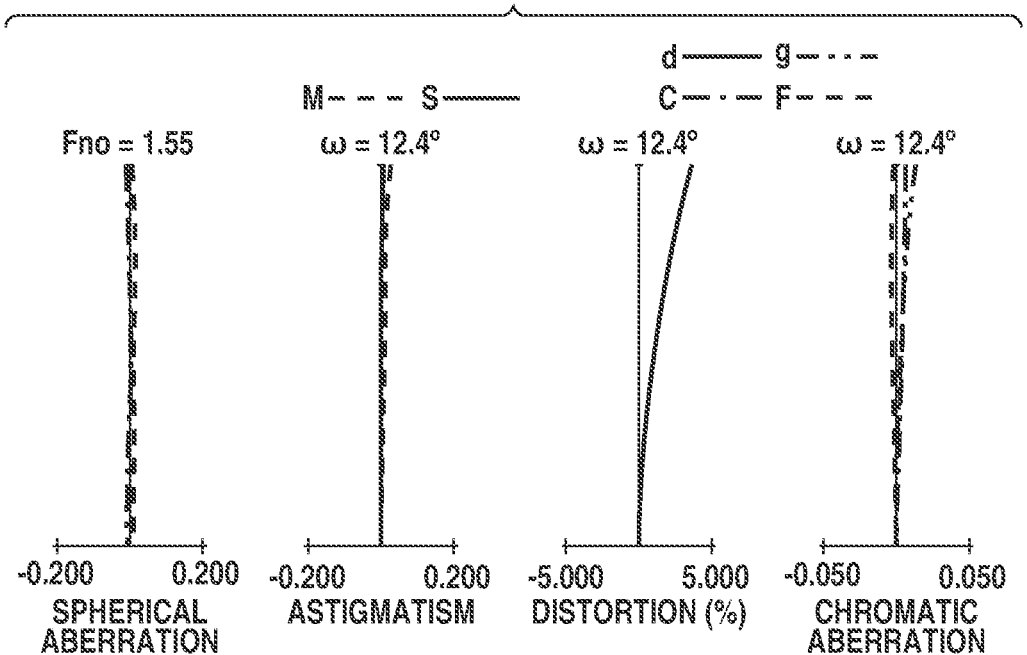
FIG. 14B is a diagram illustrating aberrations occurring in the zoom lens illustrated in FIG. 13 in a state of being set at focusing on infinite distance and in an intermediate zoom state.
Figure 14C:
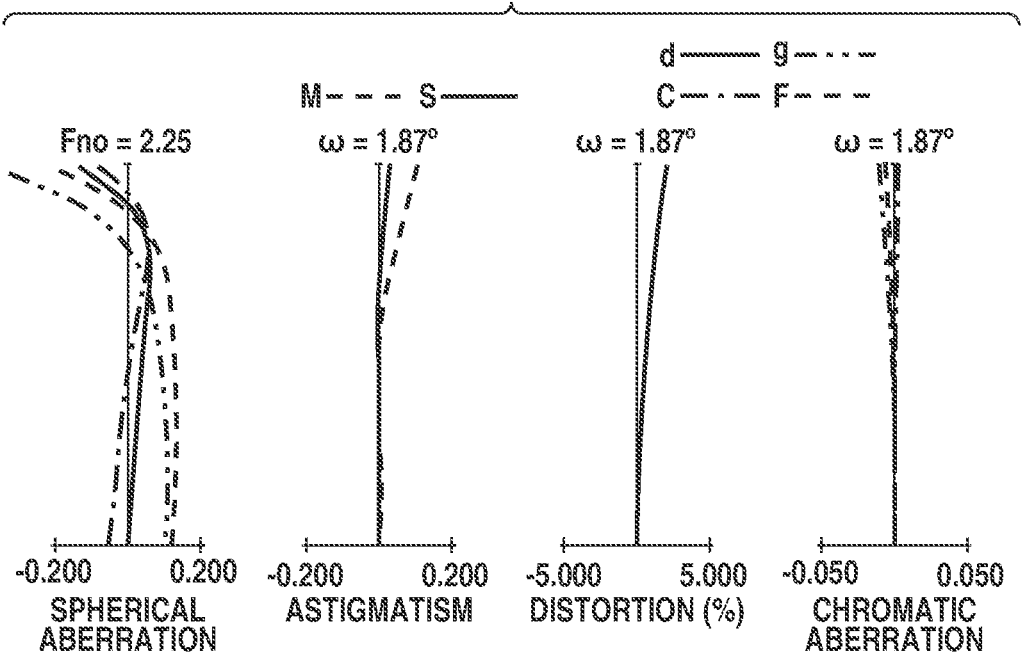
FIG. 14C is a diagram illustrating aberrations occurring in the zoom lens illustrated in FIG. 13 in a state of being set at focusing on infinite distance and at the telephoto end.

FIG. 14A is a diagram illustrating aberrations occurring in the zoom lens illustrated in FIG. 13 in a state of being set at focusing on infinite distance and at the wide-angle end, FIG. 14B is a diagram illustrating aberrations occurring in the zoom lens illustrated in FIG. 13 in a state of being set at focusing on infinite distance and in an intermediate zoom state, and FIG. 14C is a diagram illustrating aberrations occurring in the zoom lens illustrated in FIG. 13 in a state of being set at focusing on infinite distance and at the telephoto end (with regard to the respective focal lengths, see Numerical Embodiment 7). Graph legends illustrated in FIGS. 14A to 14C are the same as those described above with reference to FIGS. 2A to 2C.

Values concerning the inequalities which the present Embodiment satisfies from among the inequalities (1) to (27) and values of the respective variables included in those inequalities are shown in Table 1. Furthermore, the zoom lens according to the present Embodiment satisfies the inequalities which are set to be satisfied by any one of the zoom lenses according to the first to fourth exemplary embodiments, thus attaining a zoom lens advantageous in respect of a wide angle of view, a high zoom ratio, a reduction in size and weight, and a high optical performance.

Embodiment 8

Figure 15:
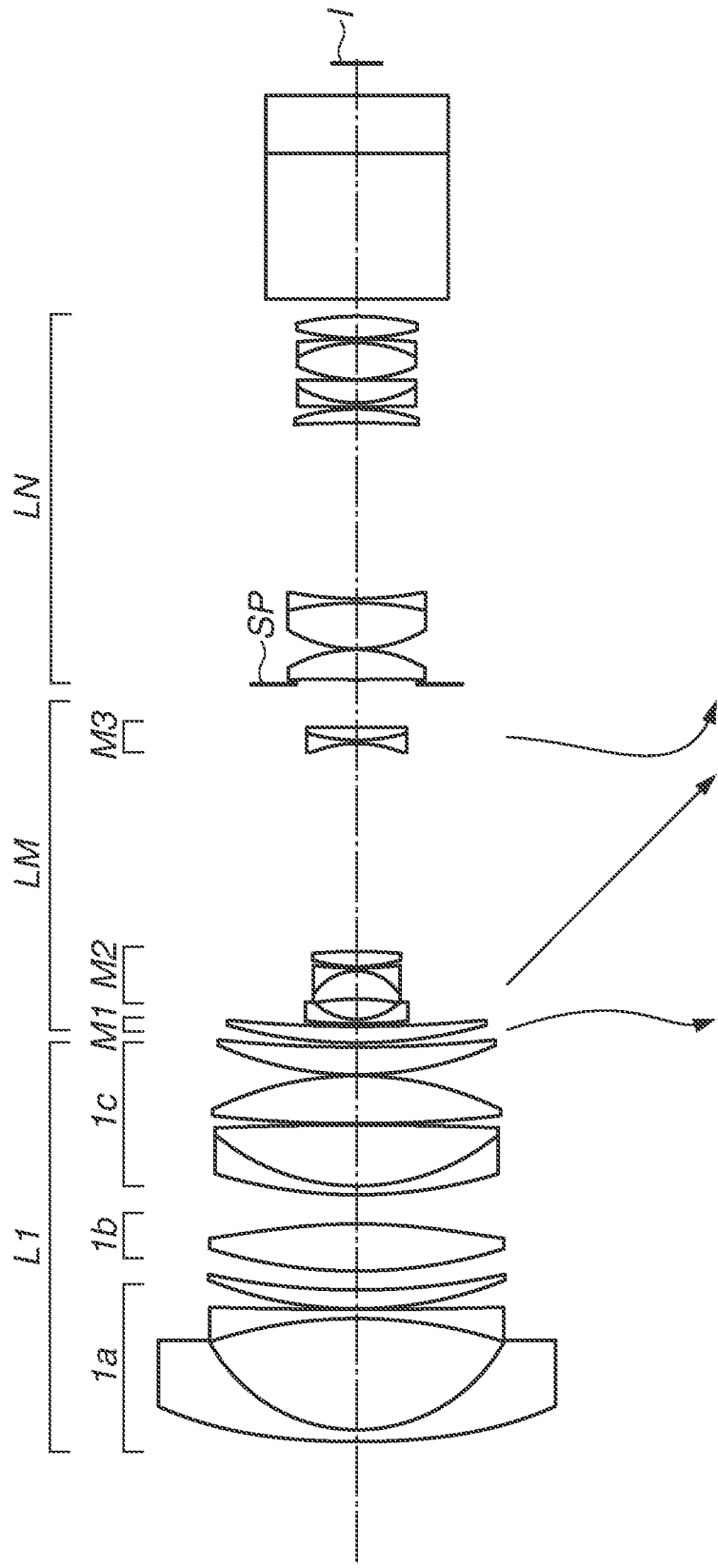
FIG. 15 is a sectional view of a zoom lens in a state of being set at the wide-angle end and at focusing on infinite distance according to Embodiment 8.

FIG. 15 is a sectional view of a zoom lens in a state of being set at the wide-angle end and at focusing on infinite distance according to Embodiment 8. Referring to FIG. 15, components of the zoom lens are described in order from an object side to an image side. The zoom lens includes a first lens unit L1 with a positive refractive power, which does not move for variation of magnification. The first lens unit L1 includes a first lens subunit 1a, which does not move for adjustment of focus. The first lens unit L1 further includes a second lens subunit 1b, which moves toward the image side for adjustment of focus from an infinite-distance object to a minimum-distance object. The first lens unit L1 further includes a third lens subunit 1c, which does not move for adjustment of focus. The zoom lens further includes two or more intermediate lens units LM, which move in variation of magnification and include, in order from the object side to the image side, a first intermediate lens unit M1 with a positive refractive power, a second intermediate lens unit M2 with a negative refractive power, and a third intermediate lens unit M3 with a negative refractive power. The first intermediate lens unit M1 moves on an optical axis (for example, non-monotonously as illustrated) for variation of magnification from the wide-angle end to the telephoto end. This causes the first intermediate lens unit M1 to contribute to attaining a zoom lens with small aberrations and with a reduced size. The second intermediate lens unit M2 monotonously moves on the optical axis toward the image side for such variation of magnification. The third intermediate lens unit M3 moves first toward the object side and then toward the image side for such variation of magnification. The zoom lens further includes an aperture stop SP, which does not move in variation of magnification. The zoom lens further includes a rear lens unit LN with a positive refractive power, which does not move for variation of magnification.

The first lens unit L1 has the first surface to the fifteenth surface. The first lens subunit 1a has the first surface to the sixth surface, and includes two negative lenses and one positive lens. The second lens subunit 1b has the seventh surface and the eighth surface, and includes one positive lens a surface on the image side of which is an aspheric surface. The third lens subunit 1c has the ninth surface to the fifteenth surface, and includes three positive lenses and one negative lens.

The two or more intermediate lens units LM have the sixteenth surface to the twenty-seventh surface. The first intermediate lens unit M1 has the sixteenth surface and the seventeenth surface, and includes one positive lens. The second intermediate lens unit M2 has the eighteenth surface to the twenty-fourth surface, and includes two negative lenses and two positive lenses. The third intermediate lens unit M3 has the twenty-fifth surface to the twenty-seventh surface, and includes one negative lens and one positive lens. The aperture stop SP has the twenty-eighth surface. The rear lens unit LN has the twenty-ninth surface to the forty-third surface, and includes three negative lenses and six positive lenses. Furthermore, the first lens unit L1 to a lens unit (the first intermediate lens unit M1) adjacent, on the object side, to an intermediate lens unit with a negative refractive power (the second intermediate lens unit M2) included in the two or more intermediate lens units and located on a most object side are referred to as a "lens aggregate 1w". Then, the lens aggregate 1w has a positive refractive power at the wide-angle end and at focusing on infinite distance.

Figure 16A:
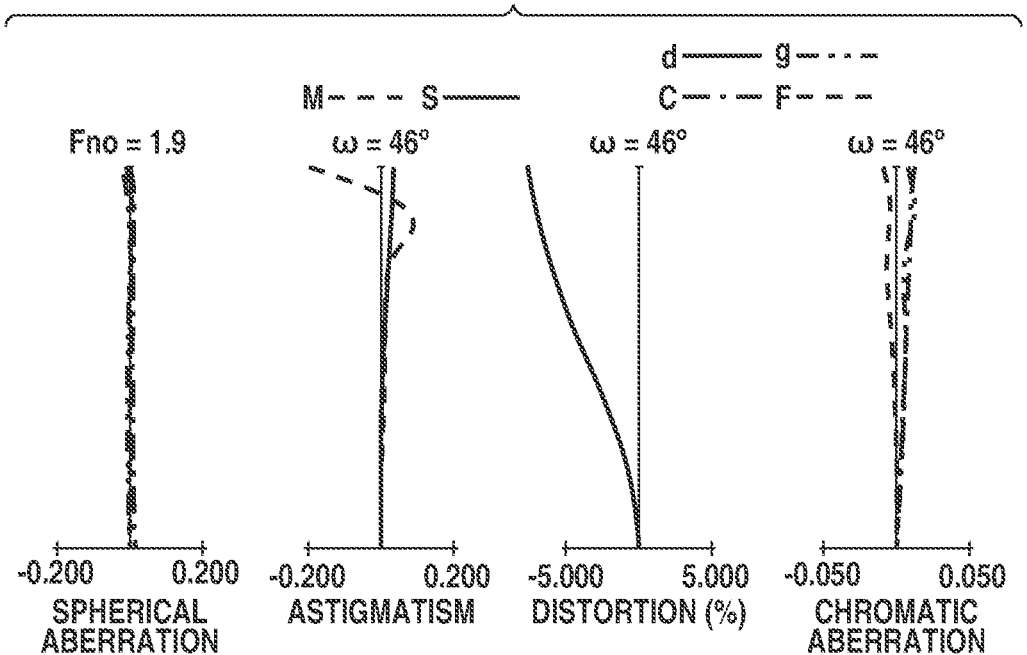
FIG. 16A is a diagram illustrating aberrations occurring in the zoom lens illustrated in FIG. 15 in a state of being set at focusing on infinite distance and at the wide-angle end.
Figure 16B:
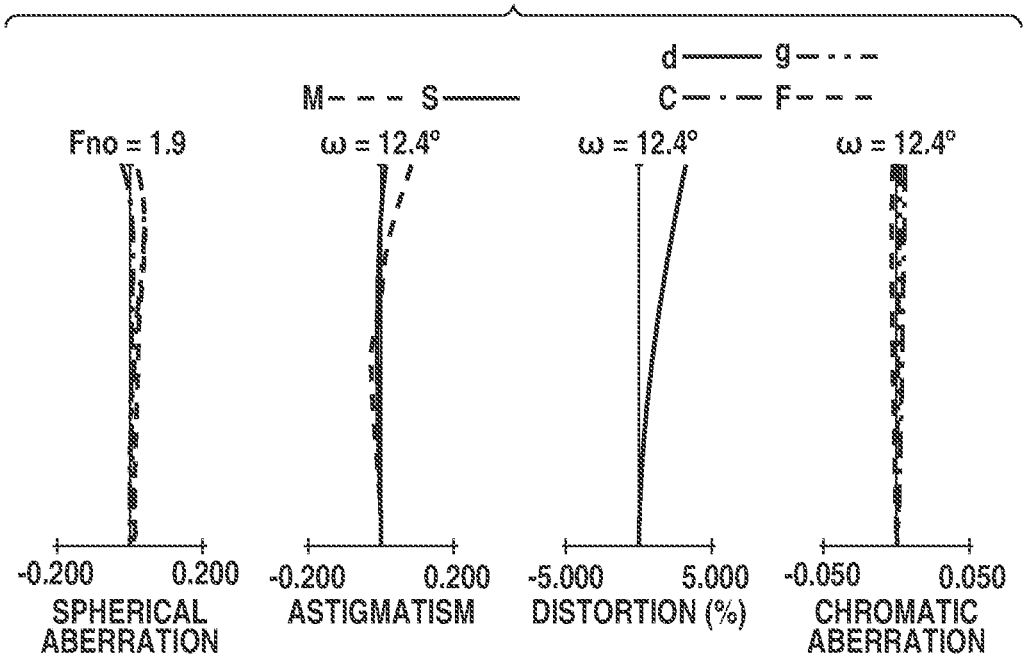
FIG. 16B is a diagram illustrating aberrations occurring in the zoom lens illustrated in FIG. 15 in a state of being set at focusing on infinite distance and in an intermediate zoom state.

FIG. 16A is a diagram illustrating aberrations occurring in the zoom lens illustrated in FIG. 15 in a state of being set at focusing on infinite distance and at the wide-angle end, FIG. 16B is a diagram illustrating aberrations occurring in the zoom lens illustrated in FIG. 15 in a state of being set at focusing on infinite distance and in an intermediate zoom state, and FIG. 16C is a diagram illustrating aberrations occurring in the zoom lens illustrated in FIG. 15 in a state of being set at focusing on infinite distance and at the telephoto end (with regard to the respective focal lengths, see Numerical Embodiment 8). Graph legends illustrated in FIGS. 16A to 16C are the same as those described above with reference to FIGS. 2A to 2C.

Values concerning the inequalities which the present Embodiment satisfies from among the inequalities (1) to (27) and values of the respective variables included in those inequalities are shown in Table 1. Furthermore, the zoom lens according to the present Embodiment satisfies the inequalities which are set to be satisfied by any one of the zoom lenses according to the first to fourth exemplary embodiments, thus attaining a zoom lens advantageous in respect of a wide angle of view, a high zoom ratio, a reduction in size and weight, and a high optical performance.

Embodiment 9

FIG. 17 is a sectional view of a zoom lens in a state of being set at the wide-angle end and at focusing on infinite distance according to Embodiment 9. Referring to FIG. 17, components of the zoom lens are described in order from an object side to an image side. The zoom lens includes a first lens unit L1 with a positive refractive power, which does not move for variation of magnification. The first lens unit L1 includes a first lens subunit 1a, which does not move for adjustment of focus. The first lens unit L1 further includes a second lens subunit 1b, which moves toward the image side for adjustment of focus from an infinite-distance object to a minimum-distance object. The first lens unit L1 further includes a third lens subunit 1c, which does not move for adjustment of focus. The zoom lens further includes two or more intermediate lens units LM, which move in variation of magnification and include, in order from the object side to the image side, a first intermediate lens unit M1 with a negative refractive power, a second intermediate lens unit M2 with a negative refractive power, a third intermediate lens unit M3 with a negative refractive power, and a fourth intermediate lens unit M4 with a negative refractive power. The first intermediate lens unit M1 moves on an optical axis (for example, non-monotonously as illustrated) for variation of magnification from the wide-angle end to the telephoto end. This causes the first intermediate lens unit M1 to contribute to attaining a zoom lens with small aberrations and with a reduced size. The second intermediate lens unit M2 monotonously moves on the optical axis toward the image side for such variation of magnification. This causes the second intermediate lens unit M2 to contribute to attaining a zoom lens with a high zoom ratio and with small aberrations. The third intermediate lens unit M3 monotonously moves on the optical axis toward the image side for such variation of magnification. The fourth intermediate lens unit M4 moves on the optical axis first toward the object side and then toward the image side for such variation of magnification. The zoom lens further includes an aperture stop SP, which does not move in variation of magnification. The zoom lens further includes a rear lens unit LN with a positive refractive power, which does not move for variation of magnification.

The first lens unit L1 has the first surface to the fifteenth surface. The first lens subunit 1a has the first surface to the sixth surface, and includes two negative lenses and one positive lens. The second lens subunit 1b has the seventh surface and the eighth surface, and includes one positive lens a surface on the image side of which is an aspheric surface. The third lens subunit 1c has the ninth surface to the fifteenth surface, and includes three positive lenses and one negative lens.

The two or more intermediate lens units LM have the sixteenth surface to the twenty-ninth surface. The first intermediate lens unit M1 has the sixteenth surface and the seventeenth surface, and includes one negative lens. The second intermediate lens unit M2 has the eighteenth surface and the nineteenth surface, and includes one negative lens. The third intermediate lens unit M3 has the twentieth surface to the twenty-sixth surface, and includes two negative lenses and two positive lenses. The fourth intermediate lens unit M4 has the twenty-seventh surface to the twenty-ninth surface, and includes one negative lens and one positive lens. The aperture stop SP has the thirtieth surface. The rear lens unit LN has the thirty-first surface to the forty-fifth surface, and includes three negative lenses and six positive lenses.

Figure 18A:
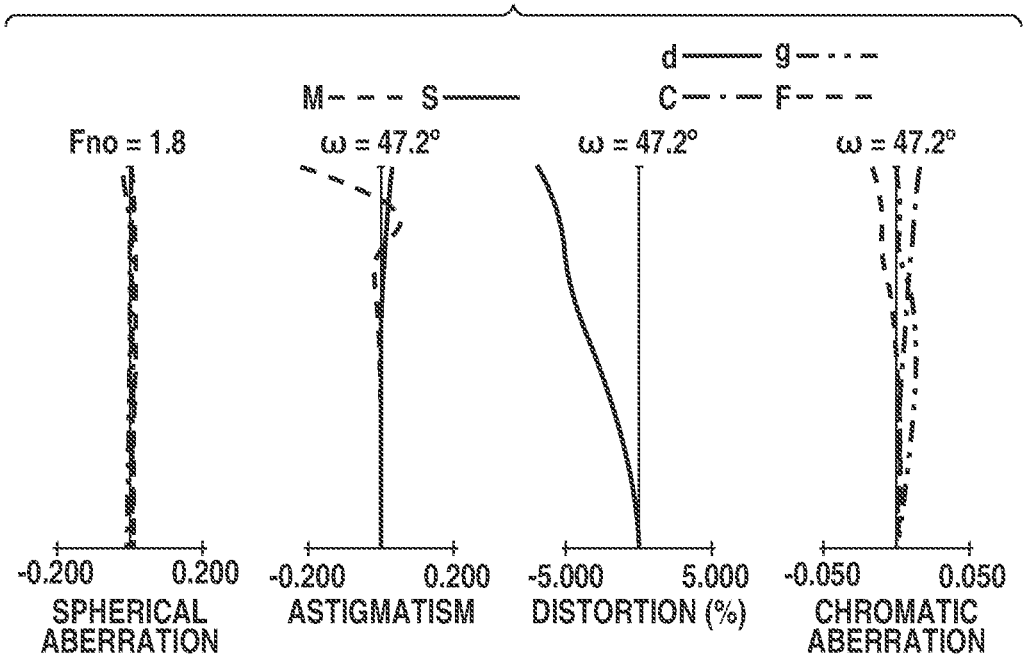
FIG. 18A is a diagram illustrating aberrations occurring in the zoom lens illustrated in FIG. 17 in a state of being set at focusing on infinite distance and at the wide-angle end.
Figure 18B:
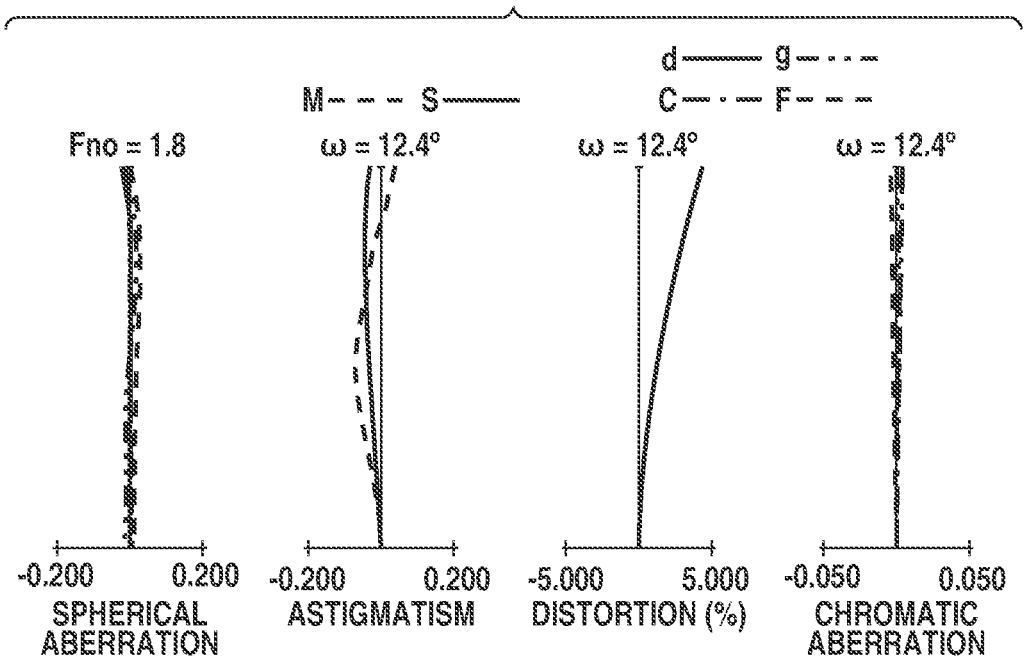
FIG. 18B is a diagram illustrating aberrations occurring in the zoom lens illustrated in FIG. 17 in a state of being set at focusing on infinite distance and in an intermediate zoom state.
Figure 18C:
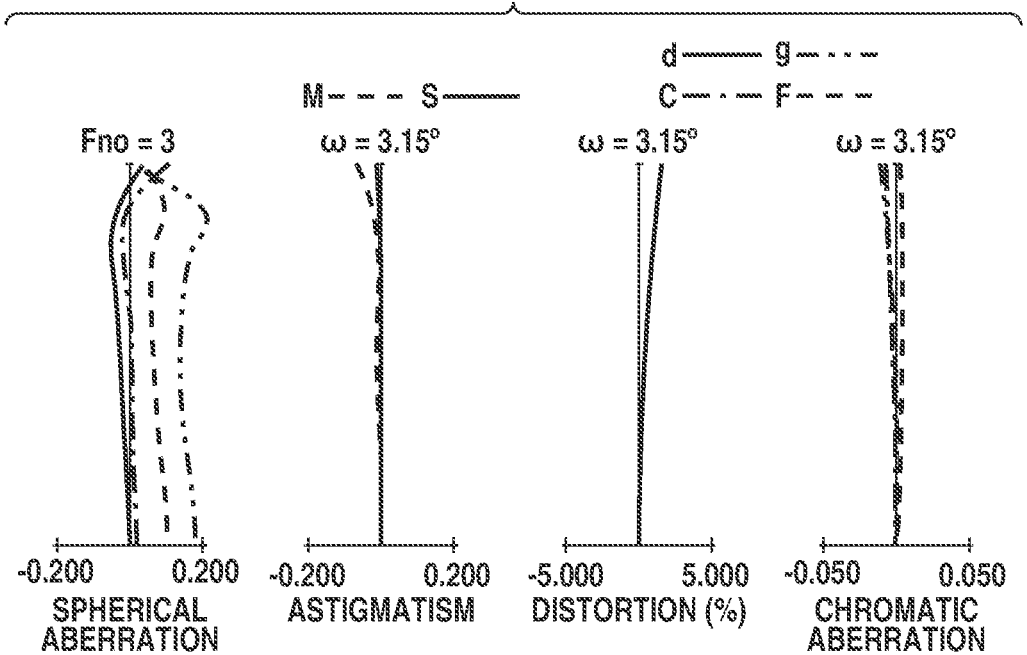
FIG. 18C is a diagram illustrating aberrations occurring in the zoom lens illustrated in FIG. 17 in a state of being set at focusing on infinite distance and at the telephoto end.

FIG. 18A is a diagram illustrating aberrations occurring in the zoom lens illustrated in FIG. 17 in a state of being set at focusing on infinite distance and at the wide-angle end, FIG. 18B is a diagram illustrating aberrations occurring in the zoom lens illustrated in FIG. 17 in a state of being set at focusing on infinite distance and in an intermediate zoom state, and FIG. 18C is a diagram illustrating aberrations occurring in the zoom lens illustrated in FIG. 17 in a state of being set at focusing on infinite distance and at the telephoto end (with regard to the respective focal lengths, see Numerical Embodiment 9). Graph legends illustrated in FIGS. 18A to 18C are the same as those described above with reference to FIGS. 2A to 2C.

Values concerning the inequalities which the present Embodiment satisfies from among the inequalities (1) to (27) and values of the respective variables included in those inequalities are shown in Table 1. Furthermore, the zoom lens according to the present Embodiment satisfies the inequalities which are set to be satisfied by any one of the zoom lenses according to the first to fourth exemplary embodiments, thus attaining a zoom lens advantageous in respect of a wide angle of view, a high zoom ratio, a reduction in size and weight, and a high optical performance.

Embodiment 10

FIG. 19 is a sectional view of a zoom lens in a state of being set at the wide-angle end and at focusing on infinite distance according to Embodiment 10. Referring to FIG. 19, components of the zoom lens are described in order from an object side to an image side. The zoom lens includes a first lens unit L1 with a positive refractive power, which does not move for variation of magnification. The first lens unit L1 includes a first lens subunit 1a, which does not move for adjustment of focus. The first lens unit L1 further includes a second lens subunit 1b, which moves toward the image side for adjustment of focus from an infinite-distance object to a minimum-distance object. The first lens unit L1 further includes a third lens subunit 1c, which does not move for adjustment of focus. The zoom lens further includes two or more intermediate lens units LM, which move in variation of magnification and include, in order from the object side to the image side, a first intermediate lens unit M1 with a negative refractive power, a second intermediate lens unit M2 with a negative refractive power, and a third intermediate lens unit M3 with a positive refractive power. The first intermediate lens unit M1 monotonously moves on an optical axis toward the image side for variation of magnification from the wide-angle end to the telephoto end. The second intermediate lens unit M2 moves on the optical axis first toward the object side and then toward the image side for such variation of magnification. The third intermediate lens unit M3 moves on the optical axis (for example, non-monotonously as illustrated) for such variation of magnification. The zoom lens further includes an aperture stop SP, which does not move in variation of magnification. The zoom lens further includes a rear lens unit LN with a positive refractive power, which does not move for variation of magnification.

The first lens unit L1 has the first surface to the seventeenth surface. The first lens subunit 1a has the first surface to the sixth surface, and includes two negative lenses and one positive lens. The second lens subunit 1b has the seventh surface and the eighth surface, and includes one positive lens a surface on the image side of which is an aspheric surface. The third lens subunit 1c has the ninth surface to the seventeenth surface, and includes four positive lenses and one negative lens.

The two or more intermediate lens units LM have the eighteenth surface to the thirty-second surface. The first intermediate lens unit M1 has the eighteenth surface to the twenty-fourth surface, and includes two negative lenses and two positive lenses. The second intermediate lens unit M2 has the twenty-fifth surface to the twenty-seventh surface, and includes one negative lens and one positive lens. The third intermediate lens unit M3 has the twenty-eighth surface to the thirty-second surface, and includes one negative lens and two positive lenses. The aperture stop SP has the thirty-third surface. The rear lens unit LN has the thirty-fourth surface to the forty-third surface, and includes two negative lenses and four positive lenses.

Figure 20A:
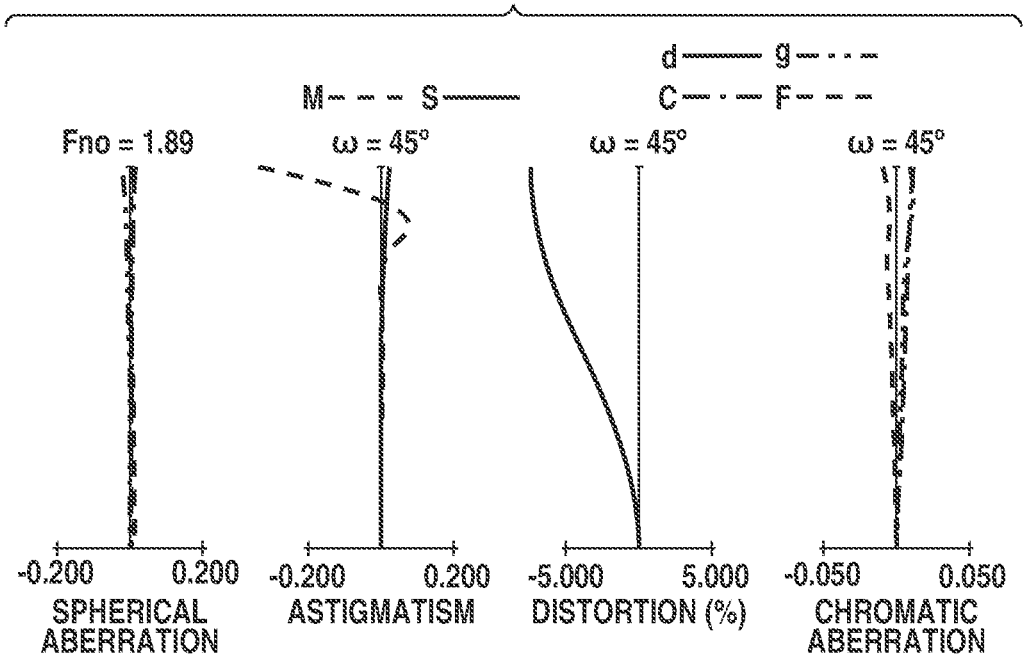
FIG. 20A is a diagram illustrating aberrations occurring in the zoom lens illustrated in FIG. 19 in a state of being set at focusing on infinite distance and at the wide-angle end.
Figure 20B:
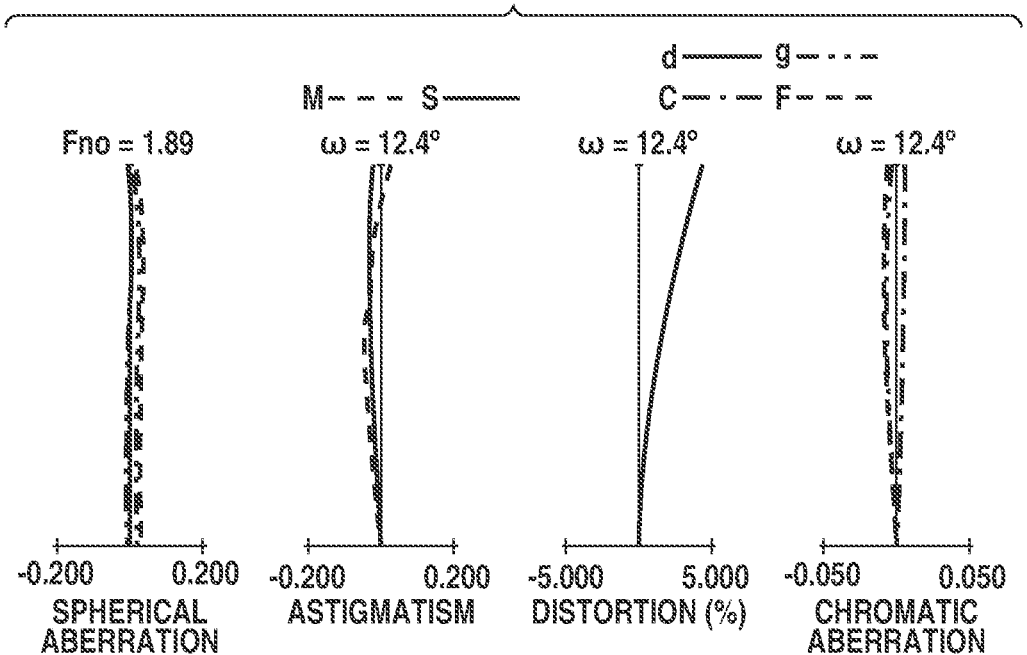
FIG. 20B is a diagram illustrating aberrations occurring in the zoom lens illustrated in FIG. 19 in a state of being set at focusing on infinite distance and in an intermediate zoom state.

FIG. 20A is a diagram illustrating aberrations occurring in the zoom lens illustrated in FIG. 19 in a state of being set at focusing on infinite distance and at the wide-angle end, FIG. 20B is a diagram illustrating aberrations occurring in the zoom lens illustrated in FIG. 19 in a state of being set at focusing on infinite distance and in an intermediate zoom state, and FIG. 20C is a diagram illustrating aberrations occurring in the zoom lens illustrated in FIG. 19 in a state of being set at focusing on infinite distance and at the telephoto end (with regard to the respective focal lengths, see Numerical Embodiment 10). Graph legends illustrated in FIGS. 20A to 20C are the same as those described above with reference to FIGS. 2A to 2C.

Values concerning the inequalities which the present Embodiment satisfies from among the inequalities (1) to (27) and values of the respective variables included in those inequalities are shown in Table 1. Furthermore, the zoom lens according to the present Embodiment satisfies the inequalities which are set to be satisfied by any one of the zoom lenses according to the first to fourth exemplary embodiments, thus attaining a zoom lens advantageous in respect of a wide angle of view, a high zoom ratio, a reduction in size and weight, and a high optical performance.

Embodiment 11

Figure 21:
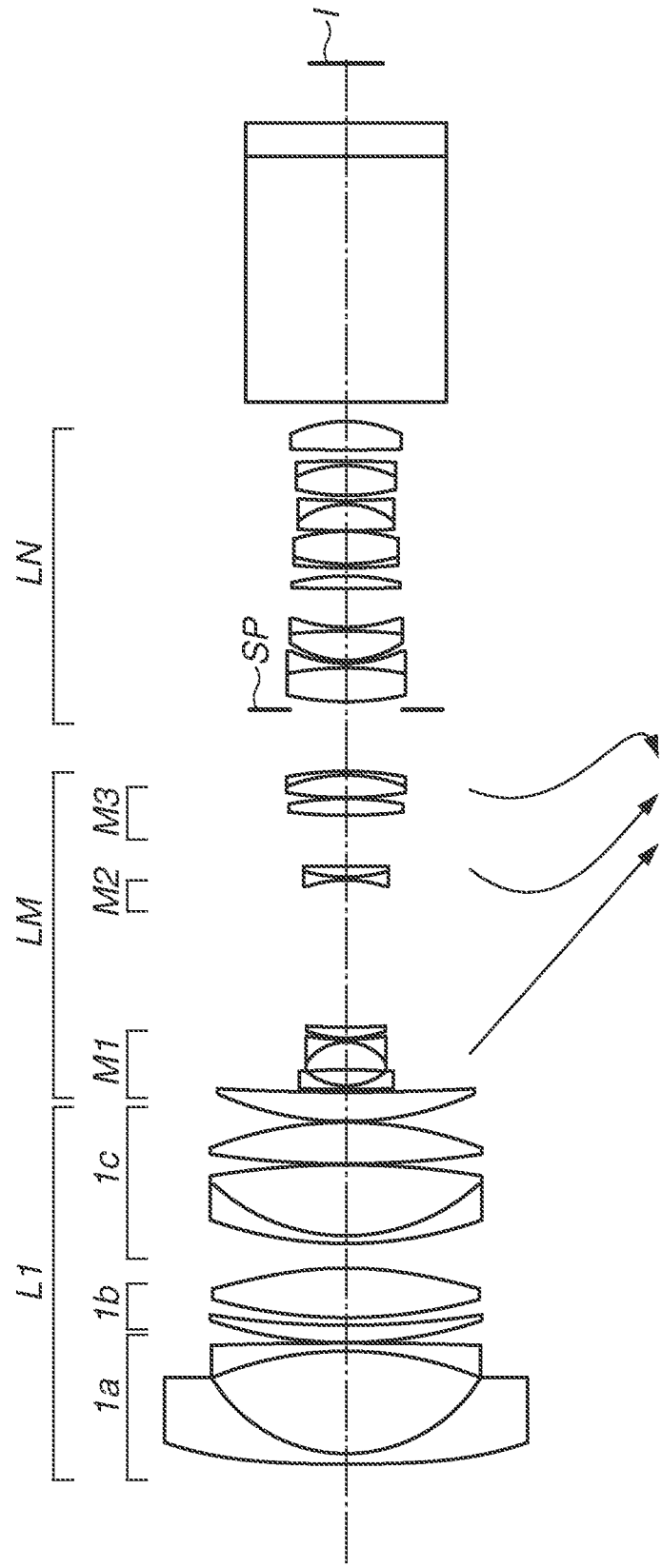
FIG. 21 is a sectional view of a zoom lens in a state of being set at the wide-angle end and at focusing on infinite distance according to Embodiment 11.

FIG. 21 is a sectional view of a zoom lens in a state of being set at the wide-angle end and at focusing on infinite distance according to Embodiment 11. Referring to FIG. 21, components of the zoom lens are described in order from an object side to an image side. The zoom lens includes a first lens unit L1 with a positive refractive power, which does not move for variation of magnification. The first lens unit L1 includes a first lens subunit 1a, which does not move for adjustment of focus. The first lens unit L1 further includes a second lens subunit 1b, which moves toward the image side for adjustment of focus from an infinite-distance object to a minimum-distance object. The first lens unit L1 further includes a third lens subunit 1c, which does not move for adjustment of focus. The zoom lens further includes two or more intermediate lens units LM, which move in variation of magnification and include, in order from the object side to the image side, a first intermediate lens unit M1 with a negative refractive power, a second intermediate lens unit M2 with a negative refractive power, and a third intermediate lens unit M3 with a positive refractive power. The first intermediate lens unit M1 monotonously moves on an optical axis toward the image side for variation of magnification from the wide-angle end to the telephoto end. The second intermediate lens unit M2 moves on the optical axis first toward the object side and then toward the image side for such variation of magnification. The third intermediate lens unit M3 moves on the optical axis (for example, non-monotonously as illustrated) for such variation of magnification. The zoom lens further includes an aperture stop SP, which does not move in variation of magnification. The zoom lens further includes a rear lens unit LN with a positive refractive power, which does not move for variation of magnification.

The first lens unit L1 has the first surface to the fifteenth surface. The first lens subunit 1a has the first surface to the sixth surface, and includes two negative lenses and one positive lens. The second lens subunit 1b has the seventh surface and the eighth surface, and includes one positive lens a surface on the image side of which is an aspheric surface. The third lens subunit 1c has the ninth surface to the fifteenth surface, and includes three positive lenses and one negative lens.

The two or more intermediate lens units LM have the sixteenth surface to the thirtieth surface. The first intermediate lens unit M1 has the sixteenth surface to the twenty-second surface, and includes two negative lenses and two positive lenses. The second intermediate lens unit M2 has the twenty-third surface to the twenty-fifth surface, and includes one negative lens and one positive lens. The third intermediate lens unit M3 has the twenty-sixth surface to the thirtieth surface, and includes one negative lens and two positive lenses. The aperture stop SP has the thirty-first surface. The rear lens unit LN has the thirty-second surface to the fiftieth surface, and includes five negative lenses and seven positive lenses.

Figure 22A:
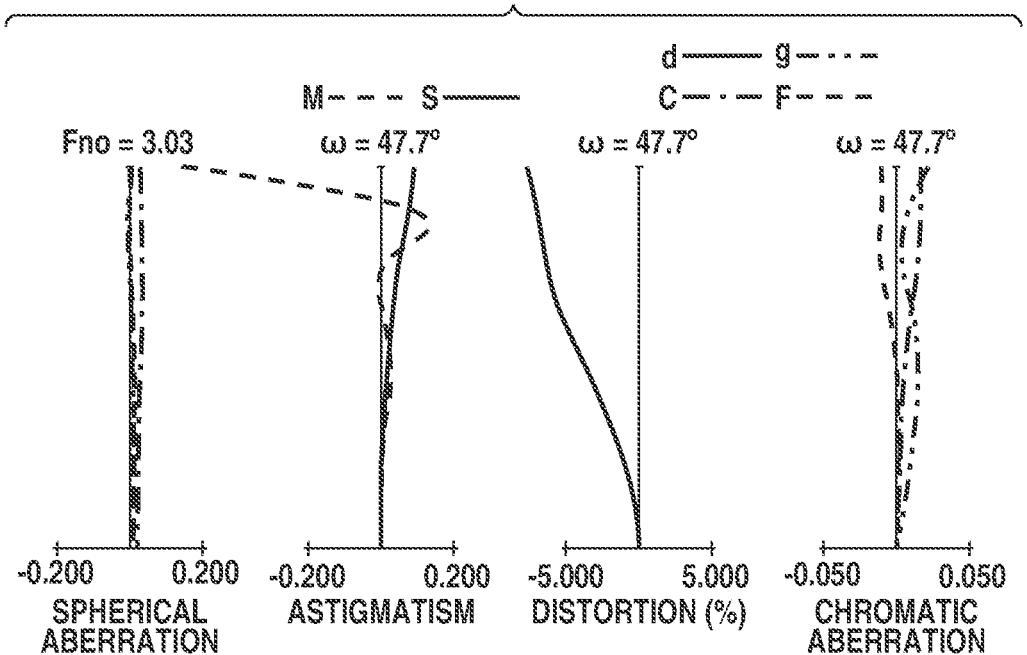
FIG. 22A is a diagram illustrating aberrations occurring in the zoom lens illustrated in FIG. 21 in a state of being set at focusing on infinite distance and at the wide-angle end.
Figure 22B:
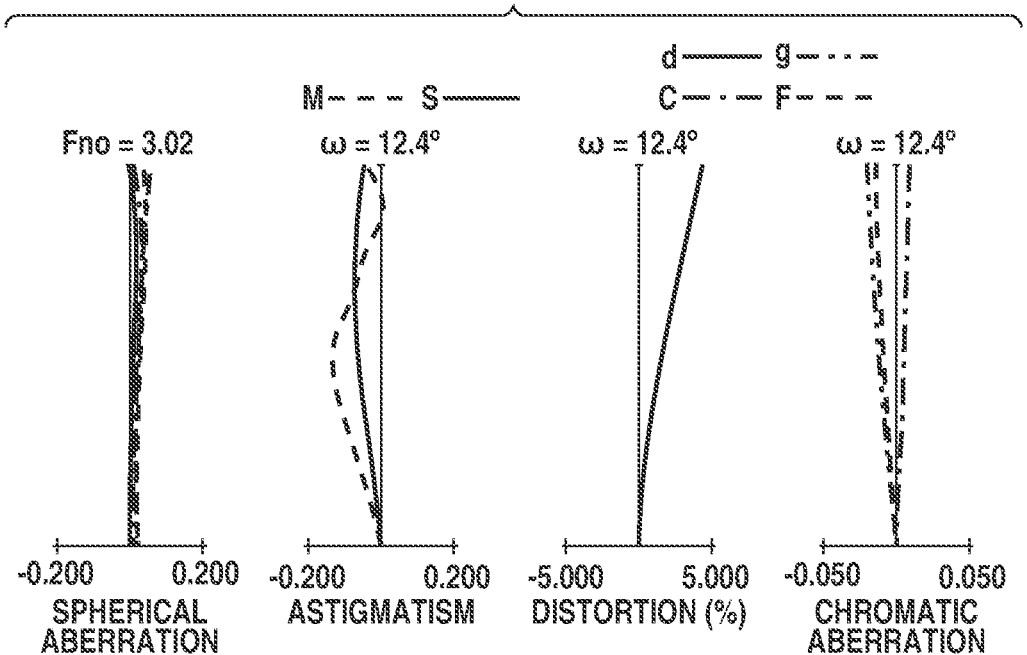
FIG. 22B is a diagram illustrating aberrations occurring in the zoom lens illustrated in FIG. 21 in a state of being set at focusing on infinite distance and in an intermediate zoom state.
Figure 22C:
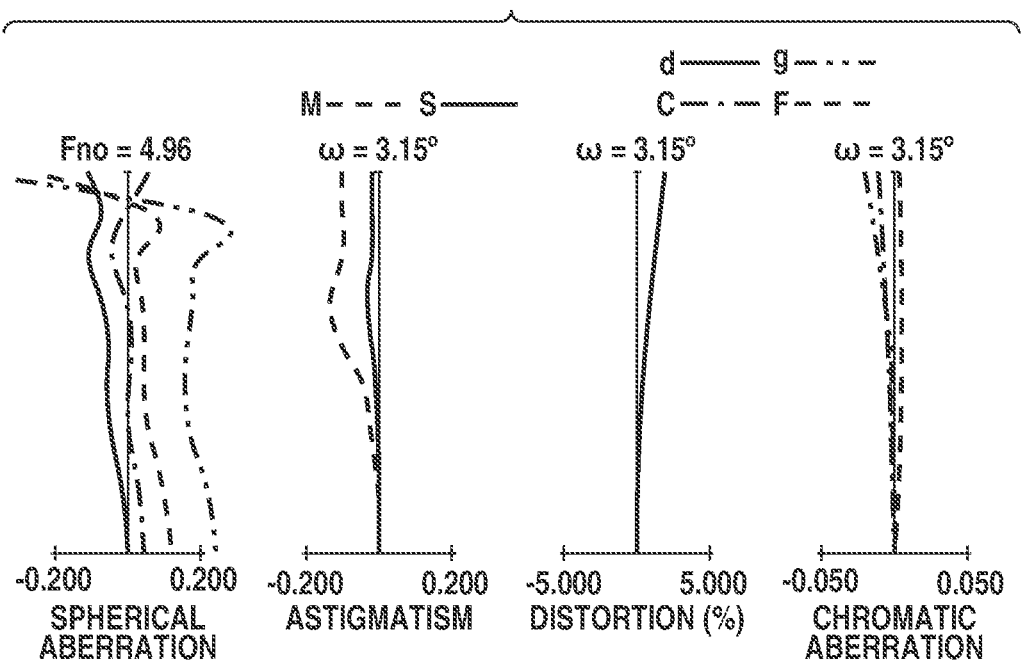
FIG. 22C is a diagram illustrating aberrations occurring in the zoom lens illustrated in FIG. 21 in a state of being set at focusing on infinite distance and at the telephoto end.

FIG. 22A is a diagram illustrating aberrations occurring in the zoom lens illustrated in FIG. 21 in a state of being set at focusing on infinite distance and at the wide-angle end, FIG. 22B is a diagram illustrating aberrations occurring in the zoom lens illustrated in FIG. 21 in a state of being set at focusing on infinite distance and in an intermediate zoom state, and FIG. 22C is a diagram illustrating aberrations occurring in the zoom lens illustrated in FIG. 21 in a state of being set at focusing on infinite distance and at the telephoto end (with regard to the respective focal lengths, see Numerical Embodiment 11). Graph legends illustrated in FIGS. 22A to 22C are the same as those described above with reference to FIGS. 2A to 2C.

Values concerning the inequalities which the present Embodiment satisfies from among the inequalities (1) to (27) and values of the respective variables included in those inequalities are shown in Table 1. Furthermore, the zoom lens according to the present Embodiment satisfies the inequalities which are set to be satisfied by any one of the zoom lenses according to the first to fourth exemplary embodiments, thus attaining a zoom lens advantageous in respect of a wide angle of view, a high zoom ratio, a reduction in size and weight, and a high optical performance.

Furthermore, while, in Embodiment 1 to Embodiment 11, the rear lens unit is configured not to move, the rear lens unit or a part thereof (a lens subunit or subunits thereof) can be configured to move. Even with such a configuration employed, advantageous effects described above can be attained, and, moreover, such an alteration is easy for any person skilled in the art. For example, in Embodiment 1 (Numerical Embodiment 1), portions corresponding to the thirty-second surface to the forty-first surface in the rear lens unit LN can be configured to move. Since an approximately afocal light flux falls on the thirty-second surface from the object side, even if such portions are configured to move, optical characteristics other than back focal distance become almost unvarying. Therefore, such portions are able to be used as lens subunits which move to compensate for any variation of focusing. Furthermore, factors of variation of focusing which the rear lens unit or a lens subunit or subunits thereof compensate for by moving can include at least one of, for example, a manufacturing error, a temperature change, and an orientation change of a zoom lens.

The following are details of numerical values employed in the respective Numerical Embodiments. In each Numerical Embodiment, "r" denotes the radius of curvature of each surface, "d" denotes a surface interval between every adjacent surfaces, "nd" or "Nd" denotes an absolute refractive index at 1 atmosphere (atm) with respect to d-line of the Fraunhofer lines, and "vd" denotes an abbe number that is based on d-line. The "half angle of view" $\omega$ is assumed to be expressed by an equation of "$\omega$=arctan(Y/fw)", where 2Y denotes the diagonal image size of a camera for which the zoom lens is used and fw denotes the focal length of the zoom lens at the wide-angle end. The "maximum image height" is equivalent to half Y (for example, 5.50 mm) of the diagonal image size 2Y (for example, 11.00 mm). BF denotes the back focal distance (length reduced to air). The last three surfaces are surfaces of a glass block such as a filter. Refractive indices with respect to F-line, d-line, and C-line of the Fraunhofer lines are denoted by NF, Nd, and NC, respectively, and the definition of the abbe number vd is similar to that generally used and is thus expressed as follows.

$$vd=(Nd-1)/(NF-NC)$$

The shape of an aspheric surface is expressed with the X-axis taken in the optical axis direction, the H-axis taken in a direction perpendicular to the optical axis direction, and the direction of travel of light regarded as plus. "R" denotes a paraxial radius of curvature, "k" denotes a conic constant, and A3, A4, A5, A6, A7, A8, A9, A10, A11, A12, A13, A14, A15, and A16 denote respective aspheric surface coefficients. Then, the shape of an aspheric surface (the amount of deviation from a reference spherical surface) is expressed by the following equation. Furthermore, "e-Z" means "$\times 10^{-Z}$". Moreover, the mark "*" added to the right of a surface number indicates that the surface concerned is an aspheric surface.

$$X = \frac{H^2/R}{1+\sqrt{1-(1+k)(H/R)^2}} + A4H^4 + A6H^6 +$$

$$A8H^8 + A10H^{10} + A12H^{12} + A14H^{14} + A16H^{16} +$$

$$A3H^3 + A5H^5 + A7H^7 + A9H^9 + A11H^{11} + A13H^{13} +$$

$$A15H^{15}$$

Numerical Embodiment 1

Unit mm
Surface Data

| Surface-Number | r | d | nd | vd |
|---|---|---|---|---|
| 1* | 500.330 | 2.70 | 1.80100 | 35.0 |
| 2 | 39.955 | 26.31 | | |
| 3 | −89.311 | 2.10 | 1.80400 | 46.5 |
| 4 | −1001.878 | 0.15 | | |
| 5 | 109.581 | 4.42 | 1.92286 | 20.9 |
| 6 | 221.045 | 1.98 | | |
| 7 | 126.427 | 12.71 | 1.49700 | 81.5 |
| 8* | −92.943 | 6.32 | | |
| 9 | 102.627 | 2.00 | 1.78880 | 28.4 |
| 10 | 49.877 | 18.20 | 1.43875 | 94.7 |
| 11 | −212.942 | 0.28 | | |
| 12 | 242.159 | 10.64 | 1.43387 | 95.1 |
| 13 | −94.489 | 0.28 | | |
| 14 | 79.565 | 7.49 | 1.76385 | 48.5 |
| 15 | 606.043 | (variable) | | |
| 16* | 736.595 | 0.95 | 2.00100 | 29.1 |
| 17 | 15.859 | 4.13 | | |
| 18 | −121.808 | 7.10 | 1.85896 | 22.7 |
| 19 | −12.201 | 0.70 | 1.88300 | 40.8 |
| 20 | 68.231 | 0.30 | | |
| 21 | 29.019 | 2.80 | 1.63980 | 34.5 |
| 22 | 186.432 | (variable) | | |
| 23 | −30.936 | 0.80 | 1.75500 | 52.3 |
| 24 | 39.519 | 2.70 | 1.85478 | 24.8 |
| 25 | 1479.033 | (variable) | | |
| 26* | 110.426 | 4.35 | 1.64000 | 60.1 |
| 27 | −74.651 | 0.20 | | |
| 28 | 85.876 | 5.82 | 1.56732 | 42.8 |
| 29 | −40.515 | 1.00 | 2.00100 | 29.1 |
| 30 | −79.241 | (variable) | | |
| 31 (stop) | ∞ | 39.88 | | |
| 32 | −235.756 | 2.74 | 1.80518 | 25.4 |
| 33 | −60.480 | 2.43 | | |
| 34 | 53.586 | 0.90 | 1.88300 | 40.8 |
| 35 | 20.720 | 4.82 | 1.51633 | 64.1 |

-continued

Unit mm
Surface Data

| | | | | |
|---|---|---|---|---|
| 36 | 48.207 | 0.19 | | |
| 37 | 28.453 | 9.36 | 1.43875 | 94.7 |
| 38 | −28.782 | 0.90 | 2.00100 | 29.1 |
| 39 | −127.418 | 0.38 | | |
| 40 | 59.010 | 5.79 | 1.48749 | 70.2 |
| 41 | −41.841 | 4.00 | | |
| 42 | ∞ | 33.00 | 1.60859 | 46.4 |
| 43 | ∞ | 13.20 | 1.51633 | 64.1 |
| 44 | ∞ | 7.41 | | |
| Image plane | ∞ | | | |

Aspheric Surface Data

First Surface k = 1.99982e+000 A4 = 1.89404e−006 A6 = 8.65498e−009
A8 = −1.75293e−011 A10 = −7.00492e−015 A12 = −3.32555e−019
A14 = 4.96067e−022 A16 = 3.65770e−025 A3 = −1.20757e−006
A5 = −1.47427e−007 A7 = −4.68546e−011 A9 = 7.28090e−013
A11 = −1.15840e−016 A13 = 7.73179e−020 A15 = −4.16276e−023
Eighth Surface k = 1.32032e+000 A4 = 1.09313e−006 A6 = −4.74443e−009
A8 = −2.57852e−011 A10 = −4.41073e−015 A12 = 6.33335e−018
A14 = 8.62430e−021 A16 = 2.14350e−024 A3 = −6.01914e−008
A5 = 1.89485e−008 A7 = 4.83312e−010 A9 = 7.02322e−013
A11 = −2.51087e−016 A13 = −1.58513e−019 A15 = −2.31238e−022
Sixteenth Surface k = 1.99969e+000 A4 = 1.35996e−005 A6 = 6.82628e−007
A8 = 1.70270e−008 A10 = 5.75227e−010 A12 = 7.92934e−012
A14 = −3.44541e−014 A16 = −7.75048e−017 A3 = 3.76275e−006
A5 = −2.52945e−006 A7 = −1.36067e−007 A9 = −2.35939e−009
A11 = −9.70304e−011 A13 = −1.13653e−013 A15 = 2.89879e−015
Twenty-sixth Surface k = 1.99998e+000 A4 = −2.67652e−006 A6 = 1.80427e−009
A8 = −2.11742e−012

Various Pieces of Data
Zoom Ratio 20.00

| | Wide-Angle | Intermediate | Telephoto |
|---|---|---|---|
| Focal Length | 5.00 | 25.00 | 100.00 |
| F-number | 1.80 | 1.80 | 2.95 |
| Half Angle of View | 47.73 | 12.41 | 3.15 |
| Maximum Image Height | 5.50 | 5.50 | 5.50 |
| Total Lens Length | 318.85 | 318.85 | 318.85 |
| BF | 7.41 | 7.41 | 7.41 |
| d15 | 0.70 | 42.30 | 54.93 |
| d22 | 37.82 | 3.31 | 3.16 |
| d25 | 13.11 | 17.20 | 1.68 |
| d30 | 15.82 | 4.65 | 7.67 |

Zoom Lens Unit Data

| Unit | Beginning Surface | Focal length |
|---|---|---|
| 1 | 1 | 40.24 |
| 2 | 16 | −15.48 |
| 3 | 23 | −44.53 |
| 4 | 26 | 44.65 |
| 5 | 31 | 50.05 |

Numerical Embodiment 2

Unit mm
Surface Data

| Surface-Number | r | d | nd | vd |
|---|---|---|---|---|
| 1* | 174.041 | 2.70 | 1.83481 | 42.7 |
| 2 | 40.624 | 19.15 | | |
| 3 | −1313.075 | 2.10 | 1.83481 | 42.7 |
| 4 | 354.389 | 8.34 | | |
| 5 | −88.120 | 2.10 | 1.80400 | 46.5 |
| 6 | −1624.589 | 0.15 | | |
| 7 | 115.265 | 4.13 | 1.95906 | 17.5 |
| 8 | 238.199 | 3.07 | | |
| 9 | 123.287 | 13.57 | 1.49700 | 81.5 |
| 10* | −79.214 | 5.65 | | |
| 11 | 111.728 | 2.00 | 1.85478 | 24.8 |
| 12 | 51.788 | 15.57 | 1.43875 | 94.7 |
| 13 | −254.503 | 0.30 | | |
| 14 | 137.921 | 11.19 | 1.43387 | 95.1 |
| 15 | −106.737 | 0.29 | | |
| 16 | 74.652 | 8.34 | 1.76385 | 48.5 |
| 17 | 1786.354 | (variable) | | |
| 18* | 1005.944 | 0.95 | 2.00100 | 29.1 |
| 19 | 16.033 | 3.97 | | |
| 20 | −187.770 | 6.39 | 1.85896 | 22.7 |
| 21 | −13.138 | 0.70 | 1.88300 | 40.8 |
| 22 | 55.404 | 0.30 | | |
| 23 | 27.266 | 3.05 | 1.63980 | 34.5 |
| 24 | 300.985 | (variable) | | |
| 25 | −26.985 | 0.80 | 1.75500 | 52.3 |
| 26 | 32.854 | 2.89 | 1.85478 | 24.8 |
| 27 | 785.921 | (variable) | | |
| 28* | 56.082 | 5.05 | 1.59522 | 67.7 |
| 29 | −95.825 | 0.20 | | |
| 30 | −510.689 | 5.43 | 1.56732 | 42.8 |
| 31 | −28.443 | 1.00 | 2.00100 | 29.1 |
| 32 | −45.222 | (variable) | | |
| 33 (stop) | ∞ | 39.89 | | |
| 34 | 112.601 | 3.09 | 1.80518 | 25.4 |
| 35 | −124.592 | 2.06 | | |
| 36 | 78.371 | 0.90 | 1.88300 | 40.8 |
| 37 | 20.087 | 4.77 | 1.51633 | 64.1 |
| 38 | 45.784 | 0.20 | | |
| 39 | 29.919 | 9.18 | 1.43875 | 94.7 |
| 40 | −26.618 | 0.90 | 2.00100 | 29.1 |
| 41 | −82.046 | 0.49 | | |
| 42 | 67.966 | 5.90 | 1.48749 | 70.2 |
| 43 | −37.203 | 4.00 | | |
| 44 | ∞ | 33.00 | 1.60859 | 46.4 |
| 45 | ∞ | 13.20 | 1.51633 | 64.1 |
| 46 | ∞ | 7.41 | | |
| Image plane | ∞ | | | |

Aspheric Surface Data

First Surface k = −2.00107e+000 A4 = 1.10973e−006 A6 = 7.57220e−009
A8 = −1.80903e−011 A10 = −6.63204e−015 A12 = −4.31184e−019
A14 = 4.41491e−022 A16 = 3.59526e−025 A3 = −1.59188e−006
A5 = −1.25946e−007 A7 = 1.63633e−012 A9 = 7.13431e−013
A11 = −1.16204e−016 A13 = 7.98730e−020 A15 = −4.07184e−023
Tenth Surface k = 3.19845e−001 A4 = 9.27271e−007 A6 = −4.19167e−009
A8 = −2.51571e−011 A10 = −4.80914e−015 A12 = 6.37532e−018
A14 = 8.83496e−021 A16 = 2.32484e−024 A3 = −1.33889e−007
A5 = 1.74292e−008 A7 = 4.48536e−010 A9 = 7.23194e−013
A11 = −2.71872e−016 A13 = −1.40477e−019 A15 = −2.49061e−022
Eighteenth Surface k = 2.00000e+000 A4 = 9.51878e−006 A6 = 4.67898e−007
A8 = 1.82309e−008 A10 = 5.53819e−010 A12 = 8.12146e−012
A14 = −3.54721e−014 A16 = −6.73362e−017 A3 = 5.78892e−006
A5 = −1.25384e−006 A7 = −1.21010e−007 A9 = −2.55969e−009
A11 = −9.46183e−011 A13 = −1.18997e−013 A15 = 2.78157e−015

-continued

Unit mm
Surface Data

Twenty-eighth Surface k = −2.00001e+000 A4 = −2.87526e−006 A6 = 3.63896e−009
A8 = −3.03565e−012

Various Pieces of Data
Zoom Ratio 19.58

| | Wide-Angle | Intermediate | Telephoto |
|---|---|---|---|
| Focal Length | 5.10 | 25.00 | 99.97 |
| F-number | 1.89 | 1.89 | 3.09 |
| Half Angle of View | 47.14 | 12.41 | 3.15 |
| Maximum Image Height | 5.50 | 5.50 | 5.50 |
| Total Lens Length | 318.53 | 318.53 | 318.53 |
| BF | 7.41 | 7.41 | 7.41 |
| d17 | 0.70 | 37.71 | 48.45 |
| d24 | 30.93 | 3.12 | 3.14 |
| d27 | 17.97 | 19.21 | 1.69 |
| d32 | 14.56 | 4.12 | 10.88 |

Zoom Lens Unit Data

| Unit | Beginning Surface | Focal length |
|---|---|---|
| 1 | 1 | 35.97 |
| 2 | 18 | −16.31 |
| 3 | 25 | −38.39 |
| 4 | 28 | 45.89 |
| 5 | 33 | 51.00 |

Numerical Embodiment 3

Unit mm
Surface Data

| Surface-Number | r | d | nd | vd |
|---|---|---|---|---|
| 1* | 221.569 | 2.70 | 1.80100 | 35.0 |
| 2 | 39.441 | 26.41 | | |
| 3 | −88.129 | 2.10 | 1.80400 | 46.5 |
| 4 | 435.960 | 0.15 | | |
| 5 | 112.239 | 6.04 | 1.92286 | 20.9 |
| 6 | 352.507 | 3.00 | | |
| 7 | 98.692 | 13.40 | 1.49700 | 81.5 |
| 8* | −94.210 | 6.07 | | |
| 9 | 125.903 | 4.56 | 1.43387 | 95.1 |
| 10 | 353.831 | 0.20 | | |
| 11 | 121.369 | 2.00 | 1.78880 | 28.4 |
| 12 | 46.914 | 17.20 | 1.43875 | 94.7 |
| 13 | −175.302 | 0.30 | | |
| 14 | 234.389 | 7.97 | 1.43387 | 95.1 |
| 15 | −114.574 | 0.29 | | |
| 16 | 60.208 | 8.70 | 1.76385 | 48.5 |
| 17 | 542.213 | (variable) | | |
| 18* | 909.225 | 0.95 | 2.00100 | 29.1 |
| 19 | 13.330 | 4.18 | | |
| 20 | −67.923 | 5.74 | 1.85896 | 22.7 |
| 21 | −11.307 | 0.70 | 1.88300 | 40.8 |
| 22 | 64.336 | 0.30 | | |
| 23 | 27.692 | 3.39 | 1.63980 | 34.5 |
| 24 | −132.109 | (variable) | | |
| 25 | −29.079 | 0.80 | 1.75500 | 52.3 |
| 26 | 41.007 | 2.66 | 1.85478 | 24.8 |
| 27 | −550.490 | (variable) | | |
| 28* | 54.252 | 5.22 | 1.59522 | 67.7 |
| 29 | −86.800 | 0.20 | | |
| 30 | 375.650 | 4.85 | 1.56732 | 42.8 |
| 31 | −35.457 | 1.00 | 1.89190 | 37.1 |
| 32 | −81.405 | (variable) | | |
| 33 (stop) | ∞ | 40.80 | | |
| 34 | 290.455 | 4.80 | 1.80518 | 25.4 |
| 35 | −90.341 | 0.48 | | |
| 36 | 61.984 | 0.90 | 1.88300 | 40.8 |
| 37 | 19.854 | 4.75 | 1.51633 | 64.1 |
| 38 | 48.192 | 0.20 | | |
| 39 | 28.815 | 9.06 | 1.43875 | 94.7 |
| 40 | −27.155 | 0.90 | 2.00100 | 29.1 |
| 41 | −110.176 | 0.50 | | |
| 42 | 64.771 | 5.91 | 1.48749 | 70.2 |
| 43 | −36.956 | 4.00 | | |
| 44 | ∞ | 33.00 | 1.60859 | 46.4 |
| 45 | ∞ | 13.20 | 1.51633 | 64.1 |
| 46 | ∞ | 7.41 | | |
| Image plane | ∞ | | | |

Aspheric Surface Data

First Surface k = −4.52219e−001 A4 = 1.21329e−006 A6 = 9.87613e−009
A8 = −1.47445e−011 A10 = −6.93027e−015 A12 = −3.69528e−020
A14 = 7.47520e−022 A16 = 4.00807e−025 A3 = 1.17095e−006
A5 = −1.41365e−007 A7 = −1.29221e−010 A9 = 6.83874e−013
A11 = −1.16326e−016 A13 = 6.77754e−020 A15 = −4.63170e−023
Eighth Surface k = 2.59323e−001 A4 = 1.13068e−006 A6 = −4.88707e−009
A8 = −2.42587e−011 A10 = 1.27786e−015 A12 = −1.07902e−018
A14 = −1.40515e−022 A16 = 1.72620e−024 A3 = 6.91393e−007
A5 = 2.23698e−008 A7 = 4.76101e−010 A9 = 5.78370e−013
A11 = −3.14919e−016 A13 = 2.42327e−019 A15 = −1.38786e−022
Eighteenth Surface k = −2.00000e+000 A4 = 1.66427e−005 A6 = −6.46217e−007
A8 = −2.94877e−008 A10 = −4.51699e−011 A12 = 3.79254e−012
A14 = −6.46435e−015 A16 = −1.25910e−016 A3 = 6.61804e−006
A5 = 2.51439e−007 A7 = 1.93448e−007 A9 = 2.33636e−009
A11 = −1.63785e−011 A13 = −3.50133e−013 A15 = 2.94985e−015
Twenty-eighth Surface k = 2.00005e+000 A4 = −4.95184e−006 A6 = 1.21034e−009
A8 = −3.20424e−012

Various Pieces of Data
Zoom Ratio 18.96

| | Wide-Angle | Intermediate | Telephoto |
|---|---|---|---|
| Focal Length | 5.30 | 25.00 | 100.58 |
| F-number | 1.90 | 1.89 | 3.10 |
| Half Angle of View | 46.04 | 12.41 | 3.13 |
| Maximum Image Height | 5.50 | 5.50 | 5.50 |
| Total Lens Length | 314.74 | 314.74 | 314.74 |
| BF | 7.41 | 7.41 | 7.41 |
| d17 | 0.70 | 30.44 | 39.11 |
| d24 | 28.81 | 2.69 | 6.23 |
| d27 | 20.60 | 22.13 | 1.68 |
| d32 | 7.65 | 2.49 | 10.73 |

Zoom Lens Unit Data

| Unit | Beginning Surface | Focal length |
|---|---|---|
| 1 | 1 | 32.15 |
| 2 | 18 | −14.48 |
| 3 | 25 | −45.71 |
| 4 | 28 | 48.55 |
| 5 | 33 | 51.11 |

Numerical Embodiment 4

Unit mm
Surface Data

| Surface-Number | r | d | nd | vd |
|---|---|---|---|---|
| 1* | 253.834 | 2.70 | 1.80100 | 35.0 |
| 2 | 37.758 | 26.22 | | |
| 3 | −86.373 | 2.10 | 1.78800 | 47.4 |
| 4 | −350.556 | 0.15 | | |
| 5 | 104.311 | 4.65 | 1.92286 | 20.9 |
| 6 | 233.221 | 2.82 | | |
| 7 | 105.293 | 11.08 | 1.49700 | 81.5 |
| 8* | −123.738 | 8.05 | | |
| 9 | 129.464 | 2.00 | 1.80000 | 29.8 |
| 10 | 49.120 | 16.84 | 1.43875 | 94.7 |
| 11 | −143.193 | 0.30 | | |
| 12 | 129.175 | 11.68 | 1.43387 | 95.1 |
| 13 | −89.896 | 0.30 | | |
| 14 | 74.336 | 6.10 | 1.76385 | 48.5 |
| 15 | 317.182 | (variable) | | |
| 16* | 924.043 | 0.95 | 2.00100 | 29.1 |
| 17 | 14.807 | 4.02 | | |
| 18 | −87.001 | 6.09 | 1.85896 | 22.7 |
| 19 | −11.994 | 0.70 | 1.88300 | 40.8 |
| 20 | 84.833 | 0.30 | | |
| 21 | 28.554 | 2.79 | 1.67270 | 32.1 |
| 22 | 265.488 | (variable) | | |
| 23 | −30.295 | 0.80 | 1.75500 | 52.3 |
| 24 | 38.949 | 2.71 | 1.85478 | 24.8 |
| 25 | 4647.418 | (variable) | | |
| 26* | 58.328 | 5.00 | 1.64000 | 60.1 |
| 27 | −97.983 | 0.20 | | |
| 28 | −501.315 | 5.17 | 1.54814 | 45.8 |
| 29 | −30.559 | 1.00 | 2.00100 | 29.1 |
| 30 | −46.057 | (variable) | | |
| 31 (stop) | ∞ | 42.58 | | |
| 32 | 86.259 | 3.09 | 1.80518 | 25.4 |
| 33 | −185.369 | 2.42 | | |
| 34 | 92.317 | 0.90 | 1.89190 | 37.1 |
| 35 | 20.906 | 4.82 | 1.51633 | 64.1 |
| 36 | 54.432 | 0.30 | | |
| 37 | 33.396 | 8.74 | 1.43875 | 94.7 |
| 38 | −26.488 | 0.90 | 2.00100 | 29.1 |
| 39 | −76.820 | 0.46 | | |
| 40 | 68.713 | 5.87 | 1.48749 | 70.2 |
| 41 | −37.317 | 4.00 | | |
| 42 | ∞ | 33.00 | 1.60859 | 46.4 |
| 43 | ∞ | 13.20 | 1.51633 | 64.1 |
| 44 | ∞ | 7.41 | | |
| Image plane | ∞ | | | |

Aspheric Surface Data

First Surface $k = -1.99998e+000$ $A4 = 1.84824e-006$ $A6 = 1.05235e-008$
$A8 = -1.41804e-011$ $A10 = -7.09805e-015$ $A12 = -7.50533e-021$
$A14 = 7.59886e-022$ $A16 = 4.07039e-025$ $A3 = -2.45177e-006$
$A5 = -1.61379e-007$ $A7 = -1.54971e-010$ $A9 = 6.86524e-013$
$A11 = -1.18690e-016$ $A13 = 6.88390e-020$ $A15 = -4.70610e-023$ Eighth Surface $k = 1.58548e+000$ $A4 = 1.17726e-006$ $A6 = -4.76260e-009$
$A8 = -2.46605e-011$ $A10 = 1.17531e-015$ $A12 = -1.23118e-018$
$A14 = -6.74688e-023$ $A16 = 1.59805e-024$ $A3 = -6.42023e-007$
$A5 = 1.50960e-008$ $A7 = 4.76946e-010$ $A9 = 5.87253e-013$
$A11 = -3.04441e-016$ $A13 = 2.33317e-019$ $A15 = -1.30959e-022$ Sixteenth Surface $k = 1.99943e+000$ $A4 = 1.88698e-005$ $A6 = 7.93011e-007$
$A8 = -7.12182e-009$ $A10 = -2.17118e-010$ $A12 = 5.21845e-012$
$A14 = -9.55138e-015$ $A16 = -4.11689e-017$ $A3 = -3.08543e-006$
$A5 = -4.00118e-006$ $A7 = -7.69517e-008$ $A9 = 3.05155e-009$
$A11 = -2.76886e-011$ $A13 = -2.31340e-013$ $A15 = 1.33233e-015$ Twenty-sixth Surface $k = -4.70509e-002$ $A4 = -4.21000e-006$ $A6 = 2.92500e-009$
$A8 = -2.03339e-012$ Various Pieces of Data
Zoom Ratio 18.51

| | Wide-Angle | Intermediate | Telephoto |
|---|---|---|---|
| Focal Length | 5.40 | 25.00 | 99.99 |
| F-number | 1.90 | 1.89 | 3.10 |
| Half Angle of View | 45.51 | 12.41 | 3.15 |
| Total Lens Length | 5.50 | 5.50 | 5.50 |
| Total Lens Length | 313.54 | 313.54 | 313.54 |
| BF | 7.41 | 7.41 | 7.41 |
| d15 | 0.82 | 36.08 | 47.71 |
| d22 | 37.02 | 3.68 | 4.32 |
| d25 | 14.42 | 18.06 | 1.69 |
| d30 | 8.88 | 3.33 | 7.43 |

Zoom Lens Unit Data

| Unit | Beginning Surface | Focal length |
|---|---|---|
| 1 | 1 | 37.40 |
| 2 | 16 | −15.35 |
| 3 | 23 | −44.40 |
| 4 | 26 | 44.47 |
| 5 | 31 | 51.75 |

Numerical Embodiment 5

Unit mm
Surface Data

| Surface-Number | r | d | nd | vd |
|---|---|---|---|---|
| 1* | 497.603 | 2.70 | 1.89190 | 37.1 |
| 2 | 35.568 | 24.01 | | |
| 3 | −113.755 | 2.10 | 1.73364 | 38.8 |
| 4 | 5514.945 | 0.59 | | |
| 5 | 87.558 | 4.00 | 1.89286 | 20.4 |
| 6 | 155.426 | 2.13 | | |
| 7 | 96.933 | 11.30 | 1.49700 | 81.5 |
| 8* | −125.033 | 7.13 | | |
| 9 | 119.003 | 2.00 | 1.85025 | 30.1 |
| 10 | 48.605 | 15.11 | 1.43875 | 94.7 |
| 11 | −623.349 | 0.30 | | |
| 12 | 211.103 | 12.49 | 1.43387 | 95.1 |
| 13 | −64.747 | 0.29 | | |
| 14 | 81.910 | 7.22 | 1.76385 | 48.5 |
| 15 | 4050.416 | (variable) | | |
| 16* | 153.959 | 0.95 | 2.00100 | 29.1 |
| 17 | 17.223 | 4.17 | | |
| 18 | −83.406 | 7.12 | 1.85896 | 22.7 |
| 19 | −12.289 | 0.70 | 1.88300 | 40.8 |
| 20 | 126.476 | 0.30 | | |
| 21 | 28.590 | 2.29 | 1.63980 | 34.5 |
| 22 | 62.731 | (variable) | | |
| 23 | −30.338 | 0.80 | 1.75500 | 52.3 |
| 24 | 35.221 | 2.87 | 1.85478 | 24.8 |
| 25 | 407.264 | (variable) | | |
| 26 (stop) | ∞ | 1.00 | | |
| 27* | 132.941 | 5.69 | 1.69930 | 51.1 |
| 28 | −42.957 | 0.19 | | |
| 29 | 35.394 | 6.58 | 1.59551 | 39.2 |
| 30 | −74.887 | 1.00 | 2.00100 | 29.1 |
| 31 | 94.767 | (variable) | | |
| 32 | 1829.439 | 3.42 | 1.74077 | 27.8 |
| 33 | −51.540 | 1.07 | | |

-continued

Unit mm
Surface Data

| | | | | |
|---|---|---|---|---|
| 34 | 1356.191 | 0.90 | 1.88300 | 40.8 |
| 35 | 25.728 | 6.01 | 1.51823 | 58.9 |
| 36 | −307.606 | 0.20 | | |
| 37 | 30.486 | 9.07 | 1.43875 | 94.7 |
| 38 | −29.448 | 0.90 | 2.00100 | 29.1 |
| 39 | −246.965 | 0.20 | | |
| 40 | 55.730 | 5.69 | 1.48749 | 70.2 |
| 41 | −47.154 | 4.00 | | |
| 42 | ∞ | 33.00 | 1.60859 | 45.4 |
| 43 | ∞ | 13.20 | 1.51633 | 64.1 |
| 44 | ∞ | 7.41 | | |
| Image plane | ∞ | | | |

Aspheric Surface Data

First Surface $k = -9.85865e-001$ $A4 = 1.65055e-006$ $A6 = 2.72984e-010$
$A8 = -1.59912e-012$ $A10 = 2.05384e-015$ $A12 = -1.33531e-018$
$A14 = 4.38440e-022$ $A16 = -5.74605e-026$ Eighth Surface $k = 8.56393e-002$ $A4 = 1.27638e-006$ $A6 = 3.56375e-011$
$A8 = -2.61085e-013$ $A10 = 3.19591e-016$ $A12 = -6.22080e-019$
$A14 = 5.76595e-022$ $A16 = -1.97810e-025$ Sixteenth Surface $k = 1.69447e+000$ $A4 = 3.33697e-006$ $A6 = -1.25011e-007$
$A8 = 3.09929e-009$ $A10 = -3.56479e-011$ $A12 = 1.65108e-013$
$A14 = -3.63283e-019$ $A16 = -1.48745e-018$ Twenty-seventh Surface $k = -1.99815e+000$ $A4 = -2.91474e-006$ $A6 = 1.06023e-009$
$A8 = -8.06391e-013$ Various Pieces of Data
Zoom Ratio 18.82

| | Wide-Angle | Intermediate | Telephoto |
|---|---|---|---|
| Focal Length | 4.80 | 25.00 | 90.38 |
| F-number | 1.90 | 1.90 | 3.20 |
| Half Angle of View | 48.88 | 12.41 | 3.48 |
| Maximum Image Height | 5.50 | 5.50 | 5.50 |
| Total Lens Length | 313.54 | 313.54 | 313.54 |
| BF | 7.41 | 7.41 | 7.41 |
| d15 | 0.65 | 44.48 | 57.54 |
| d22 | 44.54 | 4.58 | 5.04 |
| d25 | 10.91 | 14.81 | 1.40 |
| d31 | 47.34 | 39.56 | 39.46 |

Zoom Lens Unit Data

| Unit | Beginning Surface | Focal length |
|---|---|---|
| 1 | 1 | 38.13 |
| 2 | 16 | −16.83 |
| 3 | 23 | −41.30 |
| 4 | 26 | 40.41 |
| 5 | 32 | 49.63 |

Numerical Embodiment 6

Unit mm
Surface Data

| Surface-Number | r | d | nd | vd |
|---|---|---|---|---|
| 1* | 222.860 | 2.70 | 1.74951 | 35.3 |
| 2 | 38.018 | 23.41 | | |
| 3 | −164.951 | 2.10 | 1.78800 | 47.4 |
| 4 | −510.499 | 3.85 | | |
| 5 | −127.981 | 2.10 | 1.83481 | 42.7 |
| 6 | −611.588 | 0.14 | | |
| 7 | 90.447 | 3.44 | 1.92286 | 18.9 |
| 8 | 137.588 | 1.50 | | |
| 9 | 92.743 | 11.40 | 1.49700 | 81.5 |
| 10* | −123.308 | 6.15 | | |
| 11 | 112.229 | 2.00 | 1.80000 | 29.8 |
| 12 | 47.987 | 17.88 | 1.43875 | 94.7 |
| 13 | −181.493 | 0.29 | | |
| 14 | 692.803 | 9.55 | 1.43387 | 95.1 |
| 15 | −79.621 | 0.29 | | |
| 16 | 74.007 | 8.10 | 1.76385 | 48.5 |
| 17 | 1028.446 | (variable) | | |
| 18* | 767.895 | 0.95 | 2.00100 | 29.1 |
| 19 | 16.608 | 3.90 | | |
| 20 | −221.905 | 7.25 | 1.84666 | 23.8 |
| 21 | −12.490 | 0.70 | 1.88300 | 40.8 |
| 22 | 55.149 | (variable) | | |
| 23 | 32.298 | 4.11 | 1.67270 | 32.1 |
| 24 | −64.841 | 0.80 | 1.88300 | 40.8 |
| 25 | 1117.690 | (variable) | | |
| 26 | −30.301 | 0.80 | 1.72916 | 54.7 |
| 27 | 54.234 | 2.69 | 1.84666 | 23.8 |
| 28 | −435.016 | (variable) | | |
| 29 (stop) | ∞ | 1.00 | | |
| 30* | 113.765 | 6.81 | 1.60300 | 65.4 |
| 31 | −38.646 | 0.19 | | |
| 32 | 30.343 | 6.37 | 1.57501 | 41.5 |
| 33 | −2440.118 | 1.00 | 1.95375 | 32.3 |
| 34 | 46.651 | (variable) | | |
| 35 | −345.399 | 3.55 | 1.74077 | 27.8 |
| 36 | −52.589 | 2.35 | | |
| 37 | 94.149 | 0.90 | 1.88300 | 40.8 |
| 38 | 23.833 | 4.75 | 1.53996 | 59.5 |
| 39 | 83.541 | 0.19 | | |
| 40 | 32.137 | 9.01 | 1.43875 | 94.7 |
| 41 | −27.579 | 0.90 | 2.00100 | 29.1 |
| 42 | −112.020 | 0.19 | | |
| 43 | 59.016 | 5.66 | 1.48749 | 70.2 |
| 44 | −45.204 | 4.00 | | |
| 45 | ∞ | 33.00 | 1.60859 | 46.4 |
| 46 | ∞ | 13.20 | 1.51633 | 64.1 |
| 47 | ∞ | 7.41 | | |
| Image plane | ∞ | | | |

Aspheric Surface Data

First Surface $k = -2.00000e+000$ $A4 = 6.33705e-007$ $A6 = 4.97024e-010$
$A8 = -1.03935e-012$ $A10 = 1.10992e-015$ $A12 = -6.42704e-019$
$A14 = 1.88953e-022$ $A16 = -2.22410e-026$ Tenth Surface $k = 8.48264e-001$ $A4 = 1.13518e-006$ $A6 = 6.12675e-011$
$A8 = -1.62443e-013$ $A10 = 1.11718e-016$ $A12 = -1.56772e-019$
$A14 = 1.16015e-022$ $A16 = -3.13681e-026$ Eighteenth Surface $k = -1.99999e+000$ $A4 = 1.12587e-005$ $A6 = -1.07974e-007$
$A8 = 1.59488e-009$ $A10 = -4.07812e-012$ $A12 = -1.78963e-013$
$A14 = 1.90633e-015$ $A16 = -5.69855e-018$ Thirtieth Surface $k = -2.00000e+000$ $A4 = -5.24609e-006$ $A6 = 2.45713e-009$
$A8 = -3.06141e-012$ Various Pieces of Data
Zoom Ratio 18.99

| | Wide-Angle | Intermediate | Telephoto |
|---|---|---|---|
| Focal Length | 5.27 | 25.00 | 100.02 |
| F-number | 1.80 | 1.80 | 3.00 |
| Half Angle of View | 46.24 | 12.41 | 3.15 |

-continued

Unit mm
Surface Data

| | | | |
|---|---|---|---|
| Maximum Image Height | 5.50 | 5.50 | 5.50 |
| Total Lens Length | 318.53 | 318.53 | 318.53 |
| BF | 7.41 | 7.41 | 7.41 |
| d17 | 0.65 | 38.89 | 51.69 |
| d22 | 1.50 | 1.93 | 1.50 |
| d25 | 43.54 | 3.55 | 3.27 |
| d28 | 11.61 | 16.99 | 1.47 |
| d34 | 44.65 | 40.58 | 44.01 |

Zoom Lens Unit Data

| Unit | Beginning Surface | Focal length |
|---|---|---|
| 1 | 1 | 39.84 |
| 2 | 18 | −10.87 |
| 3 | 23 | 58.80 |
| 4 | 26 | −50.40 |
| 5 | 29 | 44.24 |
| 6 | 35 | 49.77 |

Numerical Embodiment 7

Unit mm
Surface Data

| Surface-Number | r | d | nd | vd |
|---|---|---|---|---|
| 1 | 234.626 | 5.35 | 1.80100 | 35.0 |
| 2 | 88.534 | 55.04 | | |
| 3 | −191.846 | 4.40 | 1.72916 | 54.7 |
| 4 | 595.682 | 0.20 | | |
| 5 | 225.384 | 9.39 | 1.89286 | 20.4 |
| 6 | 505.347 | 12.55 | | |
| 7 | −859.483 | 15.49 | 1.43387 | 95.1 |
| 8 | −176.929 | 0.20 | | |
| 9 | −9039.970 | 4.20 | 1.78880 | 28.4 |
| 10 | 273.512 | 21.89 | 1.43875 | 94.7 |
| 11 | −229.772 | 23.84 | | |
| 12 | 904.437 | 14.16 | 1.43387 | 95.1 |
| 13 | −303.209 | 0.25 | | |
| 14 | 206.976 | 4.30 | 1.78880 | 28.4 |
| 15 | 138.379 | 1.26 | | |
| 16 | 145.548 | 34.84 | 1.49700 | 81.5 |
| 17 | −234.170 | 0.15 | | |
| 18 | 150.143 | 11.48 | 1.76385 | 48.5 |
| 19 | 337.584 | (variable) | | |
| 20* | −24323.77 | 2.50 | 1.77250 | 49.6 |
| 21 | 56.798 | 2.81 | | |
| 22 | 78.585 | 1.50 | 1.69680 | 55.5 |
| 23 | 50.827 | 4.57 | | |
| 24 | 189.763 | 12.79 | 1.77830 | 23.9 |
| 25 | −37.180 | 1.50 | 1.75500 | 52.3 |
| 26 | 108.287 | 10.68 | | |
| 27 | −40.972 | 1.50 | 1.88300 | 40.8 |
| 28 | −73.523 | (variable) | | |
| 29 | 217.433 | 9.70 | 1.59522 | 67.7 |
| 30* | −123.383 | (variable) | | |
| 31 | 67.757 | 2.00 | 1.85025 | 30.1 |
| 32 | 60.387 | 18.58 | 1.43875 | 94.7 |
| 33 | −136.959 | 0.20 | | |
| 34 | 576.443 | 1.90 | 1.85478 | 24.8 |
| 35 | 100.991 | 6.71 | 1.49700 | 81.5 |
| 36 | 551.364 | 0.25 | | |
| 37* | 173.732 | 4.43 | 1.60311 | 60.6 |
| 38 | −555.252 | (variable) | | |
| 39 (stop) | ∞ | 2.15 | | |
| 40 | −85.784 | 1.50 | 1.75500 | 52.3 |
| 41 | 24.298 | 5.38 | 1.77830 | 23.9 |
| 42 | 111.518 | 7.93 | | |
| 43 | −29.722 | 1.50 | 1.80400 | 46.5 |
| 44 | 102.824 | 21.57 | 1.60342 | 38.0 |
| 45 | −42.615 | 0.30 | | |
| 46 | −101.334 | 1.60 | 1.80400 | 46.5 |
| 47 | 291.094 | 6.11 | 1.59551 | 39.2 |
| 48 | −56.572 | 7.00 | | |
| 49 | −177.302 | 3.38 | 1.57501 | 41.5 |
| 50 | −67.188 | 0.50 | | |
| 51 | 184.403 | 2.00 | 1.88300 | 40.8 |
| 52 | 36.388 | 9.94 | 1.49700 | 81.5 |
| 53 | −184.238 | 0.81 | | |
| 54 | 142.441 | 8.64 | 1.53775 | 74.7 |
| 55 | −41.209 | 2.00 | 1.72825 | 28.5 |
| 56 | −280.221 | 0.20 | | |
| 57 | 72.020 | 8.51 | 1.48749 | 70.2 |
| 58 | −57.258 | 10.00 | | |
| 59 | ∞ | 33.00 | 1.60859 | 46.4 |
| 60 | ∞ | 13.20 | 1.51633 | 64.2 |
| 61 | ∞ | 15.78 | | |
| Image plane | ∞ | | | |

Aspheric Surface Data

Twentieth Surface k = −5.35663e+007 A4 = −1.35004e−007 A6 = −1.67349e−008
A8 = −2.59196e−011 A10 = 2.70937e−014 A12 = 5.67177e−018
A3 = 3.67787e−007 A5 = 1.62996e−007 A7 = 9.43493e−010
A9 = −8.97493e−014 A11 = −6.85497e−016

Thirtieth Surface k = 1.74900e+000 A4 = 1.84400e−007 A6 = −2.11538e−009
A8 = −1.40432e−012 A10 = 4.66070e−015 A12 = 6.32238e−019
A3 = 2.70861e−007 A5 = 2.21425e−008 A7 = 1.00607e−010
A9 = −8.43963e−014 A11 = −9.01929e−017

Thirty-seventh Surface k = −9.11099e+000 A4 = −2.83199e−007 A6 = 1.21937e−009
A8 = −1.66880e−012 A10 = −1.39946e−014 A12 = −2.13910e−018
A3 = −2.78290e−007 A5 = −1.58227e−008 A7 = −6.03759e−011
A9 = 3.14560e−013 A11 = 2.77541e−016

Various Pieces of Data
Zoom Ratio 28.93

| | Wide-Angle | Intermediate | Telephoto |
|---|---|---|---|
| Focal Length | 5.81 | 25.00 | 168.10 |
| F-number | 1.55 | 1.55 | 2.25 |
| Half Angle of View | 43.43 | 12.41 | 1.87 |
| Half Angle of View | 5.50 | 5.50 | 5.50 |
| Total Lens Length | 643.53 | 643.53 | 643.53 |
| BF | 15.78 | 15.78 | 15.78 |
| d19 | 2.95 | 63.83 | 103.61 |
| d28 | 173.99 | 76.06 | 2.02 |
| d30 | 1.00 | 15.52 | 1.98 |
| d38 | 2.00 | 24.52 | 72.32 |

Zoom Lens Unit Data

| Unit | Beginning Surface | Focal length |
|---|---|---|
| 1 | 1 | 92.32 |
| 2 | 20 | −28.15 |
| 3 | 29 | 133.67 |
| 4 | 31 | 99.51 |
| 5 | 39 | 35.73 |

Numerical Embodiment 8

Unit mm
Surface Data

| Surface-Number | r | d | nd | νd |
|---|---|---|---|---|
| 1* | 179.818 | 2.70 | 1.80100 | 35.0 |
| 2 | 37.725 | 25.30 | | |
| 3 | -108.269 | 2.10 | 1.85150 | 40.8 |
| 4 | 1127.506 | 0.15 | | |
| 5 | 89.841 | 4.26 | 1.92286 | 18.9 |
| 6 | 159.702 | 4.31 | | |
| 7 | 111.875 | 10.71 | 1.49700 | 81.5 |
| 8* | -129.558 | 6.64 | | |
| 9 | 109.685 | 2.00 | 1.78880 | 28.4 |
| 10 | 49.892 | 13.84 | 1.43875 | 94.7 |
| 11 | -784.724 | 0.30 | | |
| 12 | 288.190 | 10.88 | 1.43387 | 95.1 |
| 13 | -73.552 | 0.30 | | |
| 14 | 77.168 | 6.24 | 1.76385 | 48.5 |
| 15 | 294.593 | (variable) | | |
| 16 | 109.284 | 3.73 | 1.59522 | 67.7 |
| 17 | 299.379 | (variable) | | |
| 18* | 144.434 | 0.95 | 2.00100 | 29.1 |
| 19 | 14.200 | 4.61 | | |
| 20 | -54.398 | 6.39 | 1.80810 | 22.8 |
| 21 | -11.545 | 0.70 | 1.88300 | 40.8 |
| 22 | 89.341 | 0.30 | | |
| 23 | 33.967 | 3.44 | 1.67270 | 32.1 |
| 24 | -111.914 | (variable) | | |
| 25 | -26.763 | 0.80 | 1.72916 | 54.7 |
| 26 | 41.443 | 2.93 | 1.84666 | 23.8 |
| 27 | 19347.361 | (variable) | | |
| 28 (stop) | ∞ | 1.00 | | |
| 29* | 667.085 | 6.79 | 1.65160 | 58.5 |
| 30 | -31.005 | 0.20 | | |
| 31 | 30.374 | 10.42 | 1.53172 | 48.8 |
| 32 | -70.634 | 1.00 | 1.95375 | 32.3 |
| 33 | 80.163 | 39.97 | | |
| 34 | -255.694 | 3.16 | 1.74077 | 27.8 |
| 35 | -45.039 | 0.50 | | |
| 36 | 579.971 | 0.90 | 1.88300 | 40.8 |
| 37 | 26.686 | 5.12 | 1.51823 | 58.9 |
| 38 | 3737.770 | 0.20 | | |
| 39 | 32.320 | 8.30 | 1.43875 | 94.7 |
| 40 | -29.297 | 0.90 | 2.00100 | 29.1 |
| 41 | -128.870 | 0.20 | | |
| 42 | 52.950 | 4.92 | 1.48749 | 70.2 |
| 43 | -59.560 | 4.00 | | |
| 44 | ∞ | 33.00 | 1.60859 | 46.4 |
| 45 | ∞ | 13.20 | 1.51633 | 64.1 |
| 46 | ∞ | 7.81 | | |
| Image plane | ∞ | | | |

Aspheric Surface Data

First Surface k = 1.94310e+000 A4 = 4.55712e-007 A6 = 6.11475e-010
A8 = -1.26960e-012 A10 = 1.32254e-015 A12 = -7.31964e-019
A14 = 2.00744e-022 A16 = -2.12749e-026

Eighth Surface k = 1.60334e+000 A4 = 1.00287e-006 A6 = 8.32220e-011
A8 = -1.57432e-013 A10 = 1.77071e-016 A12 = -3.82845e-019
A14 = 3.83785e-022 A16 = -1.40985e-025

Eighteenth Surface k = -3.51872e-001 A4 = 1.04203e-005 A6 = -9.81878e-008
A8 = 2.43448e-009 A10 = -3.45061e-011 A12 = 2.04688e-013
A14 = -2.06918e-016 A16 = -1.43470e-018

Twenty-ninth Surface k = -2.00004e+000 A4 = -4.54375e-006 A6 = 1.57151e-009
A8 = -1.62189e-012

Unit mm
Surface Data

Various Pieces of Data
Zoom Ratio 19.08

| | Wide-Angle | Intermediate | Telephoto |
|---|---|---|---|
| Focal Length | 5.30 | 25.00 | 101.19 |
| F-number | 1.90 | 1.90 | 3.10 |
| Half Angle of View | 46.04 | 12.41 | 3.11 |
| Maximum Image Height | 5.50 | 5.50 | 5.50 |
| Total Lens Length | 313.53 | 313.53 | 313.53 |
| BF | 7.41 | 7.41 | 7.41 |
| d15 | 1.00 | 3.29 | 3.62 |
| d17 | 0.65 | 34.49 | 46.76 |
| d24 | 47.29 | 7.04 | 7.10 |
| d27 | 9.83 | 13.95 | 1.28 |

Zoom Lens Unit Data

| Unit | Beginning Surface | Focal length |
|---|---|---|
| 1 | 1 | 50.08 |
| 2 | 16 | 287.05 |
| 3 | 18 | -15.33 |
| 4 | 25 | -40.95 |
| 5 | 28 | 69.48 |

Numerical Embodiment 9

Unit mm
Surface Data

| Surface-Numer | r | d | nd | νd |
|---|---|---|---|---|
| 1* | 221.313 | 2.70 | 1.80100 | 35.0 |
| 2 | 39.754 | 24.98 | | |
| 3 | -108.475 | 2.10 | 1.83481 | 42.7 |
| 4 | 427.300 | 0.14 | | |
| 5 | 91.778 | 4.66 | 1.89286 | 20.4 |
| 6 | 171.935 | 1.62 | | |
| 7 | 119.733 | 11.52 | 1.49700 | 81.5 |
| 8* | -126.235 | 6.43 | | |
| 9 | 112.031 | 2.00 | 1.78880 | 28.4 |
| 10 | 50.070 | 16.78 | 1.43875 | 94.7 |
| 11 | -185.057 | 0.29 | | |
| 12 | 367.718 | 9.36 | 1.43387 | 95.1 |
| 13 | -89.051 | 0.28 | | |
| 14 | 74.594 | 9.27 | 1.76385 | 48.5 |
| 15 | -1385.481 | (variable) | | |
| 16 | 2016.388 | 2.00 | 1.59522 | 67.7 |
| 17 | 252.665 | (variable) | | |
| 18* | 173.152 | 0.95 | 2.00069 | 25.5 |
| 19 | 15.352 | (variable) | | |
| 20 | -45.642 | 0.90 | 1.89190 | 37.1 |
| 21 | 94.649 | 0.30 | | |
| 22 | 143.740 | 6.97 | 1.80810 | 22.8 |
| 23 | -11.485 | 0.70 | 1.89190 | 37.1 |
| 24 | 241.662 | 0.30 | | |
| 25 | 50.771 | 3.73 | 1.67270 | 32.1 |
| 26 | -56.089 | (variable) | | |
| 27 | -32.399 | 0.80 | 1.77250 | 49.6 |
| 28 | 72.677 | 2.46 | 1.85896 | 22.7 |
| 29 | -351.427 | (variable) | | |
| 30 (stop) | ∞ | 1.00 | | |
| 31* | 105.600 | 7.12 | 1.77250 | 49.6 |
| 32 | -43.309 | 0.20 | | |
| 33 | 38.750 | 8.60 | 1.58144 | 40.8 |
| 34 | -51.182 | 1.00 | 1.95375 | 32.3 |
| 35 | 74.475 | 36.76 | | |
| 36 | -143.471 | 3.18 | 1.72825 | 28.5 |
| 37 | -43.340 | 0.72 | | |
| 38 | 101.622 | 0.90 | 1.88300 | 40.8 |
| 39 | 20.211 | 6.72 | 1.51823 | 58.9 |

-continued

Unit mm
Surface Data

| | | | | |
|---|---|---|---|---|
| 40 | 259.643 | 0.19 | | |
| 41 | 31.628 | 8.31 | 1.43875 | 94.7 |
| 42 | −32.043 | 0.90 | 2.00100 | 29.1 |
| 43 | −388.264 | 0.19 | | |
| 44 | 54.199 | 6.38 | 1.48749 | 70.2 |
| 45 | −38.068 | 4.00 | | |
| 46 | ∞ | 33.00 | 1.60859 | 46.4 |
| 47 | ∞ | 13.20 | 1.51633 | 64.1 |
| 48 | ∞ | 7.41 | | |
| Image plane | ∞ | | | |

Aspheric Surface Data

First Surface k = −1.98597e+000 A4 = 6.95698e−007 A6 = 3.52367e−010
A8 = −8.66127e−013 A10 = 7.16222e−016 A12 = −2.38858e−019
A14 = 8.68177e−024 A16 = 6.98705e−027
Eighth Surface k = 1.99991e+000 A4 = 1.03732e−006 A6 = 3.19455e−011
A8 = −2.01815e−013 A10 = 3.41861e−016 A12 = −6.20324e−019
A14 = 5.09044e−022 A16 = −1.51973e−025
Eighteenth Surface k = 1.99997e+000 A4 = 1.63347e−005 A6 = −1.89426e−007
A8 = 4.35196e−009 A10 = −5.29639e−011 A12 = 2.78594e−013
A14 = −2.64644e−016 A16 = −1.55724e−018
Thirty-first Surface k = −1.60351e+000 A4 = −2.38072e−006 A6 = 9.65532e−010
A8 = −1.07429e−012

Various Pieces of Data
Zoom Ratio 19.60

| | Wide-Angle | Intermediate | Telephoto |
|---|---|---|---|
| Focal Length | 5.10 | 25.00 | 100.00 |
| F-number | 1.80 | 1.80 | 3.00 |
| Half Angle of View | 47.15 | 12.41 | 3.15 |
| Maximum Image Height | 5.50 | 5.50 | 5.50 |
| Total Lens Length | 318.53 | 318.53 | 318.53 |
| BF | 7.41 | 7.41 | 7.41 |
| d15 | 1.00 | 33.70 | 49.13 |
| d17 | 0.80 | 6.31 | 3.07 |
| d19 | 11.44 | 5.76 | 7.03 |
| d26 | 43.71 | 6.01 | 6.80 |
| d29 | 10.55 | 15.72 | 1.47 |

Zoom Lens Unit Data

| Unit | Beginning Surface | Focal length |
|---|---|---|
| 1 | 1 | 39.91 |
| 2 | 16 | −485.51 |
| 3 | 18 | −16.88 |
| 4 | 20 | −154.74 |
| 5 | 27 | −49.76 |
| 6 | 30 | 66.17 |

Numerical Embodiment 10

Unit mm
Surface Data

| Surface-Number | r | d | nd | vd |
|---|---|---|---|---|
| 1* | 183.569 | 2.70 | 1.80100 | 35.0 |
| 2 | 40.822 | 25.95 | | |
| 3 | −92.384 | 2.10 | 1.80400 | 46.5 |
| 4 | 509.250 | 0.15 | | |
| 5 | 107.490 | 4.77 | 1.92286 | 20.9 |
| 6 | 276.001 | 2.40 | | |
| 7 | 114.614 | 12.09 | 1.49700 | 81.5 |
| 8* | −106.075 | 7.31 | | |
| 9 | 155.423 | 3.79 | 1.43387 | 95.1 |
| 10 | 382.665 | 0.20 | | |
| 11 | 116.661 | 2.00 | 1.78880 | 28.4 |
| 12 | 49.222 | 15.25 | 1.43875 | 94.7 |
| 13 | −251.211 | 0.29 | | |
| 14 | 295.581 | 8.22 | 1.43387 | 95.1 |
| 15 | −99.811 | 0.29 | | |
| 16 | 68.066 | 7.81 | 1.76385 | 48.5 |
| 17 | 609.496 | (variable) | | |
| 18* | 1057.934 | 0.95 | 2.00100 | 29.1 |
| 19 | 15.129 | 4.19 | | |
| 20 | −71.643 | 6.20 | 1.85896 | 22.7 |
| 21 | −11.816 | 0.70 | 1.88300 | 40.8 |
| 22 | 87.831 | 0.30 | | |
| 23 | 29.882 | 2.90 | 1.63980 | 34.5 |
| 24 | −3338.437 | (variable) | | |
| 25 | −31.462 | 0.80 | 1.75500 | 52.3 |
| 26 | 45.029 | 2.37 | 1.85478 | 24.8 |
| 27 | −742.178 | (variable) | | |
| 28* | 52.093 | 6.58 | 1.59522 | 67.7 |
| 29 | −57.256 | 0.20 | | |
| 30 | 310.723 | 4.69 | 1.56732 | 42.8 |
| 31 | −39.535 | 1.00 | 1.89190 | 37.1 |
| 32 | −158.164 | (variable) | | |
| 33 (stop) | ∞ | 39.69 | | |
| 34 | 216.280 | 4.34 | 1.80518 | 25.4 |
| 35 | −113.480 | 1.77 | | |
| 36 | 56.028 | 0.90 | 1.88300 | 40.8 |
| 37 | 20.126 | 4.61 | 1.51633 | 64.1 |
| 38 | 45.886 | 0.26 | | |
| 39 | 30.181 | 8.52 | 1.43875 | 94.7 |
| 40 | −29.812 | 0.90 | 2.00100 | 29.1 |
| 41 | −130.481 | 0.39 | | |
| 42 | 61.463 | 5.80 | 1.48749 | 70.2 |
| 43 | −39.279 | 4.00 | | |
| 44 | ∞ | 33.00 | 1.60859 | 46.4 |
| 45 | ∞ | 13.20 | 1.51633 | 64.1 |
| 46 | ∞ | 7.41 | | |
| Image plane | ∞ | | | |

Aspheric Surface Data

First Surface k = 1.99975e+000 A4 = 1.45182e−006 A6 = 9.33463e−009
A8 = −1.50234e−011 A10 = −6.87564e−015 A12 = −4.37708e−020
A14 = 7.48248e−022 A16 = 3.99760e−025 A3 = −2.37702e−006
A5 = −1.49814e−007 A7 = −1.04242e−010 A9 = 6.81618e−013
A11 = −1.15636e−016 A13 = 6.73459e−020 A15 = −4.61758e−023
Eighth Surface k = 1.64508e+000 A4 = 1.04688e−006 A6 = −4.84214e−009
A8 = −2.39916e−011 A10 = 1.12516e−015 A12 = −9.41650e−019
A14 = −1.52649e−022 A16 = 1.69174e−024 A3 = −4.31764e−007
A5 = 2.03598e−008 A7 = 4.70852e−010 A9 = 5.74992e−013
A11 = −3.10926e−016 A13 = 2.37376e−019 A15 = −1.36288e−022
Eighteenth Surface k = 1.81594e+000 A4 = 9.07068e−006 A6 = −6.77113e−007
A8 = −2.90102e−008 A10 = −5.6491 1e−011 A12 = 4.01976e−012
A14 = −8.16804e−015 A16 = −1.02509e−016 A3 = 4.90416e−006
A5 = 5.56204e−007 A7 = 1.99594e−007 A9 = 2.21067e−009
A11 = −1.58750e−011 A13 = −3.38635e−013 A15 = 2.64700e−015
Twenty-eighth Surface k = 2.00005e+000 A4 = −5.67855e−006 A6 = 6.51589e−010
A8 = −2.85808e−012

-continued

Unit mm
Surface Data

Various Pieces of Data
Zoom Ratio 20.98

| Focal Length | Wide-Angle | Intermediate | Telephoto |
|---|---|---|---|
|  | 5.51 | 25.00 | 115.52 |
| F-number | 1.89 | 1.89 | 3.40 |
| Half Angle of View | 44.97 | 12.41 | 2.73 |
| Maximum Image Image Height | 5.50 | 5.50 | 5.50 |
| Total Lens Length | 316.53 | 316.53 | 316.53 |
| BF | 7.41 | 7.41 | 7.41 |
| d17 | 1.36 | 36.31 | 48.62 |
| d24 | 37.54 | 2.93 | 2.94 |
| d27 | 18.46 | 22.80 | 1.67 |
| d32 | 8.17 | 3.49 | 12.30 |

Zoom Lens Unit Data

| Unit | Beginning Surface | Focal length |
|---|---|---|
| 1 | 1 | 39.30 |
| 2 | 18 | −15.44 |
| 3 | 25 | −48.64 |
| 4 | 28 | 48.18 |
| 5 | 33 | 52.10 |

Numerical Embodiment 11

Unit mm
Surface Data

| Surface-Number | r | d | nd | vd |
|---|---|---|---|---|
| 1* | 500.330 | 2.70 | 1.80100 | 35.0 |
| 2 | 39.955 | 26.31 |  |  |
| 3 | −89.311 | 2.10 | 1.80400 | 46.5 |
| 4 | −1001.878 | 0.15 |  |  |
| 5 | 109.581 | 4.42 | 1.92286 | 20.9 |
| 6 | 221.045 | 1.98 |  |  |
| 7 | 126.427 | 12.71 | 1.49700 | 81.5 |
| 8* | −92.943 | 6.32 |  |  |
| 9 | 102.627 | 2.00 | 1.78880 | 28.4 |
| 10 | 49.877 | 18.20 | 1.43875 | 94.7 |
| 11 | −212.942 | 0.28 |  |  |
| 12 | 242.159 | 10.64 | 1.43387 | 95.1 |
| 13 | −94.489 | 0.28 |  |  |
| 14 | 79.565 | 7.49 | 1.76385 | 48.5 |
| 15 | 606.043 | (variable) |  |  |
| 16* | 736.595 | 0.95 | 2.00100 | 29.1 |
| 17 | 15.859 | 4.13 |  |  |
| 18 | −121.808 | 7.10 | 1.85896 | 22.7 |
| 19 | −12.201 | 0.70 | 1.88300 | 40.8 |
| 20 | 68.231 | 0.30 |  |  |
| 21 | 29.019 | 2.80 | 1.63980 | 34.5 |
| 22 | 186.432 | (variable) |  |  |
| 23 | −30.936 | 0.80 | 1.75500 | 52.3 |
| 24 | 39.519 | 2.70 | 1.85478 | 24.8 |
| 25 | 1479.033 | (variable) |  |  |
| 26* | 110.426 | 4.35 | 1.64000 | 60.1 |
| 27 | −74.651 | 0.20 |  |  |
| 28 | 85.876 | 5.82 | 1.56732 | 42.8 |
| 29 | −40.515 | 1.00 | 2.00100 | 29.1 |
| 30 | −79.241 | (variable) |  |  |
| 31 (stop) | ∞ | 2.05 |  |  |
| 32 | 67.917 | 8.66 | 1.65412 | 39.7 |
| 33 | −78.497 | 1.20 | 1.59522 | 67.7 |
| 34 | 33.485 | 0.74 |  |  |
| 35 | 24.957 | 7.52 | 1.65412 | 39.7 |
| 36 | −148.575 | 1.00 | 2.00100 | 29.1 |
| 37 | 39.831 | 10.00 |  |  |
| 38 | 1225.184 | 3.15 | 1.62004 | 36.3 |

-continued

Unit mm
Surface Data

| 39 | −57.151 | 2.12 |  |  |
|---|---|---|---|---|
| 40 | 132.387 | 1.00 | 2.05090 | 26.9 |
| 41 | 48.962 | 8.39 | 1.59270 | 35.3 |
| 42 | −45.628 | 0.20 |  |  |
| 43 | 261.968 | 6.70 | 1.59522 | 67.7 |
| 44 | −19.625 | 1.00 | 1.88300 | 40.8 |
| 45 | 160.519 | 1.29 |  |  |
| 46 | 51.363 | 7.69 | 1.43875 | 94.7 |
| 47 | −29.546 | 1.15 | 2.00330 | 28.3 |
| 48 | −258.944 | 2.86 |  |  |
| 49 | 478.390 | 7.34 | 1.59270 | 35.3 |
| 50 | −32.249 | 5.00 |  |  |
| 51 | ∞ | 63.04 | 1.60859 | 46.4 |
| 52 | ∞ | 8.70 | 1.51633 | 64.2 |
| 53 | ∞ | 15.32 |  |  |
| Image plane | ∞ |  |  |  |

Aspheric Surface Data

First Surface k = 1.99982e+000 A4 = 1.89404e−006 A6 = 8.65498e−009
A8 = −1.75293e−011 A10 = −7.00492e−015 A12 = −3.32555e−019
A14 = 4.96067e−022 A16 = 3.65770e−025 A3 = −1.20757e−006
A5 = −1.47427e−007 A7 = −4.68546e−011 A9 = 7.28090e−013
A11 = −1.15840e−016 A13 = 7.73179e−020 A15 = −4.16276e−023
Eighth Surface k = 1.32032e+000 A4 = 1.09313e−006 A6 = −4.74443e−009
A8 = −2.57852e−011 A10 = −4.41073e−015 A12 = 6.33335e−018
A14 = 8.62430e−021 A16 = 2.14350e−024 A3 = −6.01914e−008
A5 = 1.89485e−008 A7 = 4.83312e−010 A9 = 7.02322e−013
A11 = −2.51087e−016 A13 = −1.58513e−019 A15 = −2.31238e−022
Sixteenth Surface k = 1.99969e+000 A4 = 1.35996e−005 A6 = 6.82628e−007
A8 = 1.70270e−008 A10 = 5.75227e−010 A12 = 7.92934e−012
A14 = −3.44541e−014 A16 = −7.75048e−017 A3 = 3.76275e−006
A5 = −2.52945e−006 A7 = −1.36067e−007 A9 = −2.35939e−009
A11 = −9.70304e−011 A13 = −1.13653e−013 A15 = 2.89879e−015
Twenty-sixth Surface k = 1.99998e+000 A4 = −2.67652e−006 A6 = 1.80427e−009
A8 = −2.11742e−012

Various Pieces of Data
Zoom Ratio 20.00

|  | Wide-Angle | Intermediate | Telephoto |
|---|---|---|---|
| Focal Length | 8.41 | 42.05 | 168.18 |
| F-number | 3.03 | 3.02 | 4.96 |
| Half Angle of View | 47.73 | 12.41 | 3.15 |
| Maximum Image Height | 9.25 | 9.25 | 9.25 |
| Total Lens Length | 359.97 | 359.97 | 359.97 |
| BF | 15.32 | 15.32 | 15.32 |
| d15 | 0.70 | 42.30 | 54.93 |
| d22 | 37.82 | 3.31 | 3.16 |
| d25 | 13.11 | 17.20 | 1.68 |
| d30 | 15.82 | 4.65 | 7.67 |

Zoom Lens Unit Data

| Unit | Beginning Surface | Focal length |
|---|---|---|
| 1 | 1 | 40.24 |
| 2 | 16 | −15.48 |
| 3 | 23 | −44.53 |
| 4 | 26 | 44.65 |
| 5 | 31 | 84.18 |

TABLE 1

| | Conditional expression | Embodiment 1 | 2 | 3 | 4 | 5 | 6 |
|---|---|---|---|---|---|---|---|
| (1) | $1.655 \leq (f1 + bok1)/f1 \leq 3.000$ | 1.784 | 1.799 | 1.657 | 1.705 | 2.003 | 1.735 |
| (2) | $2.370 \leq ft/f1 \leq 3.145$ | 2.485 | 2.779 | 3.129 | 2.673 | 2.370 | 2.510 |
| (2-2) | $1.810 \leq ft/f1 \leq 6.300$ | 2.485 | 2.779 | 3.129 | 2.673 | 2.370 | 2.510 |
| (3) | $15.0 \leq ft/fw \leq 35.0$ | 20.0 | 19.6 | 19.0 | 18.5 | 18.8 | 19.0 |
| (1-2) | $1.000 \leq (f1 + bok1)/f1 \leq 3.000$ | 1.784 | 1.799 | 1.657 | 1.705 | 2.003 | 1.735 |
| (4) | $0.00 \leq ((f1 + bok1)/f1)*11 + (ft/f1) * 2.2-24$ | 1.09 | 1.90 | 1.11 | 0.63 | 3.24 | 0.60 |
| (5) | $1.000 \leq (f1w + bok1w)/f1w \leq 3.000$ | 1.784 | 1.799 | 1.657 | 1.705 | 2.003 | 1.735 |
| (6) | $1.810 \leq ft/f1w \leq 6.300$ | 2.485 | 2.779 | 3.129 | 2.673 | 2.370 | 2.510 |
| (7) | $0.00 \leq ((f1w + bok1w)/f1w)*11 + (ft/f1w) * 2.2-24$ | 1.09 | 1.90 | 1.11 | 0.63 | 3.24 | 0.60 |
| (8) | $43.0° \leq \omega w \leq 50.0°$ | 47.7 | 47.1 | 46.0 | 45.5 | 48.9 | 46.2 |
| (9) | $1.50° \leq \omega t \leq 3.50°$ | 3.15 | 3.15 | 3.13 | 3.15 | 3.48 | 3.15 |
| (10) | $-1.50 \leq f1a/f1 \leq -0.75$ | -1.026 | -1.075 | -1.281 | -1.290 | -0.990 | -1.087 |
| (11) | $2.00 \leq f1b/f1 \leq 4.40$ | 2.731 | 2.759 | 3.088 | 3.110 | 2.931 | 2.721 |
| (12) | $1.30 \leq f1c/f1 \leq 1.80$ | 1.475 | 1.558 | 1.581 | 1.511 | 1.522 | 1.440 |
| (13) | $-1.50 \leq f1a/f1w \leq -0.75$ | -1.026 | -1.075 | -1.281 | -1.290 | -0.990 | -1.087 |
| (14) | $2.00 \leq f1b/f1w \leq 4.40$ | 2.731 | 2.759 | 3.088 | 3.110 | 2.931 | 2.721 |
| (15) | $1.30 \leq f1c/f1w \leq 1.80$ | 1.475 | 1.558 | 1.581 | 1.511 | 1.522 | 1.440 |
| (16) | $4.70 \leq f1/fw \leq 20.00$ | 8.05 | 7.05 | 6.06 | 6.92 | 7.94 | 7.56 |
| (17) | $4.70 \leq f1w/fw \leq 20.00$ | 8.05 | 7.05 | 6.06 | 6.92 | 7.94 | 7.56 |
| (18) | $1.30 \leq Fnow \leq 3.50$ | 1.80 | 1.90 | 1.90 | 1.90 | 1.90 | 1.80 |
| (19) | $1.75 \leq nd1n \leq 2.00$ | 1.798 | 1.832 | 1.798 | 1.796 | 1.825 | 1.793 |
| (20) | $17.0 \leq vd1ap \leq 35.0$ | 20.88 | 17.47 | 20.88 | 20.88 | 20.36 | 18.90 |
| (21) | $20.0 \leq vd1cn \leq 50.0$ | 28.43 | 24.80 | 28.43 | 29.84 | 30.05 | 29.84 |
| (22) | $5.0 \leq vd1cn - vd1ap \leq 20.0$ | 7.549 | 7.330 | 7.549 | 8.959 | 9.690 | 10.940 |
| (23) | $-2.10 \leq fG1/f1 \leq -0.80$ | -1.351 | -1.781 | -1.876 | -1.489 | -1.129 | -1.545 |
| (24) | $-2.10 \leq fG1/f1w \leq -0.80$ | -1.351 | -1.781 | -1.876 | -1.489 | -1.129 | -1.545 |
| (25) | $1.50 \leq LD1/f1 \leq 3.30$ | 2.375 | 2.742 | 3.145 | 2.539 | 2.396 | 2.382 |
| (26) | $1.50 \leq LD1/f1w \leq 3.30$ | 2.375 | 2.742 | 3.145 | 2.539 | 2.396 | 2.382 |
| (27) | $0.050 \leq fw/BFw \leq 0.150$ | 0.0868 | 0.0886 | 0.0921 | 0.0938 | 0.0833 | 0.0914 |

| | Conditional expression | Embodiment 7 | 8 | 9 | 10 | 11 |
|---|---|---|---|---|---|---|
| (1) | $1.655 \leq (f1 + bok1)/f1 \leq 3.000$ | — | — | 1.748 | — | — |
| (2) | $2.370 \leq ft/f1 \leq 3.145$ | — | — | 2.506 | — | — |
| (2-2) | $1.810 \leq ft/f1 \leq 6.300$ | 1.821 | 2.020 | 2.506 | — | 4.179 |
| (3) | $15.0 \leq ft/fw \leq 35.0$ | 28.9 | 19.1 | 19.6 | — | 20.0 |
| (1-2) | $1.000 \leq (f1 + bok1)/f1 \leq 3.000$ | — | 1.779 | 1.748 | 1.638 | 1.784 |
| (4) | $0.00 \leq ((f1 + bok1)/f1)*11 + (ft/f1) * 2.2-24$ | — | 0.02 | 0.75 | 0.48 | 4.82 |
| (5) | $1.000 \leq (f1w + bok1w)/f1w \leq 3.000$ | — | 1.690 | 1.748 | 1.638 | 1.784 |
| (6) | $1.810 \leq ft/f1w \leq 6.300$ | — | 2.650 | 2.506 | 2.939 | 4.179 |
| (7) | $0.00 \leq ((f1w + bok1w)/f1w)*11 + (ft/f1w)* 2.2-24$ | — | 0.42 | 0.75 | 0.48 | 4.82 |
| (8) | $43.0° \leq \omega w \leq 50.0°$ | 43.4 | 46.0 | 47.2 | 45.0 | 47.7 |
| (9) | $1.50° \leq \omega t \leq 3.50°$ | 1.87 | 3.11 | 3.15 | 2.73 | 3.15 |
| (10) | $-1.50 \leq f1a/f1 \leq -0.75$ | -1.173 | -0.887 | -1.057 | -1.150 | -1.026 |
| (11) | $2.00 \leq f1b/f1 \leq 4.40$ | 4.357 | 2.448 | 3.147 | 2.873 | 2.731 |
| (12) | $1.30 \leq f1c/f1 \leq 1.80$ | 1.345 | 1.309 | 1.341 | 1.409 | 1.475 |
| (13) | $-1.50 \leq f1a/f1w \leq -0.75$ | -1.173 | -1.163 | -1.057 | -1.150 | -1.026 |
| (14) | $2.00 \leq f1b/f1w \leq 4.40$ | 4.357 | 3.211 | 3.147 | 2.873 | 2.731 |
| (15) | $1.30 \leq f1c/f1w \leq 1.80$ | 1.345 | 1.717 | 1.341 | 1.409 | 1.475 |
| (16) | $4.70 \leq f1/fw \leq 20.00$ | 15.89 | 9.44 | 7.82 | 7.14 | 4.79 |
| (17) | $4.70 \leq f1w/fw \leq 20.00$ | 15.89 | 7.20 | 7.82 | 7.14 | 4.79 |
| (18) | $1.30 \leq Fnow \leq 3.50$ | 1.55 | 1.90 | 1.80 | 1.89 | 3.03 |
| (19) | $1.75 \leq nd1n \leq 2.00$ | 1.777 | 1.814 | 1.808 | 1.798 | 1.798 |
| (20) | $17.0 \leq vd1ap \leq 35.0$ | 20.36 | 18.90 | 20.36 | 20.88 | 20.88 |
| (21) | $20.0 \leq vd1cn \leq 50.0$ | 28.43 | 28.43 | 28.43 | 28.43 | 28.43 |
| (22) | $5.0 \leq vd1cn - vd1ap \leq 20.0$ | 8.070 | 9.530 | 8.070 | 7.549 | 7.549 |
| (23) | $-2.10 \leq fG1/f1 \leq -0.80$ | -1.955 | -1.200 | -1.526 | -1.682 | -1.351 |
| (24) | $-2.10 \leq fG1/f1w \leq -0.80$ | -1.955 | -1.574 | -1.526 | -1.682 | -1.351 |
| (25) | $1.50 \leq LD1/f1 \leq 3.30$ | 2.372 | 1.792 | 2.309 | 2.425 | 2.375 |
| (26) | $1.50 \leq LD1/f1w \leq 3.30$ | 2.372 | 2.350 | 2.309 | 2.425 | 2.375 |
| (27) | $0.050 \leq fw/BFw \leq 0.150$ | 0.0807 | 0.0921 | 0.0885 | 0.0956 | 0.0913 |

| Factor | Embodiment 1 | 2 | 3 | 4 | 5 | 6 |
|---|---|---|---|---|---|---|
| f1 | 40.243 | 35.971 | 32.148 | 37.403 | 38.134 | 39.842 |
| bok1 | 31.565 | 28.739 | 21.106 | 26.357 | 38.231 | 29.266 |
| ft | 100.001 | 99.965 | 100.584 | 99.988 | 90.383 | 100.022 |
| fw | 5.000 | 5.104 | 5.304 | 5.403 | 4.801 | 5.268 |

TABLE 1-continued

| | | | | | | |
|---|---|---|---|---|---|---|
| ωw | 47.7 | 47.1 | 46.0 | 45.5 | 48.9 | 46.2 |
| ωt | 3.15 | 3.15 | 3.13 | 3.15 | 3.48 | 3.15 |
| f1a | −41.288 | −38.662 | −41.192 | −48.250 | −37.771 | −43.314 |
| f1b | 109.889 | 99.245 | 99.270 | 116.328 | 111.752 | 108.401 |
| f1c | 59.367 | 56.030 | 50.811 | 56.520 | 58.045 | 57.389 |
| Fnow | 1.80 | 1.90 | 1.90 | 1.90 | 1.90 | 1.80 |
| f1w | 40.243 | 35.971 | 32.148 | 37.403 | 38.134 | 39.842 |
| bok1w | 31.565 | 28.739 | 21.106 | 26.357 | 38.231 | 29.266 |
| vd1ap | 20.881 | 17.47 | 20.881 | 20.881 | 20.36 | 18.9 |
| vd1cn | 28.43 | 24.8 | 28.43 | 29.84 | 30.05 | 29.84 |
| fG1 | −54.352 | −64.070 | −60.301 | −55.685 | −43.068 | −61.542 |
| LD1 | 95.568 | 98.636 | 101.092 | 94.981 | 91.349 | 94.897 |
| BFw | 57.61 | 57.61 | 57.61 | 57.61 | 57.61 | 57.61 |

| | Embodiment | | | | |
|---|---|---|---|---|---|
| Factor | 7 | 8 | 9 | 10 | 11 |
| f1 | 92.320 | 50.084 | 39.907 | 39.302 | 40.243 |
| bok1 | 68.639 | 39.029 | 29.869 | 25.071 | 31.565 |
| ft | 168.097 | 101.187 | 100.000 | 115.518 | 168.181 |
| fw | 5.810 | 5.304 | 5.101 | 5.505 | 8.409 |
| ωw | 43.4 | 46.0 | 47.2 | 45.0 | 47.7 |
| ωt | 1.87 | 3.11 | 3.15 | 2.73 | 3.15 |
| f1a | −108.283 | −44.418 | −42.178 | −45.209 | −41.288 |
| f1b | 402.257 | 122.600 | 125.593 | 112.898 | 109.889 |
| f1c | 124.194 | 65.545 | 53.521 | 55.381 | 59.367 |
| Fnow | 1.55 | 1.90 | 1.80 | 1.89 | 3.03 |
| f1w | 92.320 | 38.185 | 39.907 | 39.302 | 40.243 |
| bok1w | 68.639 | 26.357 | 29.869 | 25.071 | 31.565 |
| vd1ap | 20.36 | 18.9 | 20.36 | 20.881 | 20.881 |
| vd1cn | 28.43 | 28.43 | 28.43 | 28.43 | 28.43 |
| fG1 | −180.451 | −60.110 | −60.901 | −66.093 | −54.352 |
| LD1 | 218.986 | 89.733 | 92.134 | 95.326 | 95.568 |
| BFw | 71.98 | 57.61 | 57.61 | 57.61 | 92.06 |

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-111195 filed Jun. 29, 2020, which is hereby incorporated by reference herein in its entirety.

What is claimed is:

1. A zoom lens comprising, in order from an object side to an image side:
   a first lens unit having a positive refractive power and configured not to move for zooming;
   two or more intermediate lens units configured to move in zooming; and
   a rear lens unit having a positive refractive power,
   wherein an interval between each pair of adjacent lens units changes in zooming,
   wherein the first lens unit includes, in order from the object side to the image side, a first lens subunit having a negative refractive power and configured not to move for focusing, a second lens subunit having a positive refractive power and configured to move for focusing, and a third lens subunit having a positive refractive power, and
   wherein the zoom lens satisfies following inequalities:

$$1.655 \leq (f1+bok1)/f1 \leq 3.000, \text{ and}$$

$$2.370 \leq ft/f1 \leq 3.145,$$

$$1.30 \leq Fnow \leq 3.50,$$

where f1 denotes a focal length of the first lens unit, bok1 denotes a length on an optical axis from a last surface of the first lens unit to a rear principal point of the first lens unit, and ft denotes a focal length of the zoom lens at a telephoto end, and Fnow denotes an F-number of the zoom lens at a wide-angle end.

2. The zoom lens according to claim 1, wherein the zoom lens satisfies a following inequality:

$$0.050 \leq fw/BFw \leq 0.150,$$

where fw denotes a focal length of the zoom lens at a wide-angle end, and BFw denotes a length on the optical axis from an image-side surface of a lens with a finite focal length located on a most image side in the zoom lens to an image plane.

3. The zoom lens according to claim 1, wherein the zoom lens satisfies a following inequality:

$$-1.50 \leq f1a/f1 \leq -0.75,$$

where f1a denotes a focal length of the first lens subunit.

4. The zoom lens according to claim 1, wherein the zoom lens satisfies a following inequality:

$$2.00 \leq f1b/f1 \leq 4.40,$$

where f1b denotes a focal length of the second lens subunit.

5. The zoom lens according to claim 1, wherein the zoom lens satisfies a following inequality:

$$1.30 \leq f1c/f1 \leq 1.80,$$

where f1c denotes a focal length of the third lens subunit.

6. The zoom lens according to claim 1, wherein the zoom lens satisfies a following inequality:

$$4.70 \leq f1/fw \leq 20.00,$$

where fw denotes a focal length of the zoom lens at a wide-angle end.

7. The zoom lens according to claim 1, wherein the zoom lens satisfies a following inequality:

$$1.75 \leq nd1n \leq 2.00,$$

where nd1n denotes an average value of refractive indices with respect to d-line of negative lenses included in the first lens unit.

8. The zoom lens according to claim 1,
wherein the first lens subunit includes a positive lens L1*ap*, and
wherein the zoom lens satisfies a following inequality:

$$17.0 \leq vd1ap \leq 35.0,$$

where vd1ap denotes an abbe number with respect to d-line of the positive lens L1*ap*.

9. The zoom lens according to claim 1,
wherein the third lens subunit includes a negative lens L1*cn*, and
wherein the zoom lens satisfies a following inequality:

$$20.0 \leq vd1cn \leq 50.0,$$

where vd1cn denotes an abbe number with respect to d-line of the negative lens L1*cn*.

10. The zoom lens according to claim 1,
wherein the first lens subunit includes a positive lens L1*ap*, and the third lens subunit includes a negative lens L1*cn*, and
wherein the zoom lens satisfies a following inequality:

$$5.0 \leq vd1cn - vd1ap \leq 20.0,$$

where vd1ap denotes an abbe number with respect to d-line of the positive lens L1*ap*, and vd1cn denotes an abbe number with respect to d-line of the negative lens L1*cn*.

11. The zoom lens according to claim 1,
wherein the first lens unit includes a lens G1 with negative refractive power located on a most object side, and
wherein the zoom lens satisfies a following inequality:

$$-2.10 \leq fG1/f1 \leq -0.80,$$

where fG1 denotes a focal length of the lens G1.

12. The zoom lens according to claim 1, wherein the zoom lens satisfies a following inequality:

$$1.50 \leq LD1/f1 \leq 3.30,$$

where LD1 denotes a thickness on the optical axis of the first lens unit.

13. The zoom lens according to claim 1, wherein the third lens subunit consists of five or less lenses.

14. An image pickup apparatus comprising:
the zoom lens according to claim 1; and
an image pickup element configured to pick up an image formed by the zoom lens.

15. An image pickup apparatus comprising:
a zoom lens; and
an image pickup element configured to pick up an image formed by the zoom lens,
wherein the zoom lens comprising, in order from an object side to an image side:
a first lens unit having a positive refractive power and configured not to move for zooming;
two or more intermediate lens units configured to move in zooming; and
a rear lens unit having a positive refractive power,
wherein an interval between each pair of adjacent lens units changes in zooming,
wherein the first lens unit includes, in order from the object side to the image side, a first lens subunit having a negative refractive power and configured not to move for focusing, a second lens subunit having a positive refractive power and configured to move for focusing, and a third lens subunit having a positive refractive power, and
wherein the zoom lens satisfies following inequalities:

$$1.655 \leq (f1 + bok1)/f1 \leq 3.000, \text{ and}$$

$$2.370 \leq ft/f1 \leq 3.145, \text{ and}$$

$$43.0° \leq \omega w \leq 50.0°,$$

where f1 denotes a focal length of the first lens unit, bok1 denotes a length on an optical axis from a last surface of the first lens unit to a rear principal point of the first lens unit, and ft denotes a focal length of the zoom lens at a telephoto end, and ωw denotes a half angle of view of the zoom lens at a wide-angle end and is defined by a following equation:

$$\omega w = \arctan(Y/fw),$$

where 2Y denotes a diagonal image size of the image pickup apparatus, fw denotes a focal length of the zoom lens at the wide-angle end.

16. The image pickup apparatus according to claim 15, wherein the zoom lens satisfies a following inequality:

$$1.50° \leq \omega t \leq 3.50°,$$

where ωt denotes a half angle of view of the zoom lens at the telephoto end and is defined by a following equation:

$$\omega t = \arctan(Y/ft),$$

where 2Y denotes a diagonal image size of the image pickup apparatus.

17. A zoom lens comprising, in order from an object side to an image side:
a first lens unit having a positive refractive power and configured not to move for zooming;
two or more intermediate lens units configured to move in zooming; and
a rear lens unit having a positive refractive power,
wherein an interval between each pair of adjacent lens units changes in zooming,
wherein the first lens unit includes, in order from the object side to the image side, a first lens subunit having a negative refractive power configured not to move for focusing, a second lens subunit having a positive refractive power and configured to move for focusing, and a third lens subunit having a positive refractive power, and
wherein the zoom lens satisfies following inequalities:

$$1.655 \leq (f1 + bok1)/f1 \leq 3.000,$$

$$1.810 \leq ft/f1 \leq 6.300, \text{ and}$$

$$15.0 \leq ft/fw \leq 35.0,$$

where f1 denotes a focal length of the first lens unit, bok1 denotes a length on an optical axis from a last surface of the first lens unit to a rear principal point of the first lens unit, ft denotes a focal length of the zoom lens at a telephoto end, and fw denotes a focal length of the zoom lens at a wide-angle end.

18. An image pickup apparatus comprising:
the zoom lens according to claim 17; and
an image pickup element configured to pick up an image formed by the zoom lens.

19. The image pickup apparatus according to claim 18, wherein the zoom lens satisfies a following inequality:

$$43.0° \leq \omega w \leq 50.0°,$$

where $\omega w$ denotes a half angle of view of the zoom lens at the wide-angle end and is defined by a following equation:

$$\omega w = \arctan(Y/fw),$$

where 2Y denotes a diagonal image size of the image pickup apparatus.

* * * * *